(12) United States Patent
Moss et al.

(10) Patent No.: US 6,638,049 B1
(45) Date of Patent: *Oct. 28, 2003

(54) APPARATUS AND METHOD FOR PROPORTIONALLY CONTROLLING FLUID DELIVERY TO READILY REPLACEABLE MOLD INSERTS

(75) Inventors: Mark D. Moss, Boxford, MA (US); David Kazmer, Amherst, MA (US)

(73) Assignee: Synventive Molding Solutions, Inc., Peabody, MA (US)

( * ) Notice: Subject to any disclaimer, the term of this patent is extended or adjusted under 35 U.S.C. 154(b) by 285 days.

This patent is subject to a terminal disclaimer.

(21) Appl. No.: 09/618,666

(22) Filed: Jul. 18, 2000

Related U.S. Application Data

(63) Continuation-in-part of application No. 09/502,902, filed on Feb. 11, 2000, now Pat. No. 6,436,320, and a continuation-in-part of application No. 09/478,297, filed on Jan. 5, 2000, now Pat. No. 6,254,377, and a continuation-in-part of application No. 09/478,174, filed on Jan. 5, 2000, now Pat. No. 6,343,922, and a continuation-in-part of application No. 09/434,928, filed on Nov. 5, 1999, now Pat. No. 6,287,107, and a continuation-in-part of application No. 09/434,718, filed on Nov. 5, 1999, now Pat. No. 6,309,208, and a continuation-in-part of application No. 09/400,533, filed on Sep. 21, 1999, now Pat. No. 6,464,909, and a continuation-in-part of application No. 09/185,365, filed on Nov. 3, 1998, now Pat. No. 6,419,870, and a continuation-in-part of application No. 09/187,974, filed on Jun. 26, 1998, now Pat. No. 6,294,122, and a continuation-in-part of application No. 09/063,762, filed on Apr. 21, 1998, now Pat. No. 6,361,300, and a continuation-in-part of application No. 08/922,208, filed on Sep. 2, 1997, now Pat. No. 6,062,840, and a continuation-in-part of application No. 08/874,962, filed on Jun. 13, 1997, now Pat. No. 5,894,025

(60) Provisional application No. 60/156,925, filed on Sep. 28, 1999, provisional application No. 60/144,583, filed on Jul. 19, 1999, provisional application No. 60/124,596, filed on Mar. 16, 1999, provisional application No. 60/111,709, filed on Nov. 6, 1998, and provisional application No. 60/090,750, filed on Jun. 26, 1998.

(51) Int. Cl.⁷ .................. B29C 45/22; B29C 45/30; B29C 45/77

(52) U.S. Cl. .................. 425/145; 425/146; 425/192 R; 425/564; 425/572

(58) Field of Search .................. 425/145, 146, 425/149, 562, 564, 567, 568, 570, 572, 577, 588, DIG. 224, DIG. 225, 185, 190, 192 R; 264/40.1, 40.5, 328.8; 700/200, 201, 203

(56) References Cited

U.S. PATENT DOCUMENTS 3,535,742 A    10/1970    Marcus (List continued on next page.)

FOREIGN PATENT DOCUMENTS

CA    1204906    5/1986

(List continued on next page.)

OTHER PUBLICATIONS

International Search Report, mailed Jun. 22, 2001.

(List continued on next page.)

*Primary Examiner*—Jill L. Heitbrink
(74) *Attorney, Agent, or Firm*—Kudirka & Jobse, LLP

(57) ABSTRACT

In an injection molding machine, an apparatus for controlling delivery of a fluid material to mold cavities of selectively variable size, shape, volume or configuration, the apparatus comprising a modular mold mounting mechanism having mounting apertures for receiving first and second molds having first and second mold cavities of different size, shape, volume or configuration, the mounting apertures being adapted for ready insertion and ready removal of the first and second molds; a manifold into which fluid material is injected, the manifold having first and second fluid delivery channels through which the fluid material is injected, one channel having an exit aperture communicating with a gate to the cavity of one mold, the other channel having an exit aperture communicating with a gate to the cavity of the other mold; each channel being associated with a drive mechanism which is interconnected to and controls operation of a fluid flow controller which varies flow of the fluid material through an associated channel; a sensor for sensing a selected condition of the fluid material being injected through at least one of the channels or at least one of the mold cavities; and a controller interconnected to each drive mechanism, the controller comprising a computer interconnected to a sensor which receives a signal representative of the selected condition sensed by the sensor, the computer including an algorithm utilizing a value corresponding to a signal received from the sensor as a variable for controlling operation of at least the drive mechanism associated with the at least one channel.

17 Claims, 34 Drawing Sheets

U.S. PATENT DOCUMENTS

| | | |
|---|---|---|
| 3,780,764 A | 12/1973 | Geist |
| 3,820,928 A | 6/1974 | Lemelson |
| 3,861,841 A | 1/1975 | Hanning |
| 3,952,927 A | 4/1976 | Schaumburg et al. |
| 4,389,002 A | 6/1983 | Devellian et al. |
| 4,424,015 A * | 1/1984 | Black et al. ............... 425/138 |
| 4,500,279 A | 2/1985 | Devellian et al. ........... 425/548 |
| 4,521,179 A | 6/1985 | Gellert |
| 4,588,367 A | 5/1986 | Schad |
| 4,592,711 A | 6/1986 | Capy |
| 4,701,292 A | 10/1987 | Valyi .......................... 264/155 |
| 4,720,253 A * | 1/1988 | Koentges ..................... 425/145 |
| 4,863,369 A | 9/1989 | Schad et al. |
| 4,931,234 A | 6/1990 | Schad et al. ............... 264/40.1 |
| 4,932,854 A | 6/1990 | Matsuda et al. |
| 5,078,589 A | 1/1992 | Osuna-Diaz |
| 5,141,696 A | 8/1992 | Osuna-Diaz |
| 5,149,547 A | 9/1992 | Gill |
| 5,192,555 A | 3/1993 | Arnott ......................... 425/544 |
| 5,249,947 A * | 10/1993 | Inaba et al. .................. 425/150 |
| 5,281,374 A | 1/1994 | Matsuda et al. ............... 264/39 |
| 5,288,222 A | 2/1994 | Wieser ....................... 425/190 |
| 5,356,576 A | 10/1994 | Fischbach |
| 5,389,315 A | 2/1995 | Yabushita |
| 5,492,467 A | 2/1996 | Hume et al. |
| 5,545,028 A | 8/1996 | Hume et al. |
| 5,554,395 A | 9/1996 | Hume et al. |
| 5,556,582 A | 9/1996 | Kazmer |
| 5,601,773 A | 2/1997 | Schmidt et al. .......... 264/328.8 |
| 5,674,439 A | 10/1997 | Hume et al. |
| 5,871,786 A | 2/1999 | Hume et al. |
| 5,885,624 A | 3/1999 | Katsuta et al. ............... 425/149 |
| 5,885,628 A | 3/1999 | Swenson et al. |
| 5,894,025 A | 4/1999 | Lee et al. |
| 5,916,605 A | 6/1999 | Swenson et al. |
| 5,948,448 A | 9/1999 | Schmidt |
| 5,948,450 A | 9/1999 | Swenson et al. |
| 5,980,237 A | 11/1999 | Swenson et al. |
| 6,000,831 A | 12/1999 | Triplett |
| 6,027,328 A | 2/2000 | Herbst |
| 6,062,840 A | 5/2000 | Lee et al. .................... 425/130 |
| 6,099,767 A * | 8/2000 | Tarr et al. .................... 264/40.1 |
| 6,145,022 A * | 11/2000 | Takizawa et al. ............ 710/10 |
| 6,206,674 B1 * | 3/2001 | Foltuz et al. ............... 425/185 |
| 6,254,377 B1 | 7/2001 | Kazmer et al. |
| 6,261,075 B1 | 7/2001 | Lee et al. .................... 425/130 |
| 6,261,084 B1 | 7/2001 | Schmidt ...................... 425/564 |
| 6,287,107 B1 | 9/2001 | Kazmer et al. ............. 425/562 |
| 6,294,122 B1 | 9/2001 | Moss et al. ............... 264/328.9 |
| 6,309,208 B1 | 10/2001 | Kazmer et al. ............. 425/562 |
| 6,343,921 B1 | 2/2002 | Kazmer et al. ............. 425/145 |
| 6,343,922 B1 | 2/2002 | Kazmer et al. ............. 425/145 |
| 6,361,300 B1 | 3/2002 | Kazmer ....................... 425/145 |
| 6,419,870 B1 | 7/2002 | Lee et al. ................. 264/328.1 |
| 6,436,320 B1 | 8/2002 | Kazmer et al. ............ 264/40.1 |

FOREIGN PATENT DOCUMENTS

| | | | |
|---|---|---|---|
| CA | 2246771 | 1/2002 | |
| DE | 2034163 | 2/1971 | |
| DE | 2401168 | 7/1975 | |
| DE | 299 09 535 U 1 | 8/1999 | ........... B29C/45/77 |
| DE | 19811466 A1 | 9/1999 | ........... B29C/45/28 |
| EP | 0 911 137 | 4/1999 | ........... B29C/45/16 |
| EP | 1 052 078 A1 | 11/2000 | ........... B29C/45/57 |
| EP | 1 142 686 A1 | 10/2001 | ........... B29C/45/30 |
| JP | 58/142833 | 8/1983 | ............. B29F/1/03 |
| JP | 60-212321 | 10/1985 | |
| JP | 61-63428 | 4/1986 | |
| WO | WO 97/43105 | 11/1997 | |
| WO | 98/56564 | 12/1998 | ........... B29C/45/80 |
| WO | 99/54109 | 10/1999 | ........... B29C/45/30 |
| WO | WO 99/54109 | 10/1999 | ........... B29C/45/30 |
| WO | WO 99/59795 | 11/1999 | |
| WO | 01/08462 | 2/2001 | |
| WO | WO 02/36324 A1 | 2/2002 | ........... B29C/45/27 |

OTHER PUBLICATIONS

Patent Abstracts of Japan, Publication No. 58 142833, published Aug. 25, 1983, vol. 7, No. 261: 1 pg.

Patent Abstracts of Japan, Publication No. 60 212321, published Oct. 24, 1985, vol. 10, No. 66: 1 pg.

Patent Abstracts of Japan, Publication No. 61 063428, published Apr. 1, 1986, vol. 10, No. 231: 1 pg.

European Search Report, dated Feb. 28, 2001 for Application No. 00 12 4358.

Abstract—Japanese Publication No. 58 142833, Aug. 25, 1983, Kobe Steel Ltd., "Control Method for Injection Molding Machine".

Abstract—Japanese Publication No. 61 063428, Apr. 1, 1986, Nippon Densco Co. Ltd., "Mold Assembly".

International Search Report, dated Aug. 3, 2002, PCT/US01/42795.

International Search Report, mailed Feb. 2, 1999, PCT/US98/10798.

International Search Report, mailed Jun. 5, 2002, PCT/US02/08364.

Kazmer, et al., "Multicavity Pressure Control in the Filling and Packing Stages of the Injection Molding Process," *Polymer Engineering and Science*, 11/97, vol. 37, No. 11, pp. 1865–1879.

Kazmer, et al., "The Process Capability of Multi–Cavity Pressure Control for the Injection Molding Process," *Polymer Engineering and Science*, 11/97, vol. 37, No. 11, pp. 1880–1895.

Kazmer, "Dynamic Feed Control: A New Method for Injection Molding of High Quality Plastic Parts," A Dissertation submitted to the Design Division of Mechanical Engineering and the Committee on Graduate Studies in Partial Fulfillment of the Requirements for the Degree of Doctor of Philosophy in Mechanical Engineering, Jun. 1995.

Translation—Japanese Unexamined Patent Application No. 61–63428.

Abstract—Japanese Publication No. 2000141439, May 23, 2000, Kobe Steel Ltd., "Injection Compression Molding Device.".

Abstract—Japanese Publication No. 63166511, Jul. 9, 1988, Nissei Plastics Ind Co., "Injection Molding.".

Abstract—Japanese Publication No. 61–63428, Apr. 1, 1986, Nippon Denso Co., Ltd., "Mold Assembly.".

* cited by examiner

APPARATUS AND METHOD FOR PROPORTIONALLY CONTROLLING FLUID DELIVERY TO READILY REPLACEABLE MOLD INSERTS

RELATED APPLICATION

This application claims priority under 35 U.S.C. Section 120 to and is a continuation-in-part of all of the following patent applications: U.S. patent application Ser. No. 09/518,982 filed Mar. 3, 2000, now U.S. Pat. No. 6,261,075; U.S. patent application Ser. No. 09/063,762 filed Apr. 21, 1998, now U.S. Pat. No. 6,361,300; U.S. patent application Ser. No. 09/187,974 filed Jun. 26, 1998, now U.S. Pat. No. 6,294,122 which claims the benefit of U.S. application Ser. No. 60/090,750 filed Jun. 26, 1998; [U.S. patent application Ser. No. 08/922,208 filed Sep. 2, 1997, now U.S. Pat. No. 6,062,840;] U.S. Ser. No. 09/185,365 filed, Nov. 3, 1998, now U.S. Pat. No. 6,419,870 (which is a divisional of U.S. patent application Ser. No. 08/874,962 filed Jun. 13, 1997, now U.S. Pat. No. 5,894,025); U.S. patent application Ser. No. 09/400,533 filed Sep. 21, 1999, now U.S. Pat. No. 6,464,909 which claims the benefit of U.S. application Ser. No. 60/124,596 filed Mar. 16, 1999; U.S. patent application Ser. No. 09/434,718 filed Nov. 5, 1999, now U.S. Pat. No. 6,309,208; which is a continuation in part of Ser. No. 08/922,208 filed Sep. 2, 1997, now U.S. Pat. No. 6,062,840 and claims the benefit of U.S. application Ser. No. 60/124,596 filed Mar. 16, 1999 and U.S. application Ser. No. 60/111,709 filed Nov. 6, 1998 and U.S. application Ser. No. 60/144,583 filed Jul. 19, 1999; U.S. patent application Ser. No. 09/434,928 filed Nov. 5, 1999, now U.S. Pat. No. 6,287,107, U.S. patent application Ser. No. 09/502,902 filed Feb. 11, 2000, now U.S. Pat. No. 6,436,320; U.S. patent application Ser. No. 09/478,297 filed Jan. 5, 2000, now U.S. Pat. No. 6,254,377; U.S. patent application Ser. No. 09/478,174 filed Jan. 5, 2000, now U.S. Pat. No. 6,343,922; U.S. patent application Ser. No. 09/503,832 filed Feb. 15, 2000 which claims the benefit of U.S. application Ser. No. 60/156,925 filed Sep. 28, 1999.

This application also claims priority under 35 U.S.C. Section 119 to [all of the provisional applications which the above identified pending applications claim priority to or to which the above Identified application are otherwise entitled to priority and also claims priority to] the following: U.S. provisional patent application serial No. 60/156,925 filed Sep. 28, 1999, U.S. provisional patent application serial No. 60/166,638 filed Nov. 19, 1999; U.S. provisional patent application serial No. 60/152,714 filed Sep. 7, 1999; U.S. provisional patent application serial No. 60/144,583 filed Jul. 19, 1999; the disclosures of all of the foregoing of which are incorporated herein by reference in their entirety.

BACKGROUND OF THE INVENTION

The present invention relates to readily programmable automatic control of plastic flow through two (or more) separate injection nozzles to the cavities of separate mold inserts which are readily removable from and insertable into a mold housing of an injection molding machine. More particularly the invention relates to a system and method for programming proportional control of plastic flow injection through a nozzle into the cavity of any modular mold insert having any desired cavity configuration and volume different from the cavity configuration/volume of a first modular mold insert which it replaces. Normally, in injection mold apparati/processes, the pressure, flow rate, temperature and other parameters of the polymer fluid(s) and operating parameters of components of the injection mold machine itself, are preselected and fixed throughout an injection mold machine operating cycle according to the size, configuration and volume of the cavity of the mold into which the plastic fluid is to be injected. Such prior systems do not enable the user to vary, control or tailor the fluid flow rate or stop/start of the system with respect to any desired mold cavity configuration/size.

SUMMARY OF THE INVENTION

The present invention provides injection control over two or more modular molds (mold inserts) which are readily removable/changeable/variable and which have different sizes, shapes, volumes or configurations, the injection for which can be independently customized for maximum end product (part) and injection quality, speed of part production and the like using a single existing size and configuration of injection machine screw/barrel, hotrunner(s), manifold(s), actuators, nozzles, valve pins, rotary valves, plungers, shooting pots and the like, the operation of which are readily programmably controllable and can be operationally programmed for maximum performance with respect to each mold insert having any selected part or cavity configuration, size, shape or volume.

In accordance with the invention therefore, there is a provided a system, apparatus and method for selectively and readily controlling the injection flow into the cavities of modular injection mold inserts which are readily replaceable with inserts having different cavities of different size, shape, configuration, volume and the like.

More particularly there is provided, in an injection molding machine, an apparatus for controlling delivery of a fluid material to mold cavities of selectively variable size or configuration, the apparatus comprising:

A modular mold mounting mechanism having mounting apertures for receiving first and second molds having first and second mold cavities of different size or configuration, the mounting apertures being adapted for ready insertion and ready removal of the first and second molds;

A manifold into which fluid material is injected, the manifold having first and second fluid delivery channels through which the fluid material is injected, one channel having an exit aperture communicating with a gate to the cavity of one mold, the other channel having an exit aperture communicating with a gate to the cavity of the other mold;

Each channel being associated with a drive mechanism which is interconnected to and controls operation of a fluid flow controller which varies flow of the fluid material through an associated channel, A sensor for sensing a selected condition of the fluid material being injected through at least one of the channels or at least one of the mold cavities;

A controller interconnected to each drive mechanism, the controller comprising a computer interconnected to a sensor which receives a signal representative of the selected condition sensed by the sensor, the computer including an algorithm utilizing a value corresponding to a signal received from the sensor as a variable for controlling operation of at least the drive mechanism associated with the at least one channel.

Most preferably the modular mold housing comprises first and second housings readily openable and closeable for enabling ready insertion and removal of the first and second molds.

Typically the apparatus includes a second sensor for sensing a selected condition of the fluid material being injected through the other channel or the other mold cavity, the computer being interconnected to the second sensor and receiving a signal representative of the selected condition sensed by the second sensor, the algorithm utilizing a value corresponding to a signal received from the second sensor as a variable for controlling operation of the drive mechanism associated with the other channel.

Typically, at least one of the channels includes a nozzle having a seal surface surrounding the exit aperture of the channel, the nozzle being expandable upon heating to a predetermined operating temperature, the nozzle being mounted relative to a complementary surface surrounding the gate such that the seal surface of the nozzle is moved into compressed contact with the complementary surface surrounding the gate upon heating of the nozzle to the predetermined operating temperature. At least one of the channels preferably includes a nozzle comprising an outer unitary piece formed of a first material and an inner unitary piece formed of a second material, the first material being substantially less heat conductive than the second material.

The sensor may comprise a pressure transducer interconnected to at least one of the channels or a mold cavity for detecting the pressure of the fluid material. The actuator controller may include a solenoid interconnected to the computer, the solenoid having at least two chambers and a piston controllably movable between selected positions for selectively delivering a pressurized actuator drive fluid to one or the other of the chambers of the actuator.

In one embodiment, at least one channel includes a valve pin interconnected to the actuator controller, the valve pin having a surface for forming a gap with a complementary surface of the at least one channel spaced upstream and away from the gate, the size of the gap being controllably variable to control flow of the fluid material through the gate. The valve pin is reciprocally movable toward and away from the gate and wherein the surface of the valve pin and the surface of the channel are adapted to increase the size of gap as the valve pin is moved away from the gate and decrease the size of the gap as the valve pin is moved toward the gate.

The apparatus may include a plug mounted in a recess of the manifold, the plug having a bore through which a stem of the valve pin passes, the valve pin having a head, the bore of the plug through which the stem passes having a smaller diameter than the valve pin head at the valve pin head's largest point and the recess of the manifold having a larger diameter than the diameter of the valve pin head at the valve pin head's largest point, so that the valve pin can be removed from the manifold from a side of the manifold in which the recess is formed when the plug is removed from the manifold.

The sensor may be selected from the group consisting of a pressure transducer, a load cell, a valve pin position sensor, a temperature sensor and a barrel screw position sensor.

The fluid flow controller is preferably disposed within or communicates with the flow of fluid material through the manifold or one or more of the channels and is typically selected from the group consisting of a valve pin, a rotary valve and a plunger.

Further in accordance with the invention there is provided, in an injection molding system including a manifold having first and second channels to direct fluid material into respective first and second modular cavity inserts each modular cavity insert having respective first and second cavity volumes and shapes, the modular cavity inserts being readily removably mounted in respective first and second receiving apertures in a mold, a method of injection molding comprising the steps of:

(A) independently controlling first and second rates at which fluid material is injected respectively through the first and second channels or into the first and second modular cavity inserts;

(B) readily removing the second modular cavity insert from the second receiving aperture in the mold and readily inserting a third modular cavity insert into the second receiving aperture, the third modular cavity insert having a volume or shape different from the volume or shape of the second modular cavity insert; and (C) after step (B), independently controlling the first and a selected third rate at which the fluid material is injected respectively into the first and third modular cavity inserts, the selected third rate being different from the first rate.

The method preferably further comprises:

selecting an automatically executable algorithm which utilizes as variables first and second values corresponding to first and second respective signals received from respective first and second sensors of respective first and second conditions of the fluid material injected through or into respective ones of the first and second channels or the first and third modular cavity inserts;

wherein the algorithm includes programmable instructions for directing the rates of flow of the first and third flow rates; and, executing the algorithm automatically with a computer after the third modular cavity insert is inserted into the second receiving aperture.

The flow controller of the apparatus typically comprises a pin which is controllably slidable via interconnection to an actuator along a reciprocal path of movement within the bore of a nozzle, or the controller may comprise a rotary valve having a rotatable flow channel connecting an input flow channel to the exit aperture of at least one of the nozzles, the rotatable channel being interconnected to the actuator and controllably rotatable via the actuator to selectively vary the rate of flow of plastic melt through the rotatable flow channel to the exit aperture according to the degree of rotation of the rotary valve. The rotary valve typically comprises a cylinder rotatably mounted within a housing the cylinder having a bore rotatably communicable with a pair of bores in the housing.

The flow controller may alternatively comprise a ram or plunger driven by an actuator as described herein. In such embodiments, the ram or plunger may be disposed within a channel within the manifold or within a well or chamber within the manifold which communicates with a channel within the manifold.

In an embodiment, one or more of the actuators comprises a piston mounted within a fluid sealed housing, the piston having a stem extending outside the fluid sealed housing, the valve pin having a head wherein the stem is readily detachably interconnected to the head of the valve pin outside the fluid sealed housing.

In another embodiment, one or more actuators comprises an electrically driven motor, the motor being mechanically interconnected to either a valve pin disposed in a bore of one of the nozzles such that the valve pin is reciprocally drivable within the bore of the nozzle by the motor, or a rotary valve for rotatable drive of a rotatable component having a fluid flow bore, or a ram or plunger, the motor being electrically interconnected to the algorithm, the algorithm controlling the drive of the motor.

Each actuator for each of the first and second nozzles may be fluid driven wherein each actuator is commonly supplied with an actuator drive fluid flowing through a manifold which commonly delivers fluid to each of the nozzles.

The actuator controller for a fluid driven actuator typically comprises a solenoid having a position controllably movable between selected positions for selectively delivering a pressurized actuator drive fluid to one or the other of at least two chambers of the actuator.

The actuator controller for a fluid driven actuator may include a drive fluid valve which receives pressurized drive fluid from a source, the drive fluid valve leaving one or more fluid ports sealably communicating with one or more complementary fluid drive chambers disposed within the fluid driven actuator, the drive fluid valve being controllably driven to selectively distribute received pressurized fluid through the one or more fluid ports to the one or more complementary fluid drive chambers of the actuator. The drive fluid valve typically comprises a sealed housing and a plunger movable within the sealed housing to positions along a path wherein the one or more fluid ports are open to communication, partially open to communication, or closed from communication with the one or complementary fluid drive chambers by the plunger, the plunger being controllably movable to any position along the path between the open and closed positions such that flow of the drive fluid to drive fluid chamber is controllably variable to a selected rate. The plunger typically comprises a slidably movable rod having interference projections which are selectively slidable by movement of the rod over the fluid ports to open, partially open to any desired degree, or close the fluid ports.

In another embodiment, at least one gate of a mold may be an edge gate extending radially outward through a mold cavity plate, at least one of the nozzles having a bore having a first portion having an inlet for the plastic melt which is not in alignment with the edge gate and a second portion extending radially outward from the first portion terminating in the exit aperture being in alignment with the edge gate. In such an embodiment the nozzle may have an exit end comprising a center nozzle member and a circumferential nozzle member surrounding the center nozzle member, the exit aperture extending through the center nozzle member in alignment with one of the gates, the circumferential nozzle member surrounding the one gate, wherein a groove is formed between the circumferential nozzle member and the center portion.

The apparatus typically includes a plurality of enclosed heat conductive tubes containing a fluid which vaporizes and condenses within each tube and a wick disposed within and along the length of each tube, at least one of the manifold and one of the nozzles having the tubes embedded within the manifold or the nozzle making heat conductive contact with the manifold or the nozzle.

The apparatus may include a melt flow reservoir sealably communicating with and disposed between a common feed channel of the manifold and an exit aperture of a nozzle, the reservoir having a defined volume sealably fillable and closed off from communication with the common feed channel, the reservoir including an injection mechanism such as a ram or plunger operable on melt material residing in the reservoir to force the melt material through the exit aperture of the nozzle under pressure. In such an embodiment, the melt flow controller preferably comprises a valve disposed in the melt flow between the reservoir and the exit aperture of the nozzle.

The melt flow controller may also alternatively comprise the injection mechanism itself such as a ram or plunger the actuator for which is controlled by the actuator controller to control the flow directly via the ram or plunger without an intermediate valve between the ram/plunger and the exit aperture of the channel (e.g. ram/plunger/cylinder 565, FIG. 31, without the intermediate valve 512).

The sensor typically comprises a pressure transducer interconnected to or communication with at least one of the bore of a nozzle or a mold cavity or elsewhere within the flow channel upstream of the bore of the nozzle for detecting the pressure of the melt material. The sensor may alternatively comprise a mechanism selected from the group consisting of a pressure transducer, a load cell, a valve pin position sensor, a temperature sensor and a barrel screw position sensor.

BRIEF DESCRIPTION OF THE DRAWINGS

FIG. 5b is a close-up more detailed view of a portion of the nozzle end shown in FIG. 5a;

DETAILED DESCRIPTION

Figure 1:
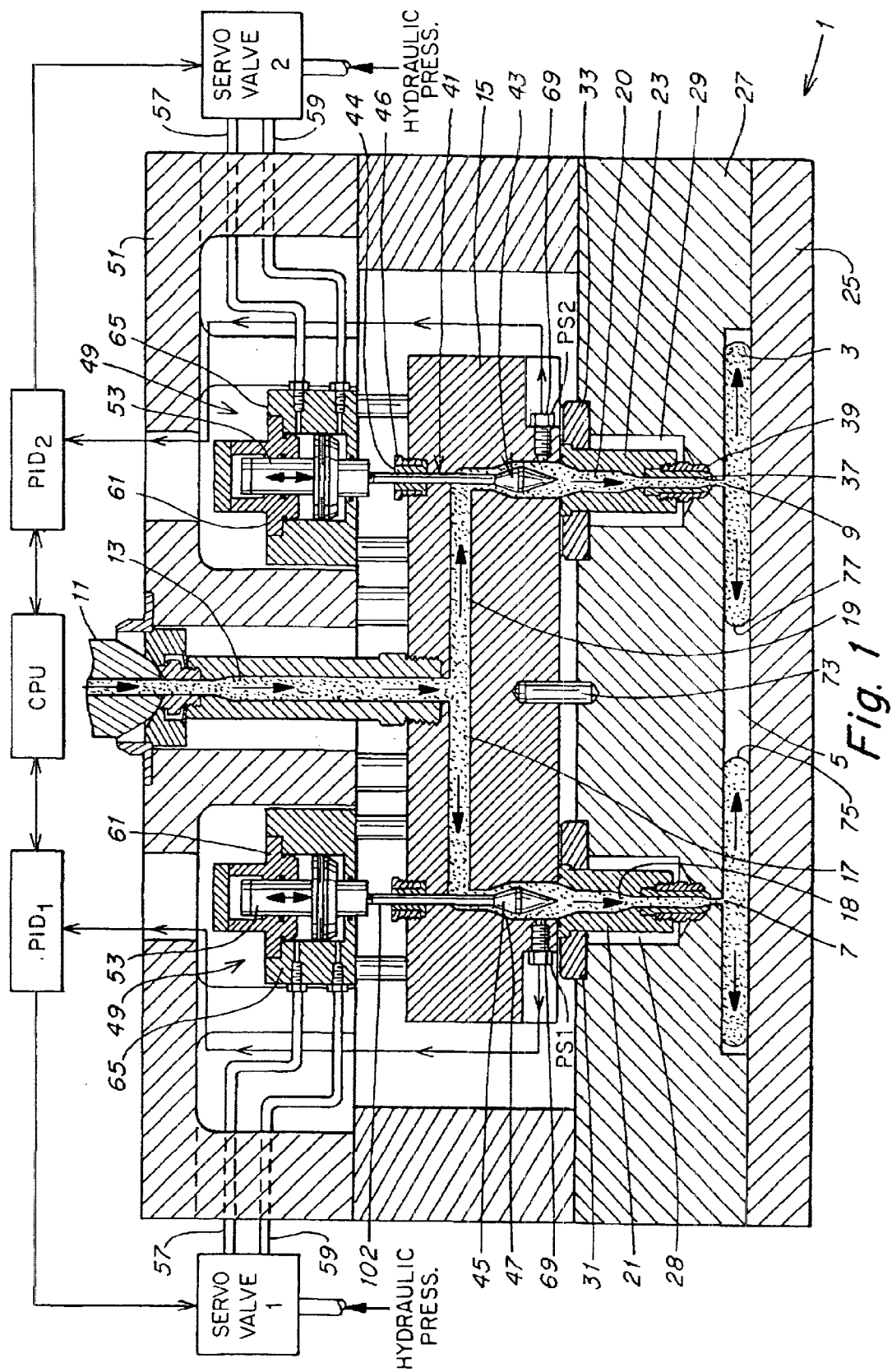
FIG. 1 is a partially schematic cross-sectional view of an injection molding system according to one embodiment of the present invention.
Figure 2:
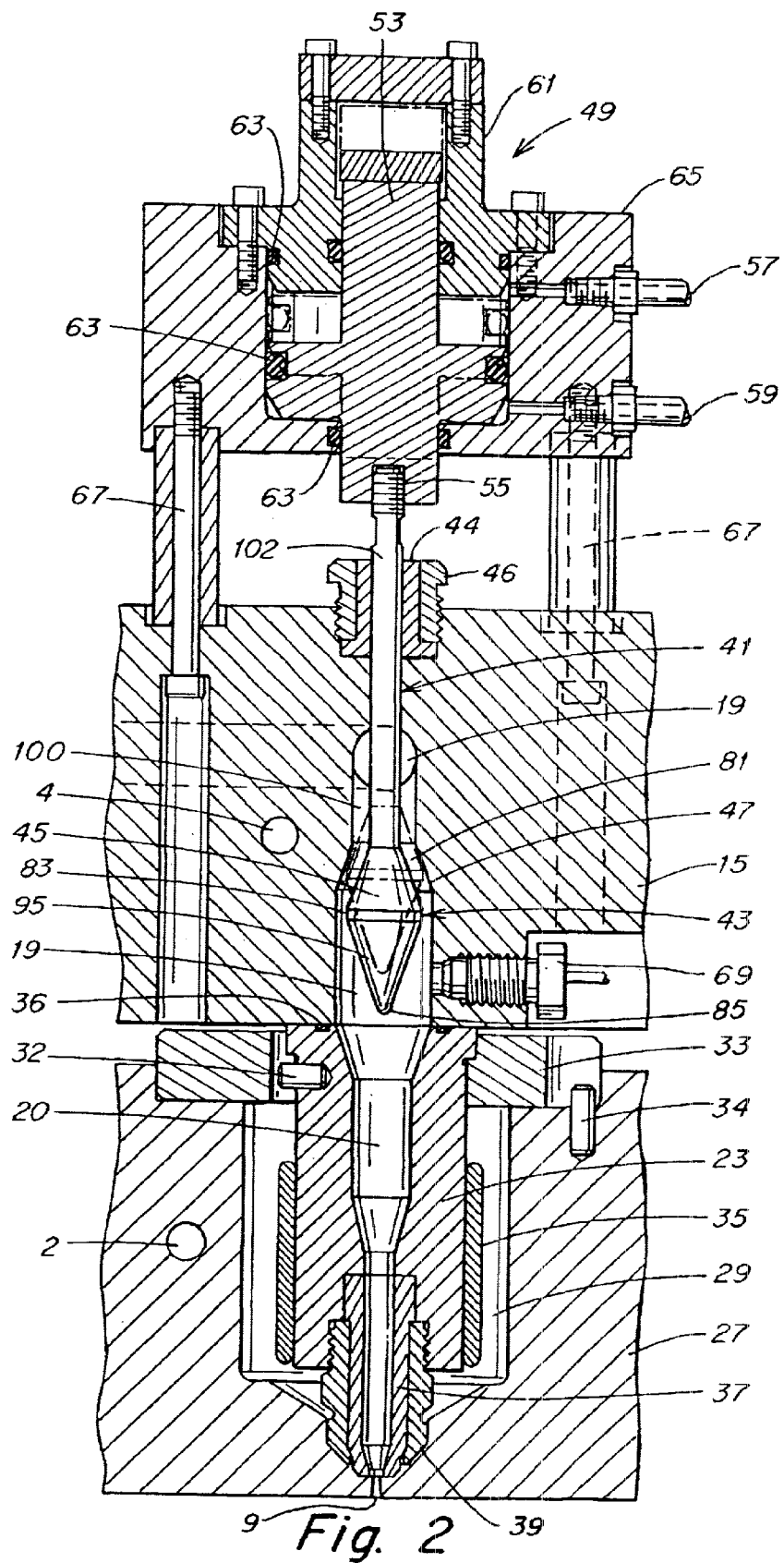
FIG. 2 is an enlarged fragmentary cross-sectional view of one side of the injection molding system of FIG. 1.

FIGS. 1–2 show one embodiment of an injection molding system according to the present invention having two nozzles 21, 23 the plastic flow through which are to be controlled dynamically according to an algorithm as described below. Although only two nozzles are shown in FIGS. 1–2, the invention contemplates simultaneously controlling the material flow through at least two and also through a plurality of more than two nozzles. In the embodiment shown, the injection molding system 1 is a multigate single cavity system in which melt material 3 is injected into a cavity 5 from the two gates 7 and 9. Melt material 3 is injected from an injection molding machine 11 through an extended inlet 13 and into a manifold 15. Manifold 15 distributes the melt through channels 17 and 19. Although a hot runner system is shown in which plastic melt is injected, the invention is applicable to other types of injection systems in which it is useful to control the rate at which a material (e.g., metallic or composite materials) is delivered to a cavity.

Melt is distributed by the manifold through channels 17 and 19 and into bores 18 and 20 of the two nozzles 21 and 23, respectively. Melt is injected out of nozzles 21 and 23 and into cavity 5 (where the part is formed) which is formed by mold plates 25 and 27. Although a multi-gate single-cavity system is shown, the invention is not limited to this type of system, and is also applicable to, for example, multi-cavity systems, as discussed in greater detail below.

The injection nozzles 21 and 23 are received in respective wells 28 and 29 formed in the mold plate 27. The nozzles 21 and 23 are each seated in support rings 31 and 33. The support rings serve to align the nozzles with the gates 7 and 9 and insulate the nozzles from the mold. The manifold 15 sits atop the rear end of the nozzles and maintains sealing contact with the nozzles via compression forces exerted on the assembly by clamps (not shown) of the injection molding machine. An O-ring 36 is provided to prevent melt leakage between the nozzles and the manifold. A dowel 73 centers the manifold on the mold plate 27. Dowels 32 and 34 prevent the nozzle 23 and support ring 33, respectively, from rotating with respect to the mold 27.

Figure 3:
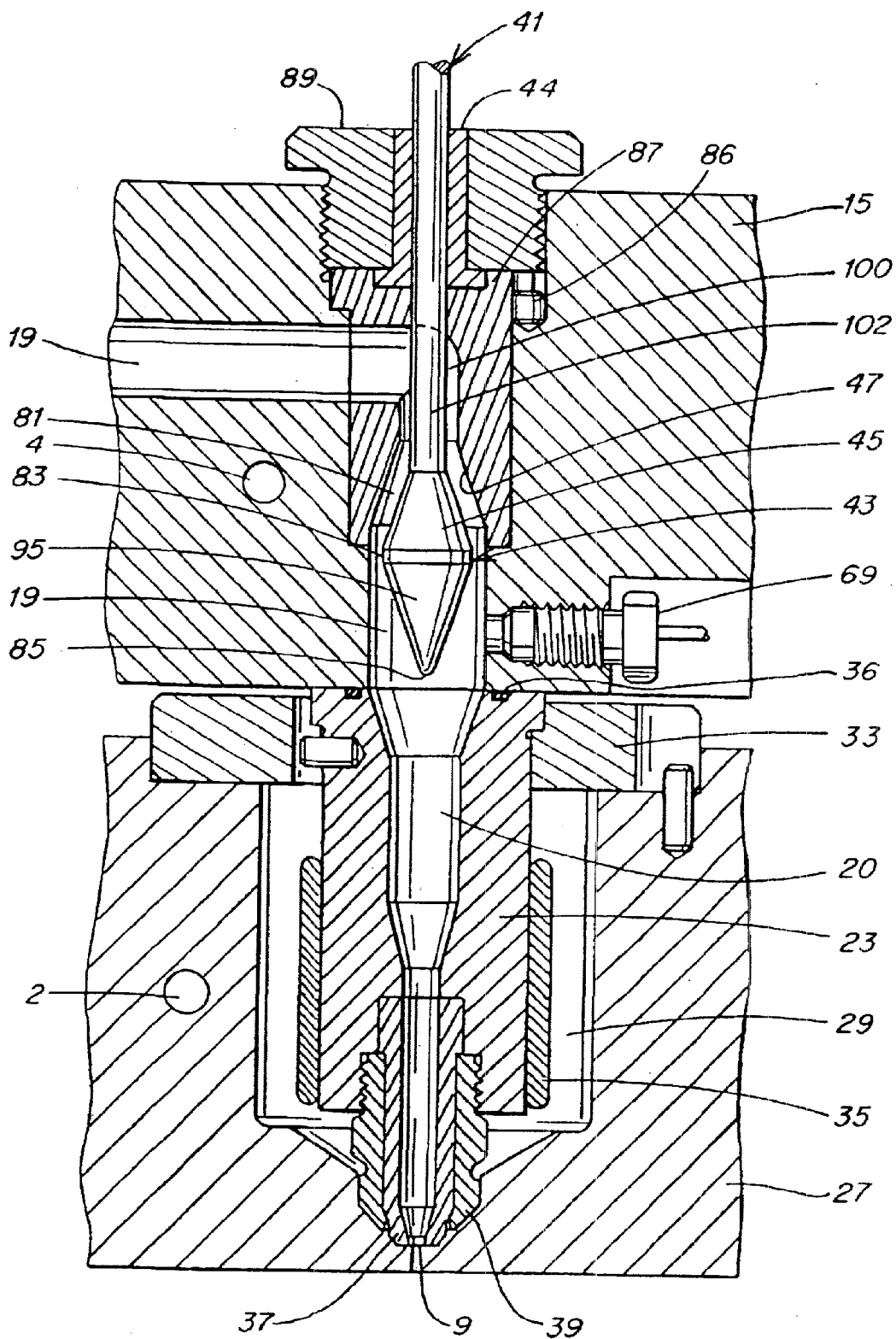
FIG. 3 is an enlarged fragmentary cross-sectional view of an alternative embodiment of a system similar to FIG. 1, in which a plug is used for easy removal of the valve pin.

In the embodiment shown in FIGS. 1–3 an electric band heater 35 for heating the nozzles is shown. In other embodiments, heat pipes, such as those disclosed in U.S.

Pat. No. 4,389,002, the disclosure of which is incorporated herein by reference and discussed below, may be disposed in a nozzle and used alone or in conjunction with a band heater 35. The heater is used to maintain the melt material at its processing temperature as far up to the point of exit through/ into gates 7 and 9 as possible. As shown, the manifold is heated to elevated temperatures sufficient to maintain the plastic or other fluid which is injected into the manifold distribution ducts 17, 19 at a preferred preselected flow and processing temperature. A plurality of heat pipes 4 (only one of which is shown in FIGS. 2, 3) are preferably disposed throughout the manifold/hotrunner 15 so as to more uniformly heat and maintain the manifold at the desired processing temperature.

The mold plate or body 27 is, on the other hand, typically cooled to a preselected temperature and maintained at such cooled temperature relative to the temperature of the manifold 15 via cooling ducts 2 through which water or some other selected fluid is pumped during the injection molding process in order to effect the most efficient formation of the part within the mold cavity.

Figure 4:
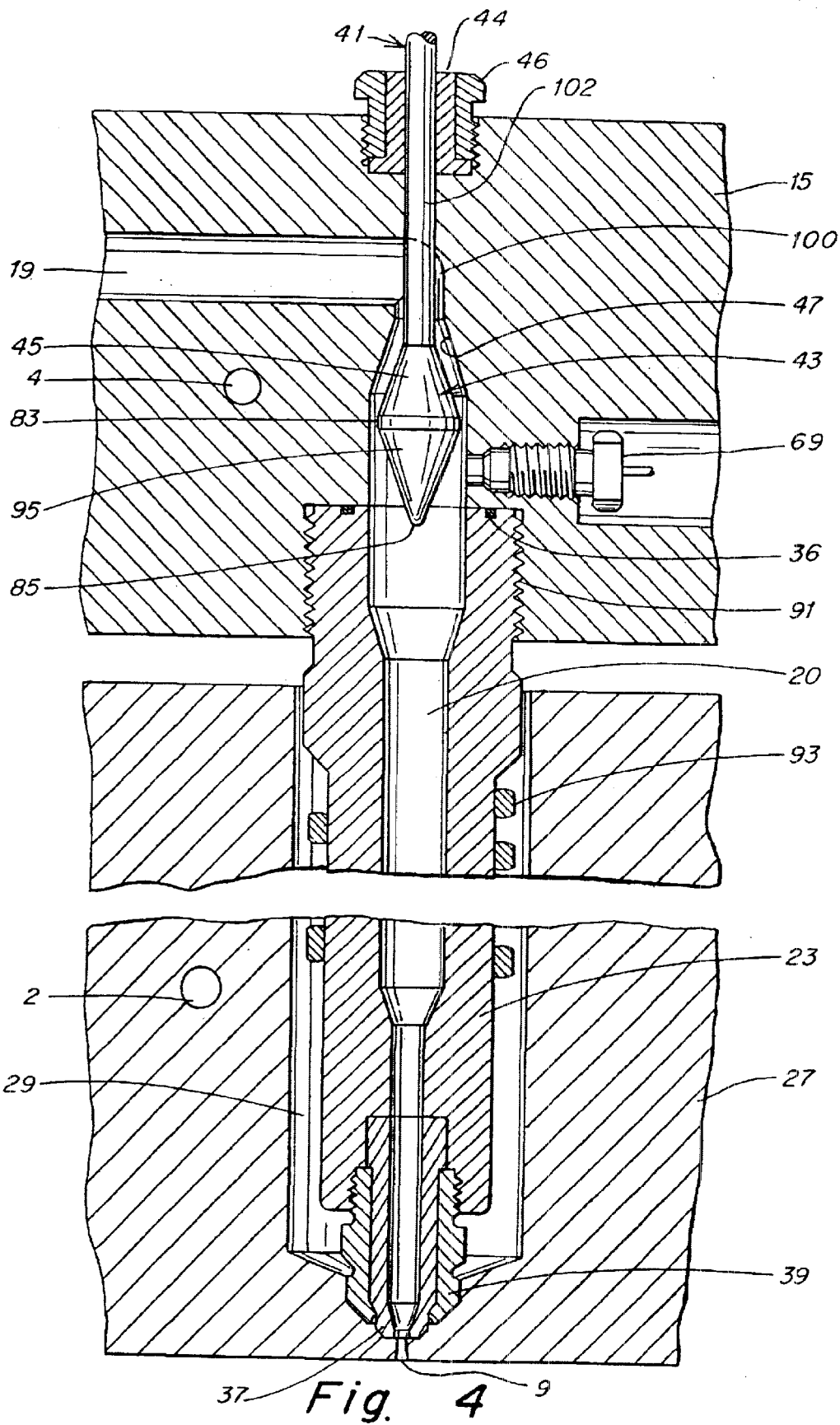
FIG. 4 is an enlarged fragmentary cross-sectional view of an alternative embodiment of a system similar to FIG. 1, in which a threaded nozzle is used.
Figure 5:
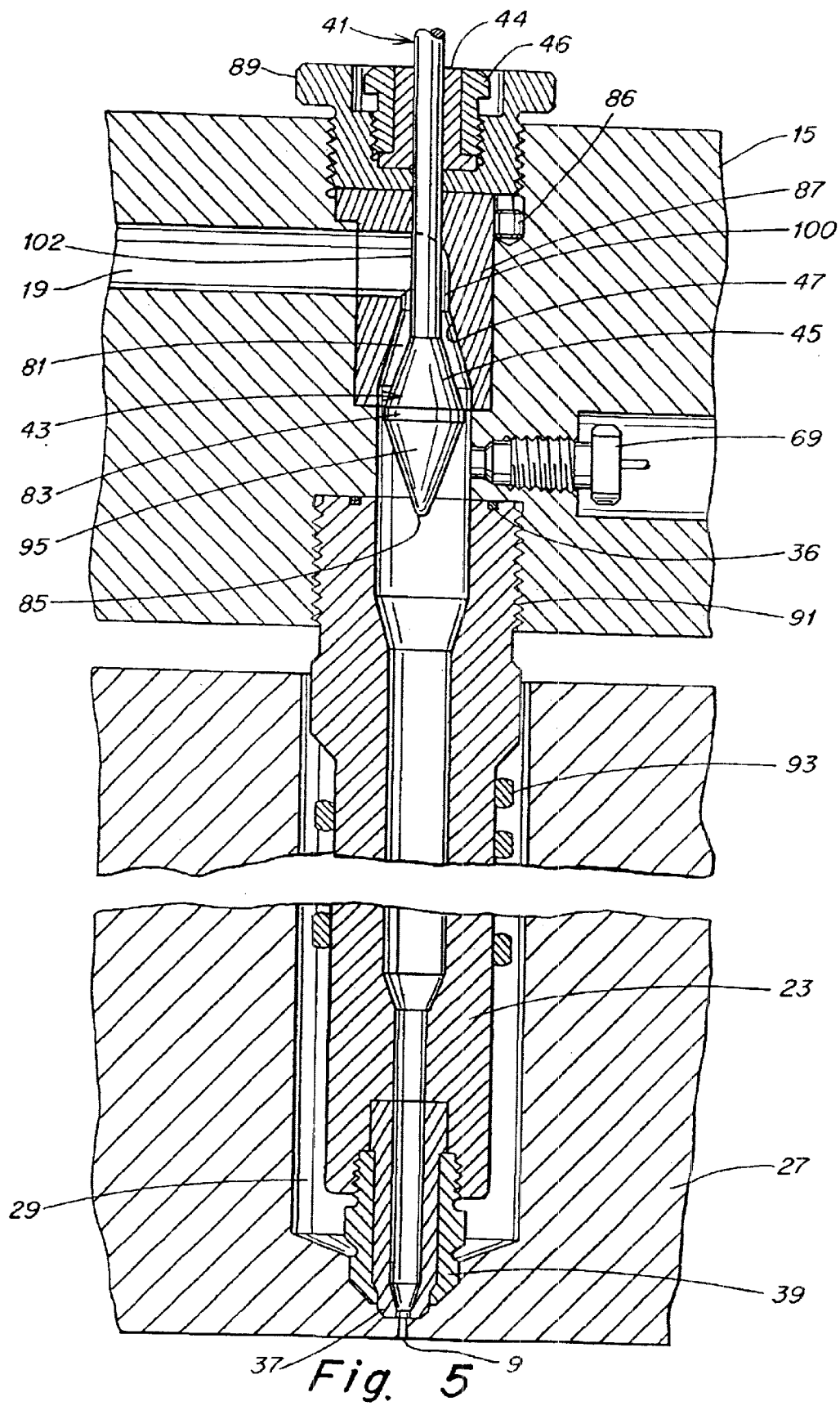
FIG. 5 is a view similar to FIG. 4, showing an alternative embodiment in which a plug is used for easy removal of the valve pin.
Figure 5A:
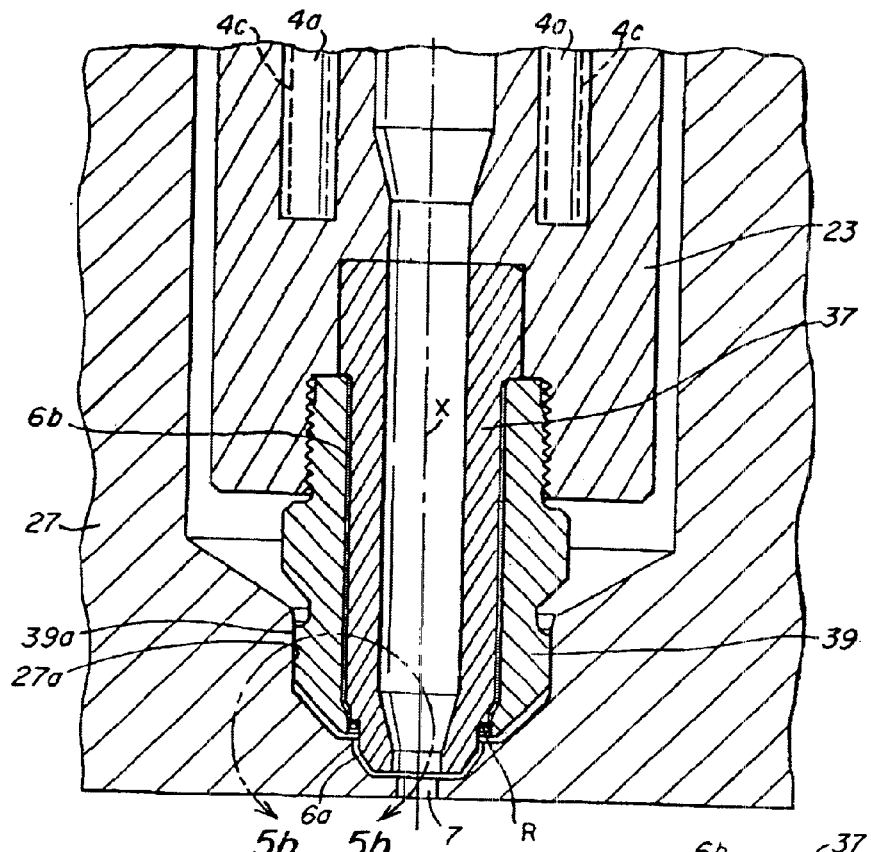
FIG. 5a is a generic view of the end of the nozzles shown in FIGS. 1–5.
Figure 5B:
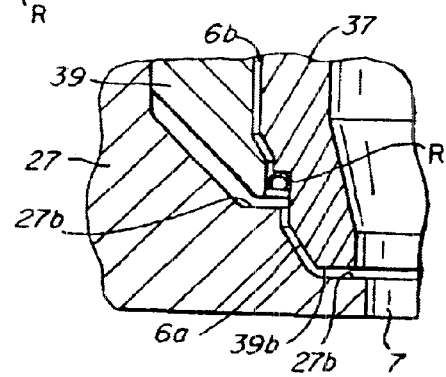

As shown in FIGS. 1–5b, the injection nozzle(s) is/are mounted within well 29 so as to be held in firmly stationary alignment with the gate(s) 7, 9 which lead into the mold cavities. The mounting of the heated nozzle(s) is/are arranged so as to minimize contact of the nozzle(s) body and its associated components with the cooled mold plate 27 but at the same time form a seal against fluid leakage back into an insulative air space in which the nozzle is disposed thus maintaining the fluid pressure within the flow bore or channel against loss of pressure due to leakage. FIGS. 5a, 5b show a more detailed schematic view of the nozzle mountings of FIGS. 1–5. As shown, there is preferably provided a small, laterally disposed, localized area 39a at the end of the nozzle for making compressed contact with a complementary surface 27a of the plate 27. This area of compressed contact acts both as a mount for maintaining the nozzle in a stationary, aligned and spaced apart from the plate 27 relationship and also as a seal against leakage of fluid back from the gate area into the insulative space 29 left between the nozzle and the mold plate 27. In the embodiment shown the mating area of the nozzle 39a is a laterally facing surface although a longitudinally facing surface may also be selected for effecting such a seal. The dimensions of the inner and outer pieces are machined so that compression mating between the laterally facing nozzle surface 39a and plate surface 27a occurs upon heating of the nozzle to its operating temperature which expands both laterally and longitudinally upon heating. The lateral mating surfaces 27a and 39a typically enables more ready machining of the parts, although compression mating between axially or longitudinally facing surfaces such as 39b and 27b can be provided for in the alternative. As shown in FIGS. 5a, 5b an insulative space 6a is also left between the most distal tip end surfaces of the nozzle and the mold such that as little direct contact as possible between the heated nozzle and the relatively cooler plate 27 is made.

Figure 13:
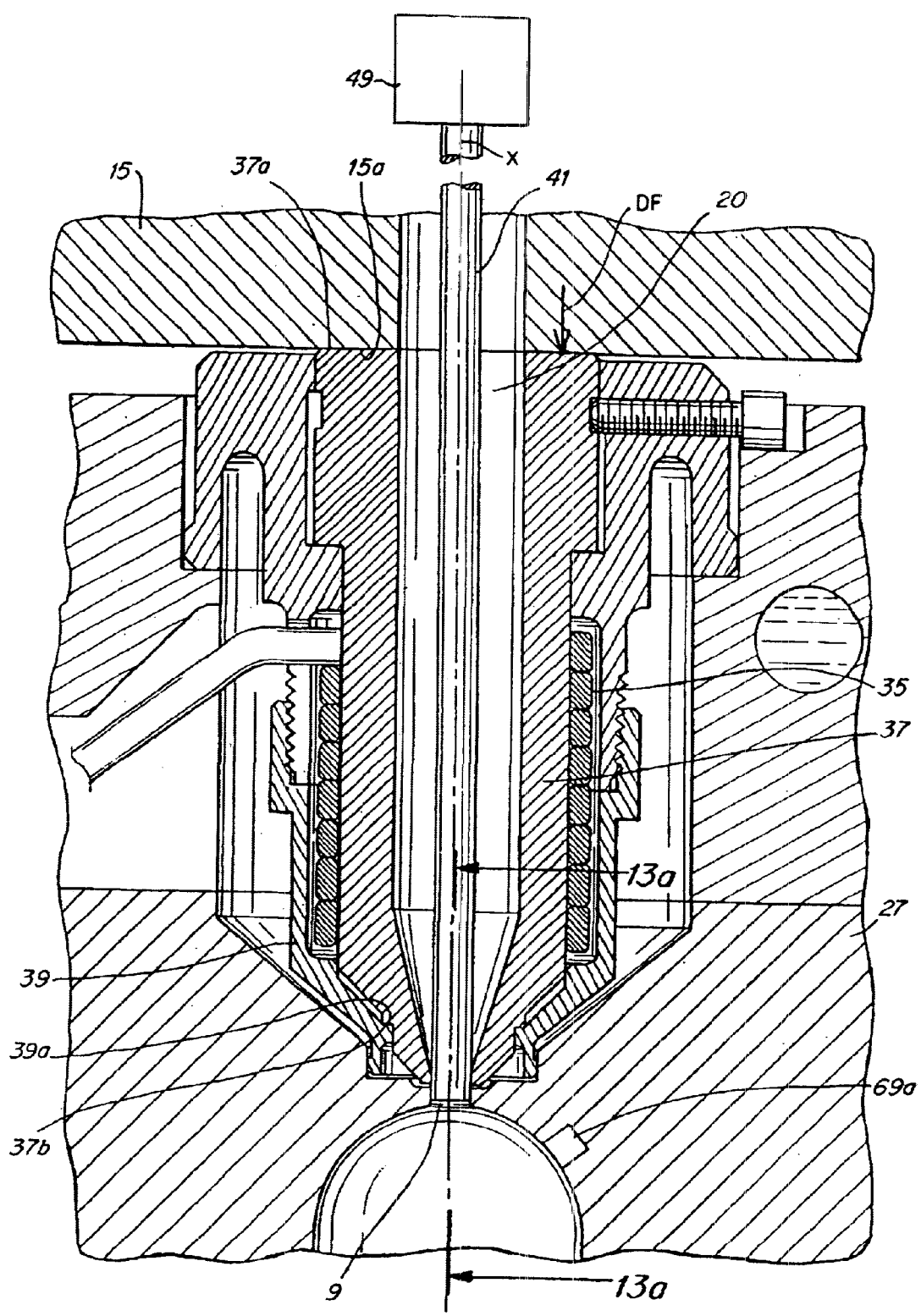
FIG. 13 is a side cross-section of the lower end of another nozzle having a straight valve pin.
Figure 13A:
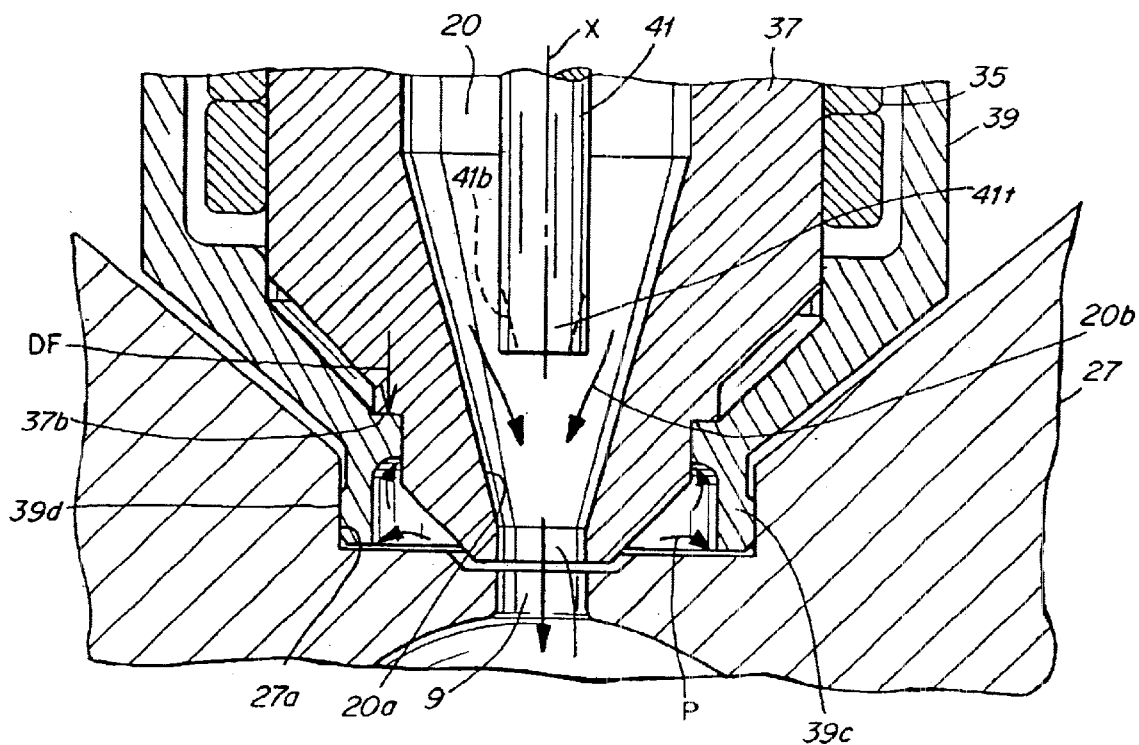
FIG. 13a is a view along lines 13a—13a of FIG. 13.

Another example of lateral surface mating upon heating of the nozzle to operating process temperature can be seen in the embodiment shown in FIGS. 13, 13a. In this elastically deformable nozzle which is described in detail in U.S. application Ser. No. 09/315,469, the disclosure of which is incorporated herein by reference, inner nozzle piece 37 is forced downwardly DF, FIGS. 13, 13a upon heating of the apparatus to operating temperature whereby the undersurface 15a of manifold 15 compresses downwardly against the upper surface 37a of piece 37 causing the undersurface of step 37b to press downwardly DF, FIG. 13a, on the upper surface 39a of piece 39 which in turn causes the leg portion 39c, FIG. 13a, to pivot P laterally and thus cause compressed mating between laterally facing surface 39d and laterally facing surface 27a of mold 27 to occur thus forming a seal against fluid leakage.

Figure 5C:
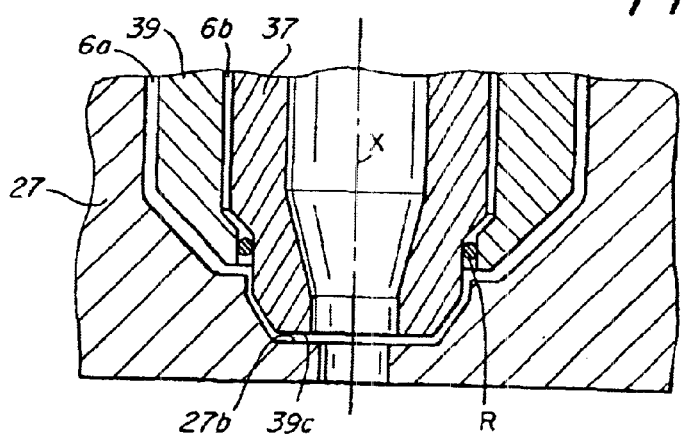
FIG. 5c is cross-sectional view of an alternative nozzle end configuration similar to the FIGS. 5a and 5b configuration.

In an alternative embodiment shown in FIG. 1c, the nozzles may be machined or configured so as to leave a predetermined gap between or a non-compressed mating between two axially or longitudinally facing surfaces 27b and 39c (in the initially assembled cold state) which gap will close upon heating the apparatus up to its operating plastic processing temperature such that the two surfaces 27b and 39c mate under compression to form a seal. As shown in FIG. 5c the insulative air gap 6a is maintained along the lateral edges of the outer piece 39 of the nozzle into which plastic melt does not flow by virtue of a seal which is formed between the surfaces 27b and 39c upon heating of the apparatus up. The same sort of longitudinal/axial seal may be formed using another alternative nozzle embodiment such as disclosed in U.S. Pat. No. 5,885,628, the disclosure of which is incorporated herein by reference, where the outer nozzle piece forms a flange like member around the center portion of the nozzle. In any case, a relatively small surface on the outside of the distal tip end of the nozzles makes compression contact with a surface of the mold plate by virtue of thermally induced expansion of the nozzles such that a seal against melt flow is formed.

The nozzles may comprise a single unitary piece or, as shown in the embodiments in FIGS. 1–5b, the nozzles 21 and 23 may comprise two (or m ore) separate unitary pieces such as insert 37 and tip 39. The insert 37 is typically made of a material (for example beryllium copper) having a relatively high thermal conductivity in order to maintain the melt at its most preferred high processing temperature as far up to the gate as possible by imparting heat to the melt from the heater 35 and/or via heat pipes as discussed below. In the embodiments shown, the outer tip piece 39 is used to form the seal with the mold plate 27 and preferably comprises a material (for example titanium alloy or stainless steel) having a substantially lower thermal conductivity relative to the material comprising the inner piece 37 so as reduce/ minimize heat transfer from the nozzle (and manifold) to the mold as much as possible.

A seal or ring R, FIGS. 5a–5c, is provided in the embodiment shown between the inner 37 and outer 39 pieces. As described in U.S. Pat. Nos. 5,554,395 and 5,885,628, the disclosures of which are incorporated herein by reference, seal/ring R serves to insulate the two nozzle pieces 37, 39 from each other minimizing heat transfer between the two pieces and also by providing an insulative air gap 6b between the two nozzle pieces. The seal R comprises a member made of a metallic alloy or like material which may be substantially less heat conductive than the material of which pieces 37, 39 are comprised. The sealing member R is preferably a thin-walled, substantially resilient structure, and may be adapted for engagement by the seal mounting means so as to be carried by the nozzle piece 39. The sealing member R extends a preselected distance outwardly from the tip portion of the bushing so as to form a sealing engagement along a limited contact area located on the adjoining bore in the mold when the nozzle is operatively disposed therein. More particularly, in one preferred embodiment, it is contemplated that the sealing member R will include at least one portion having a partially open, generally C-shaped or arc-shaped transverse cross-section. Accordingly, the sealing member R may be formed as an O-ring, or as an O-ring defining spaced, aligned openings in its surface. Similarly, the sealing member may be formed as an O-ring having an annular portion removed from its inner wall so as to form a C-shaped or arc-shaped cross-sectional structure. Further, the sealing member may have a generally V-shaped or U-shaped or other cross-section which is dimensionally compatible with the mating areas with nozzle pieces 37, 39, if desired. In addition, the sealing member may be formed as a flexible length of hollow tubing or a flexible length of material having the desired generally C-shaped or arc-shaped or V-shaped or U-shaped transverse cross-section. Other possible configurations also will occur to those skilled in the art in view of the following detailed description of the present invention.

As shown in FIG. 5a, the nozzles may include one or more heat pipes 4a embedded within the body of the nozzles for purposes of more efficiently and uniformly maintaining the nozzle at an elevated temperature. In the FIG. 5a embodiment the heat pipes 4a are disposed in the nozzle body part 23 which typically comprises a high strength tool steel which has a predetermined high heat conductivity and strength. The heat pipes 4 mounted in the manifold, FIGS. 2, 3 and heat pipes 4a, FIG. 5a, preferably comprise sealed tubes comprised of copper or steel within which any vaporizable and condensable liquid such as water is enclosed. Mercury may be used as the vaporizable heat transferring medium in the heat pipes 4, 4a, however, it is more preferable to use an inert liquid material such as water. One drawback to the use of water is that there can be a tendency for a reaction to occur between the iron in the steel and the water whereby the iron combines with the oxygen of the water leaving a residue of hydrogen which is an incondensable gas under the conditions of operation of the heat pipe. The presence of hydrogen in the heat pipe is deleterious to its effective operation. For the purposes of this invention any material, such as iron or an alloy of iron, which tends to release hydrogen from water is referred to as "water incompatible material."

The use of high strength steel is made practicable by plating or otherwise covering the interior wall of each heat pipe with a material which is non-reactive with water. Examples of such materials are nickel, copper, and alloys of nickel and copper, such as monel. Such materials are referred to herein as "water compatible materials." The inner wall of each heat pipe 4, 4a is preferably plated with a water compatible material, preferably nickel. Such plating is preferably made thick enough to be impermeable to water and water vapor. A wick structure 4c is inserted into each heat pipe, the wick typically comprising a water compatible cylindrical metal screen which is forced into and tightly pressed against the interior wall of a heat pipe. The wick preferably comprises a water compatible material such as monel. The elevated temperature at which the manifold and/or nozzles are maintained during an injection cycle typically ranges between about 200 and about 400 degrees centigrade. The vapor pressure of water at these temperatures, although quite high, is readily and safely contained with the enclosed tubular heat pipes. In practice, less than the total volume of the enclosed heat pipes is filled with the selected fluid, typically less than about 70% of such volume, and more typically less than 50%. Following the insertion of the water, the outer end of each heat pipe is sealed by conventional means. In a preferred embodiment the tubular heat pipes are sealed at one end via a plug as described in U.S. Pat. No. 4,389,002, the disclosure of which is incorporated herein by reference. In operation, the fluid contained within the heat pipes 4, 4a is vaporized by heat conduction from the manifold. The fluid vaporizes and travels to each portion of the heat pipe from which heat is being extracted and the vapor condenses at each such portion to yield up its heat of condensation to maintain the entire length of the heat pipe at the same temperature. The vaporization of water from the inner end of the wick structure 4c creates a capillary attraction to draw condensed water from the rest of the wick structure back to the evaporator portion of the wick thus completing the cycle of water flow to maintain the heat pipe action. Where a plurality of heat pipes are disposed around the nozzle, there is maintained a uniform temperature around the axis X of the nozzle bores, particularly in embodiments where the heat pipes are disposed longitudinally as close to the exit end of the nozzle as possible.

In one embodiment, FIGS. 1–5, a valve pin 41 having a tapered head 43 controllably engagable with a surface upstream of the exit end of the nozzle may be used to control the rate of flow of the melt material to and through the respective gates 7 and 9. The valve pin reciprocates through the flow channel 100 in the manifold 15. A valve pin bushing 44 is provided to prevent melt from leaking along stem 102 of the valve pin. The valve pin bushing is held in place by a threadably mounted cap 46. The valve pin is opened at the beginning of the injection cycle and closed at the end of the cycle. During the cycle, the valve pin can assume intermediate positions between the fully open and closed positions, in order to decrease or increase the rate of flow of the melt. The head includes a tapered portion 45 that forms a gap 81 with a surface 47 of the bore 19 of the manifold. Increasing or decreasing the size of the gap by displacing the valve pin correspondingly increases or decreases the flow of melt material to the gate. When the valve pin is closed the tapered portion 45 of the valve pin head contacts and seals with the surface 47 of the bore of the manifold.

FIG. 2 shows the head of the valve pin in a Phantom dashed line in the closed position and a solid line in the fully opened position in which the melt is permitted to flow at a maximum rate. To reduce the flow of melt, the pin is retracted away from the gate by an actuator 49, to thereby decrease the width of the gap 81 between the valve pin and the bore 19 of the manifold.

The actuator 49 (for example, the type disclosed in application Ser. No. 08/874,962, the disclosure of which is incorporated herein by reference) is mounted in a clamp plate 51 which covers the injection molding system 1. In the embodiment shown, the actuator 49 is a hydraulic actuator, however, pneumatic or electronic actuators can also be used. Other actuator configurations having ready detachability may also be employed such as those described in U.S. application Ser. Nos. 08/972,277 and 09/081,360 and PCT application US99/11391, the disclosures of all of which are incorporated herein by reference. An electronic or electrically powered actuator may also be employed such as disclosed in U.S. application Ser. No. 09/187,974, the disclosure of which is incorporated herein by reference. In the embodiment shown, the actuator 49 includes a hydraulic circuit that includes a movable piston 53 in which the valve pin 41 is threadably mounted at 55. Thus, as the piston 53 moves, the valve pin 41 moves with it. The actuator 49 includes hydraulic lines 57 and 59 which are controlled by servo valves 1 and 2. Hydraulic line 57 is energized to move the valve pin 41 toward the gate to the open position, and hydraulic line 59 is energized to retract the valve pin away from the gate toward the close position. An actuator cap 61 limits longitudinal movement in the vertical direction of the piston 53. O-rings 63 provide respective seals to prevent hydraulic fluid from leaking out of the actuator. The actuator body 65 is mounted to the manifold via screws 67.

In embodiments where a pneumatically or electrically powered actuator is employed, suitable pneumatic (air supply) or electrical power inputs to the actuator are provided, such inputs being controllable to precisely control the movement of the actuator via the same computer generated signals which are output from the PID1 and PID2 controllers and the same or similar control algorithm/program used in the CPU of FIG. 1 such that precise control of the movement of the valve pin used to control plastic flow is achieved according to the predetermined algorithm selected for the particular application.

In the embodiment shown, a pressure transducer 69 is used to sense the pressure in the manifold bore 19 downstream of the valve pin head 43. In operation, the conditions sensed by the pressure transducer 69 associated with each nozzle are fed back to a control system that includes controllers PID 1 and PID 2 and a CPU shown schematically in FIG. 1. The CPU executes a PID (proportional, integral, derivative) algorithm which compares the sensed pressure (at a given time) from the pressure transducer to a programmed target pressure (for the given time). The CPU instructs the PID controller to adjust the valve pin using the actuator 49 in order to mirror the target pressure for that given time. In this way a programmed target pressure profile for an injection cycle for a particular part for each gate 7 and 9 can be followed.

As to each separate nozzle, the target pressure or pressure profile may be different, particularly where the nozzles are injecting into separate cavities, and thus separate algorithms or programs for achieving the target pressures at each nozzle may be employed. As can be readily imagined, a single computer or CPU may be used to execute multiple programs/algorithms for each nozzle or separate computers may be utilized. The embodiment shown in FIG. 1 is shown for purposes of ease of explanation.

Although in the disclosed embodiment the sensed condition is pressure, other sensed conditions can be used which relate to melt flow rate. For example, the position of the valve pin or the load on the valve pin could be the sensed condition. If so, a position sensor or load sensor, respectively, could be used to feed back the sensed condition to the PID controller. In the same manner as explained above, the CPU would use a PID algorithm to compare the sensed condition to a programmed target position profile or load profile for the particular gate to the mold cavity, and adjust the valve pin 5 accordingly. Similarly the location of the sensor and the sensed condition may be other than in the nozzle itself. The location of the measurement may, for example, be somewhere in the cavity of the mold or upstream of the nozzle somewhere in the manifold flow channel or even further upstream in the melt flow.

Melt flow rate is directly related to the pressure sensed in bore 19. Thus, using the controllers PID 1 and PID 2, the rate at which the melt flows into the gates 7 and 9 can be adjusted during a given injection molding cycle, according to the desired pressure profile. The pressure (and rate of melt flow) is decreased by retracting the valve pin and decreasing the width of the gap 81 between the valve pin and the manifold bore, while the pressure (and rate of melt flow) is increased by displacing the valve pin toward the gate 9, and increasing the width of the gap 81. The PID controllers adjust the position of the actuator piston 51 by sending instructions to servo valves 1 and 2.

By controlling the pressure in a single cavity system (as shown in FIG. 1) it is possible to adjust the location and shape of the weld line formed when melt flow 75 from gate 7 meets melt flow 77 from gate 9 as disclosed in U.S. Pat. No. 5,556,582.

However, the invention also is useful in a multi-cavity system. In a multi-cavity system the invention can be used to balance fill rates and packing profiles in the respective cavities. This is useful, for example, when molding a plurality of like parts in different cavities. In such a system, to achieve a uniformity in the parts, the fill rates and packing profiles of the cavities should be as close to identical as possible. Using the same programmed pressure profile for each nozzle, unpredictable fill rate variations from cavity to cavity are overcome, and consistently uniform parts are produced from each cavity.

Another advantage of the present invention is seen in a multi-cavity system in which the nozzles are injecting into cavities which form different sized parts that require different fill rates and packing profiles. In this case, different pressure profiles can be programmed for each respective controller of each respective cavity. Still another advantage is when the size of the cavity is constantly changing, i.e., when making different size parts by changing a mold insert in which the part is formed. Rather than change the hardware (e.g., the nozzle) involved in order to change the fill rate and packing profile for the new part, a new program is chosen by the user corresponding to the new part to be formed.

The embodiment of FIGS. 1 and 2 has the advantage of controlling the rate of melt flow away from the gate inside manifold 15 rather than at the gates 7 and 9. Controlling the melt flow away from the gate enables the pressure transducer to be located away from the gate (in FIGS. 1–5). In this way, the pressure transducer does not have to be placed inside the mold cavity, and is not susceptible to pressure spikes which can occur when the pressure transducer is located in the mold cavity or near the gate. Pressure spikes in the mold cavity result from the valve pin being closed at the gate. This pressure spike could cause an unintended response from the control system, for example, an opening of the valve pin to reduce the pressure—when the valve pin should be closed.

Avoidance of the effects of a pressure spike resulting from closing the gate to the mold makes the control system behave more accurately and predictably. Controlling flow away from the gate enables accurate control using only a single sensed condition (e.g., pressure) as a variable. The '582 patent disclosed the use of two sensed conditions (valve position and pressure) to compensate for an unintended response from the pressure spike. Sensing two conditions resulted in a more complex control algorithm (which used two variables) and more complicated hardware (pressure and position sensors).

Another advantage of controlling the melt flow away from the gate is the use of a larger valve pin head 43 than would be used if the valve pin closed at the gate. A larger valve pin head can be used because it is disposed in the manifold in which the melt flow bore 19 can be made larger to accommodate the larger valve pin head. It is generally undesirable to accommodate a large size valve pin head in the gate area within the end of the nozzle 23, tip 39 and insert 37. This is because the increased size of the nozzle, tip and insert in the gate area could interfere with the construction of the mold, for example, the placement of water lines within the mold which are preferably located close to the gate. Thus, a larger valve pin head can be accommodated away from the gate.

The use of a larger valve pin head enables the use of a larger surface 45 on the valve pin head and a larger surface 47 on the bore to form the control gap 81. The more "control" surface (45 and 47) and the longer the "control" gap (81)—the more precise control of the melt flow rate and pressure can be obtained because the rate of change of melt flow per movement of the valve pin is less. In FIGS. 1–3 the size of the gap and the rate of melt flow is adjusted by adjusting the width of the gap, however, adjusting the size of the gap and the rate of material flow can also be accomplished by changing the length of the gap, i.e., the longer the gap the more flow is restricted. Thus, changing the size of the gap and controlling the rate of material flow can be accomplished by changing the length or width of the gap.

The valve pin head includes a middle section 83 and a forward cone shaped section 95 which tapers from the middle section to a point 85. This shape assists in facilitating uniform melt flow when the melt flows past the control gap 81. The shape of the valve pin also helps eliminates dead spots in the melt flow downstream of the gap 81.

FIG. 3 shows another aspect in which a plug 87 is inserted in the manifold 15 and held in place by a cap 89. A dowel 86 keeps the plug from rotating in the recess of the manifold that the plug is mounted. The plug enables easy removal of the valve pin 41 without disassembling the manifold, nozzles and mold. When the plug is removed from the manifold, the valve pin can be pulled out of the manifold where the plug was seated since the diameter of the recess in the manifold that the plug was in is greater than the diameter of the valve pin head at its widest point. Thus, the valve pin can be easily replaced without significant downtime.

FIGS. 4 and 5 show additional alternative embodiments of the invention in which a threaded nozzle style is used instead of a support ring nozzle style. In the threaded nozzle style, the nozzle 23 is threaded directly into manifold 15 via threads 91. Also, a coil heater 93 is used instead of the band heater shown in FIGS. 1–3. The threaded nozzle style is advantageous in that it permits removal of the manifold and nozzles (21 and 23) as a unitary element. There is also less of a possibility of melt leakage where the nozzle is threaded on the manifold. The support ring style (FIGS. 13) is advantageous in that one does not need to wait for the manifold to cool in order to separate the manifold from the nozzles. FIG. 5 also shows the use of the plug 87 for convenient removal of valve pin 41.

Figure 6:
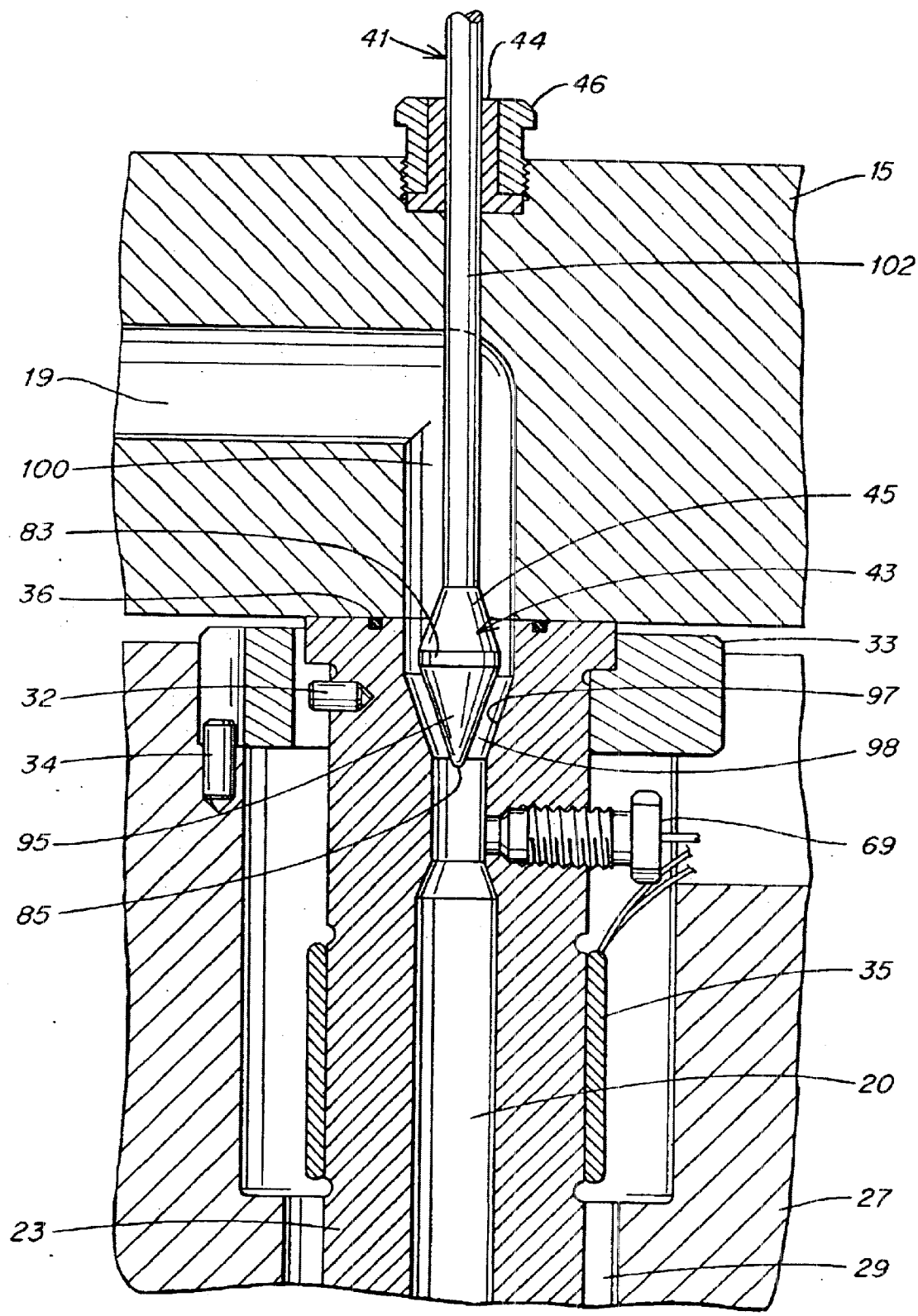
FIG. 6 shows a fragmentary cross-sectional view of a system similar to FIG. 1, showing an alternative embodiment in which a forward valve pin shut-off is used.
Figure 7:
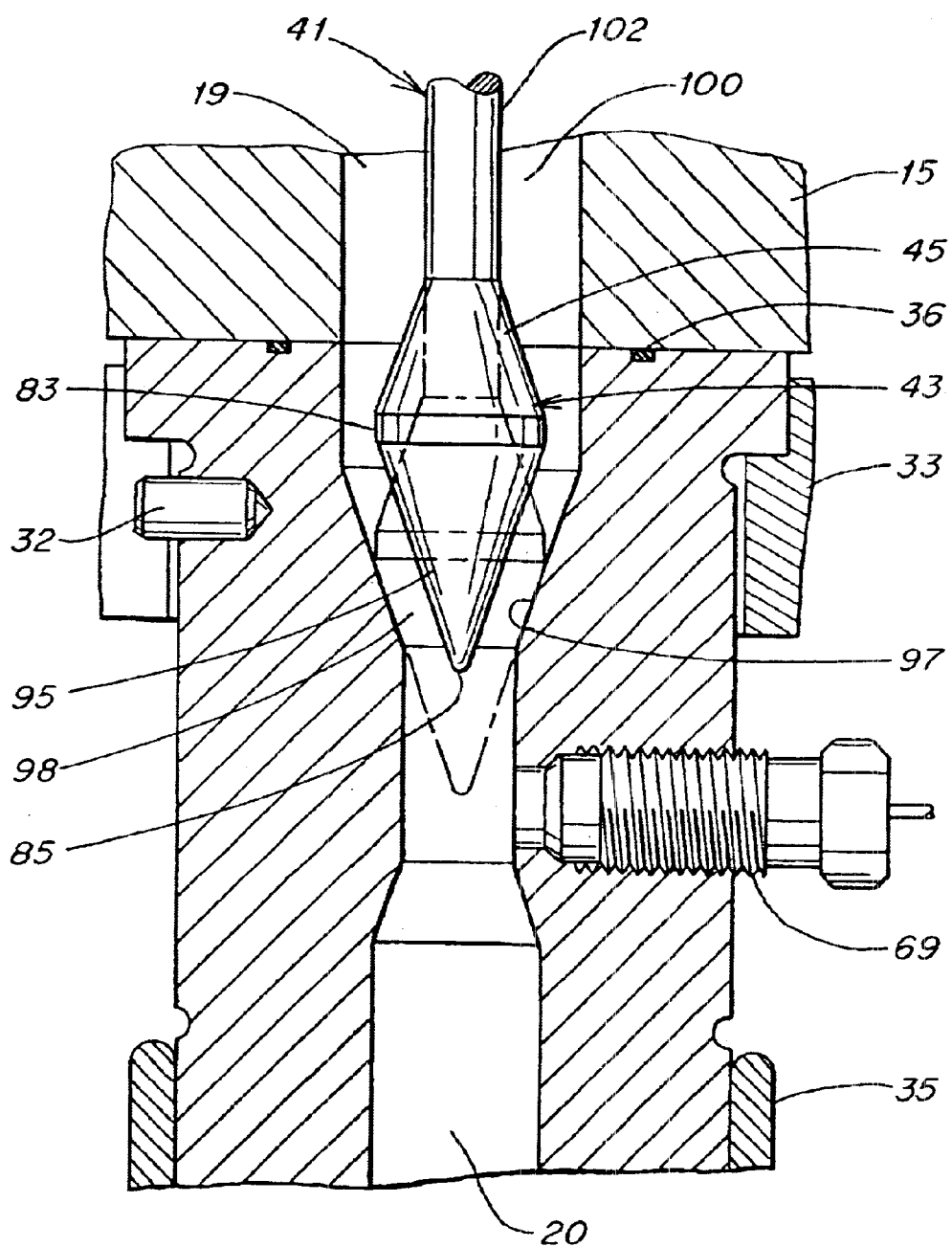
FIG. 7 shows an enlarged fragmentary view of the embodiment of FIG. 6, showing the valve pin in the open and closed positions, respectively.

FIGS. 6–10 show an alternative embodiment of the invention in which a "forward" shutoff is used rather than a retracted shutoff as shown in FIGS. 1–5. In the embodiment of FIGS. 6 and 7, the forward cone-shaped tapered portion 95 of the valve pin head 43 is used to control the flow of melt with surface 97 of the inner bore 20 of nozzle 23. An advantage of this arrangement is that the valve pin stem 102 does not restrict the flow of melt as in FIGS. 1–5. As seen in FIGS. 1–5, the clearance 100 between the stem 102 and the bore 19 of the manifold is not as great as the clearance 100 in FIGS. 6 and 7. The increased clearance 100 in FIGS. 6–7 results in a lesser pressure drop and less shear on the plastic.

In FIGS. 6 and 7 the control gap 98 is formed by the front cone-shaped portion 95 and the surface 97 of the bore 20 of the rear end of the nozzle 23. The pressure transducer 69 is located downstream of the control gap—thus, in FIGS. 6 and 7, the nozzle is machined to accommodate the pressure transducer as opposed to the pressure transducer being mounted in the manifold as in FIGS. 1–5.

FIG. 7 shows the valve pin in solid lines in the open position and Phantom dashed lines in the closed position. To restrict the melt flow and thereby reduce the melt pressure, the valve pin is moved forward from the open position towards surface 97 of the bore 20 of the nozzle which reduces the width of the control gap 98. To increase the flow of melt the valve pin is retracted to increase the size of the gap 98.

The rear 45 of the valve pin head 43 remains tapered at an angle from the stem 102 of the valve pin 41. Although the surface 45 performs no sealing function in this embodiment, it is still tapered from the stem to facilitate even melt flow and reduce dead spots.

As in FIGS. 1–5, pressure readings are fed back to the control system (CPU and PID controller), which can accordingly adjust the position of the valve pin 41 to follow a target pressure profile. The forward shut-off arrangement shown in FIGS. 6 and 7 also has the advantages of the embodiment shown in FIGS. 1–5 in that a large valve pin head 43 is used to create a long control gap 98 and a large control surface 97. As stated above, a longer control gap and greater control surface provides more precise control of the pressure and melt flow rate.

Figure 8:
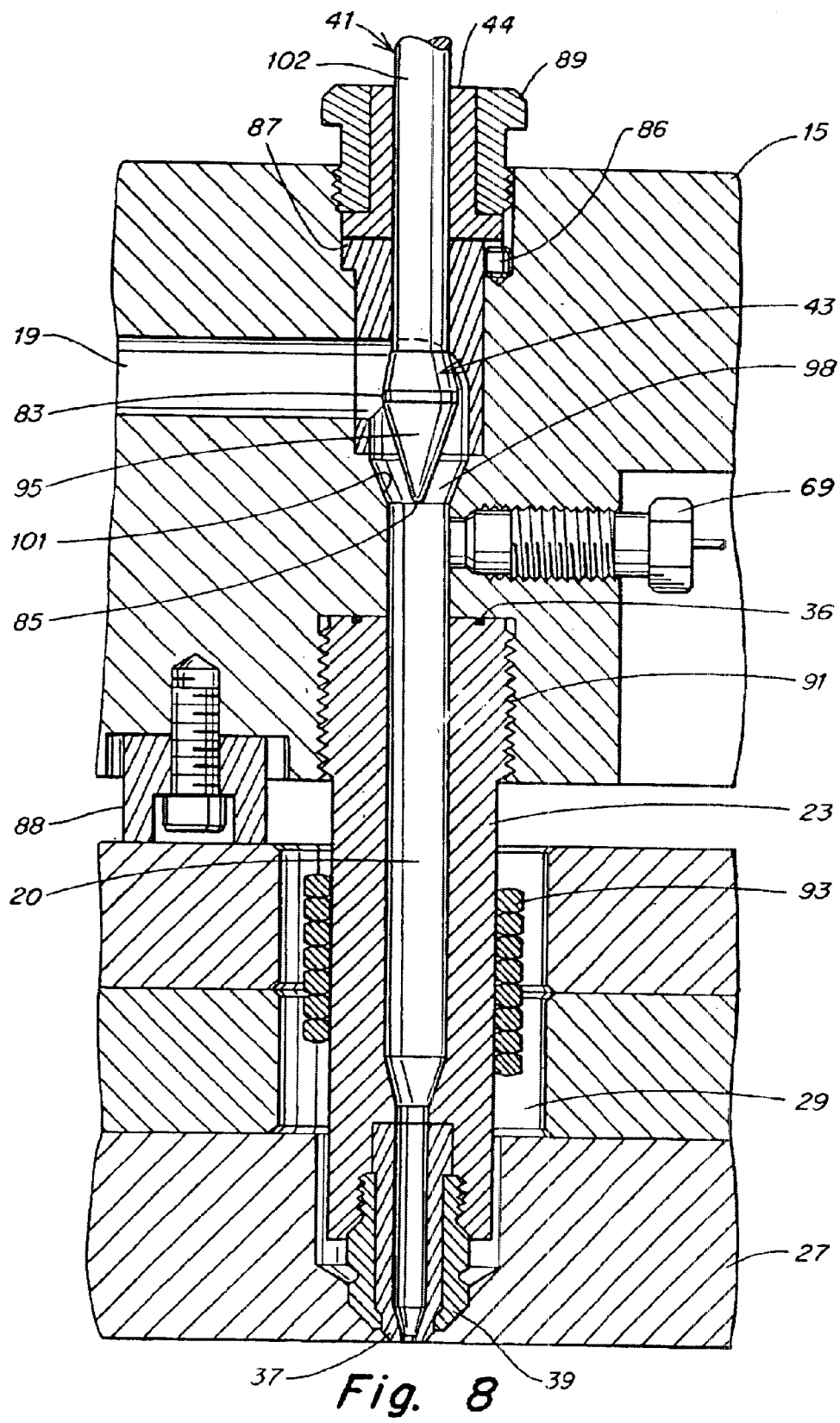
FIG. 8 is a cross-sectional view of an alternative embodiment of the present invention similar to FIG. 6, in which a threaded nozzle is used with a plug for easy removal of the valve pin.
Figure 9:
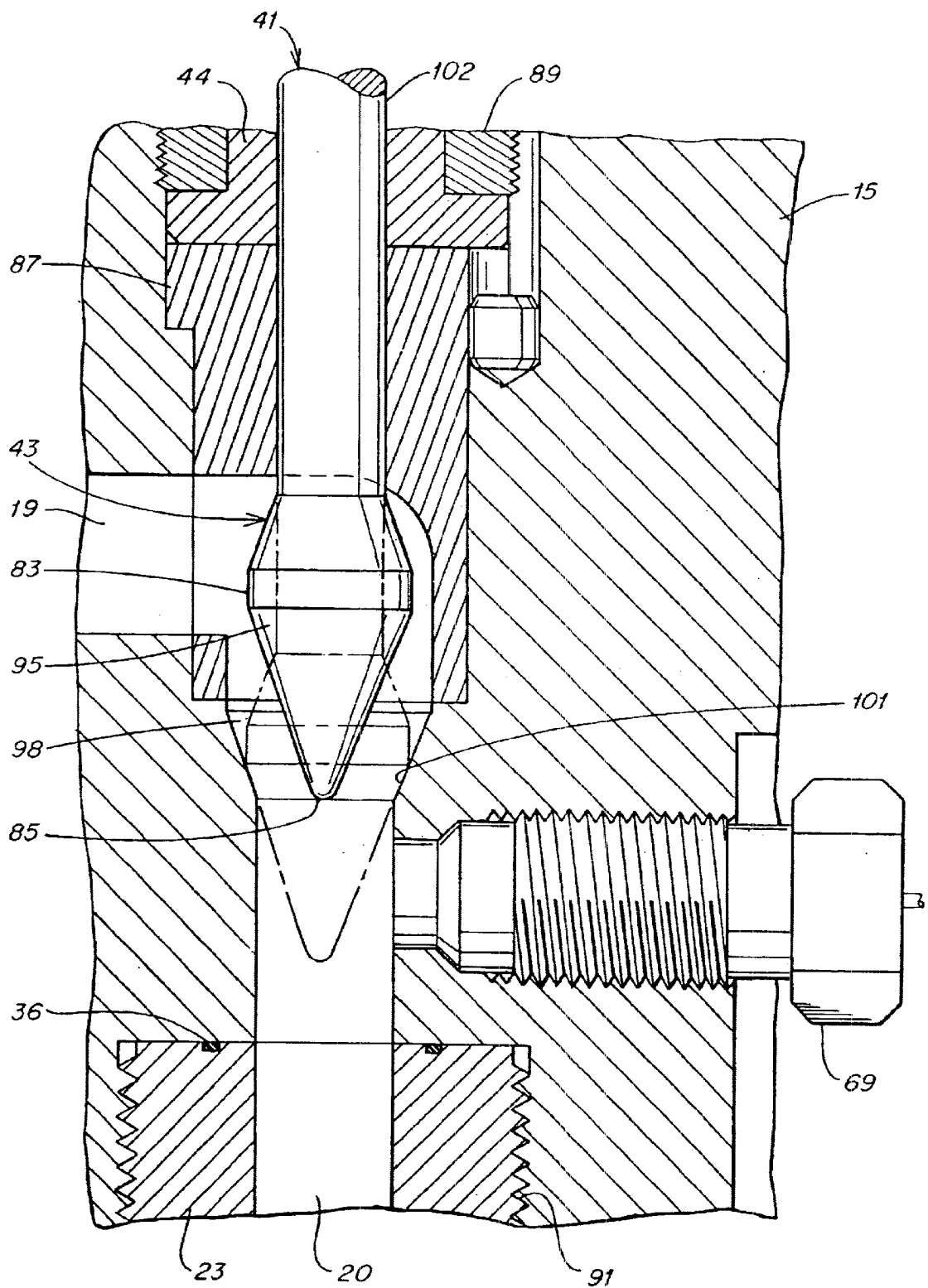
FIG. 9 is an enlarged fragmentary view of the embodiment of FIG. 8, in which the valve pin is shown in the open and closed positions.

FIGS. 8 and 9 show a forward shutoff arrangement similar to FIGS. 6 and 7, but instead of shutting off at the rear of the nozzle 23, the shut-off is located in the manifold at surface 101. Thus, in the embodiment shown in FIGS. 8 and 9, a conventional threaded nozzle 23 may be used with a manifold 15, since the manifold is machined to accommodate the pressure transducer 69 as in FIGS. 1–5. A spacer 88 is provided to insulate the manifold from the mold. This embodiment also includes a plug 87 for easy removal of the valve pin head 43.

Figure 10:
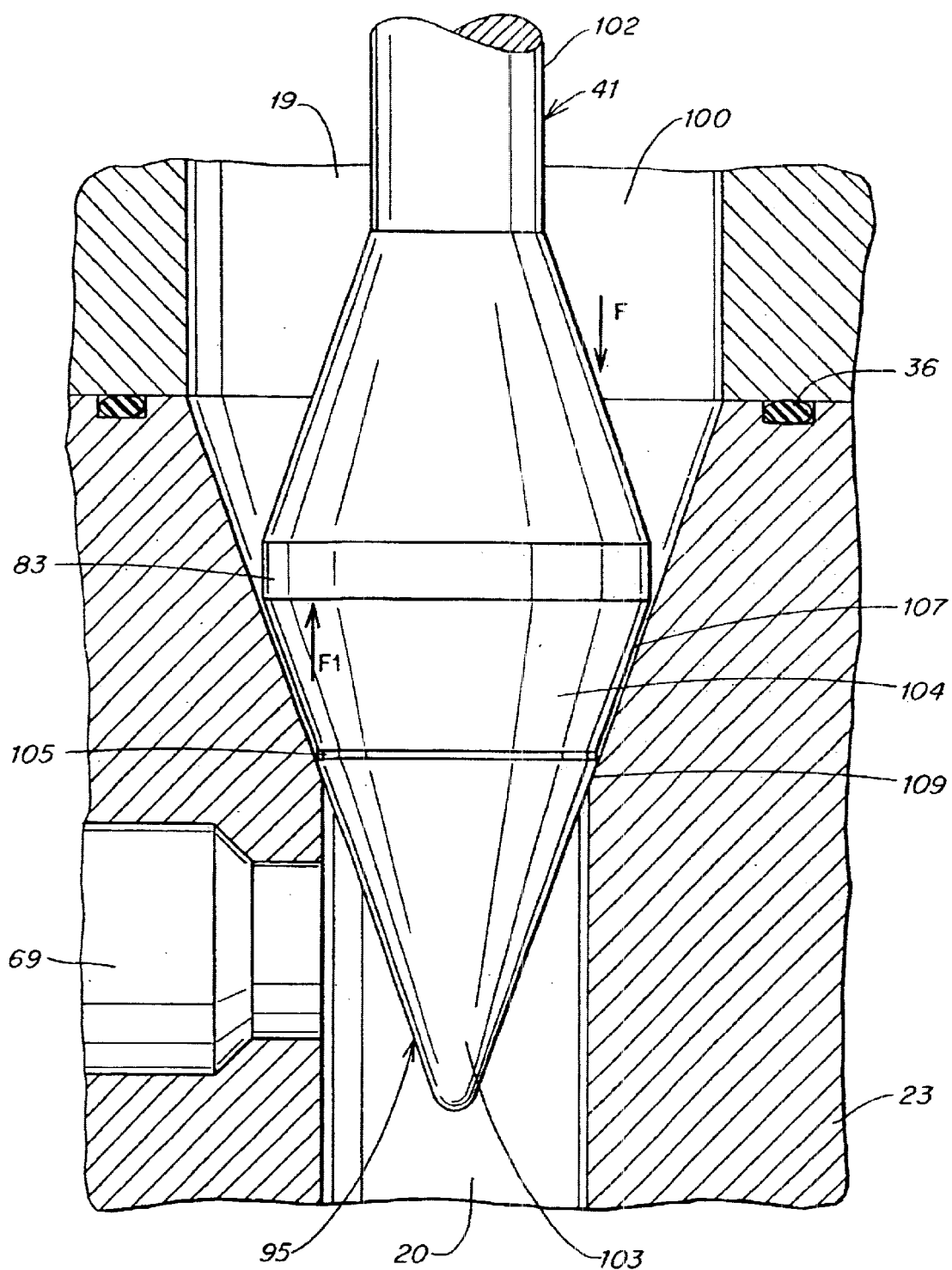
FIG. 10 is an enlarged view of an alternative embodiment of the valve pin, shown in the closed position.

FIG. 10 shows an alternative embodiment of the invention in which a forward shutoff valve pin head is shown as used in FIGS. 6–9. However, in this embodiment, the forward cone-shaped taper 95 on the valve pin includes a raised section 103 and a recessed section 104. Ridge 105 shows where the raised portion begins and the recessed section ends. Thus, a gap 107 remains between the bore 20 of the nozzle through which the melt flows and the surface of the valve pin head when the valve pin is in the closed position. Thus, a much smaller surface 109 is used to seal and close the valve pin. The gap 107 has the advantage in that it assists opening of the valve pin which is subjected to a substantial force F from the melt when the injection machine begins an injection cycle. When injection begins melt will flow into gap 107 and provide a force component F1 that assists the actuator in retracting and opening the valve pin. Thus, a smaller actuator, or the same actuator with less hydraulic pressure applied, can be used because it does not need to generate as much force in retracting the valve pin. Further, the stress forces on the head of the valve pin are reduced.

Despite the fact that the gap 107 performs no sealing function, its width is small enough to act as a control gap when the valve pin is open and correspondingly adjust the melt flow pressure with precision as in the embodiments of FIGS. 1–9.

Figure 11:
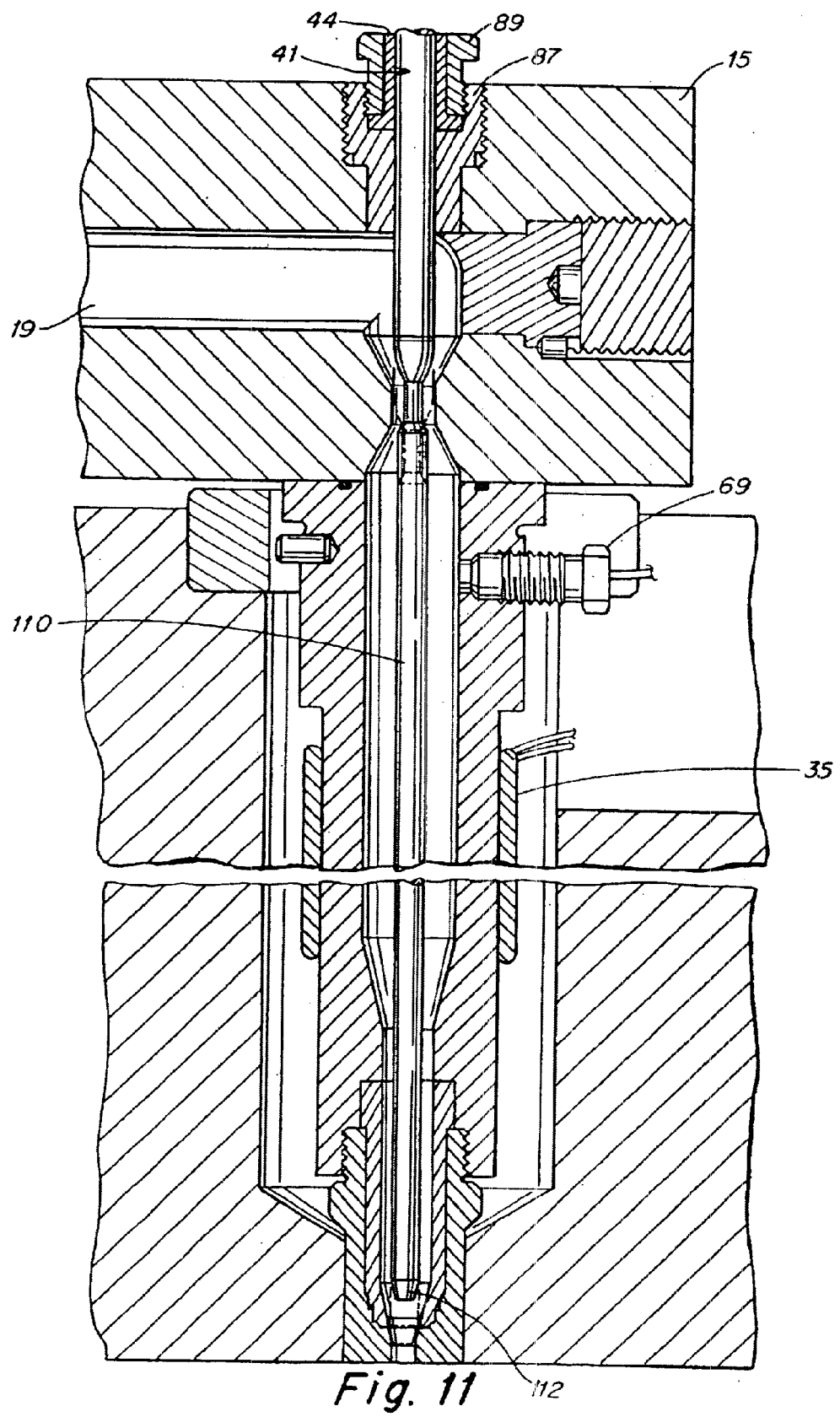
FIG. 11 is a fragmentary cross sectional view of an alternative embodiment of an injection molding system having flow control that includes a valve pin that extends to the gate.
Figure 12:
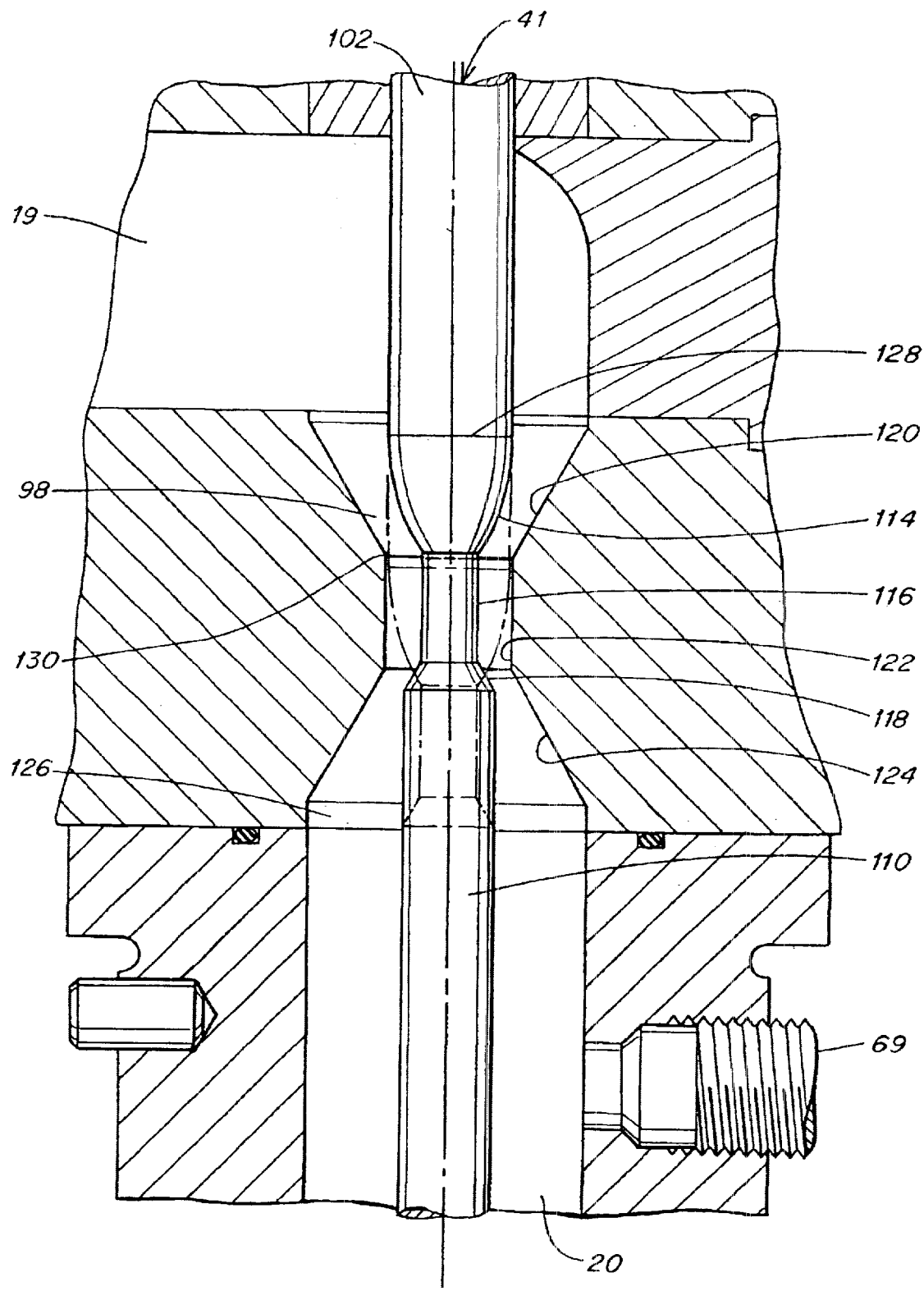
FIG. 12 is an enlarged fragmentary cross-sectional detail of the flow control area.

FIGS. 11 and 12 show an alternative hot-runner system having flow control in which the control of melt flow is still away from the gate as in previous embodiments. Use of the pressure transducer 69 and PID control system is the same as in previous embodiments. In this embodiment, however, the valve pin 41 extends past the area of flow control via extension 110 to the gate. The valve pin is shown in solid lines in the fully open position and in Phantom dashed lines in the closed position. In addition to the flow control advantages away from the gate described above, the extended valve pin has the advantage of shutting off flow at the gate with a tapered end 112 of the valve pin 41.

Extending the valve pin to close the gate has several advantages. First, it shortens injection cycle time. In previous embodiments thermal gating is used. In thermal gating, plastication does not begin until the part from the previous cycle is ejected from the cavity. This prevents material from exiting the gate when the part is being ejected. When using a valve pin, however, plastication can be performed simultaneously with the opening of the mold when the valve pin is closed, thus shortening cycle time by beginning plastication sooner. Using a valve pin can also result in a smoother gate surface on the part.

The flow control area is shown enlarged in FIG. 12. In solid lines the valve pin is shown in the fully open position in which maximum melt flow is permitted. The valve pin includes a convex surface 114 that tapers from edge 128 of the stem 102 of the valve pin 41 to a throat area 116 of reduced diameter. From throat area 116, the valve pin expands in diameter in section 118 to the extension 110 which extends in a uniform diameter to the tapered end of the valve pin.

In the flow control area the manifold includes a first section defined by a surface 120 that tapers to a section of reduced diameter defined by surface 122. From the section of reduced diameter the manifold channel then expands in diameter in a section defined by surface 124 to an outlet of the manifold 126 that communicates with the bore of the nozzle 20. FIGS. 11 and 12 show the support ring style nozzle similar to FIGS. 1–3. However, other types of nozzles may be used such as, for example, a threaded nozzle as shown in FIG. 8.

As stated above, the valve pin is shown in the fully opened position in solid lines. In FIG. 12, flow control is achieved and melt flow reduced by moving the valve pin 41 forward toward the gate thereby reducing the width of the control gap 98. Thus, surface 114 approaches surface 120 of the manifold to reduce the width of the control gap and reduce the rate of melt flow through the manifold to the gate.

To prevent melt flow from the manifold bore 19, and end the injection cycle, the valve pin is moved forward so that edge 128 of the valve pin, i.e., where the stem 102 meets the beginning of curved surface 114, will move past point 130 which is the beginning of surface 122 that defines the section of reduced diameter of the manifold bore 19. When edge 128 extends past point 130 of the manifold bore melt flow is prevented since the surface of the valve stem 102 seals with surface 122 of the manifold. The valve pin is shown in dashed lines where edge 128 is forward enough to form a seal with surface 122. At this position, however, the valve pin is not yet closed at the gate. To close the gate the valve pin moves further forward, with the surface of the stem 102 moving further along, and continuing to seal with, surface 122 of the manifold until the end 112 of the valve pin closes with the gate.

In this way, the valve pin does not need to be machined to close the gate and the flow bore 19 of the manifold simultaneously, since stem 102 forms a seal with surface 122 before the gate is closed. Further, because the valve pin is closed after the seal is formed in the manifold, the valve pin closure will not create any unwanted pressure spikes. Likewise, when the valve pin is opened at the gate, the end 112 of the valve pin will not interfere with melt flow, since once the valve pin is retracted enough to permit melt flow through gap 98, the valve pin end 112 is a predetermined distance from the gate. The valve pin can, for example, travel 6 mm. from the fully open position to where a seal is first created between stem 102 and surface 122, and another 6 mm. to close the gate. Thus, the valve pin would have 12 mm. of travel, 6 mm. for flow control, and 6 mm. with the flow prevented to close the gate. Of course, the invention is not limited to this range of travel for the valve pin, and other dimensions can be used.

FIGS. 13 and 13a show a nozzle having a conventional straight cylindrical pin 41 which may be used as an alternative in conjunction with the automated systems described above. For example, pressure may be measured in the cavity itself by a sensor 69a and a program utilized in CPU, FIG. 1 which simply opens, FIG. 13a, and closes, FIG. 13 the exit aperture or gate 9 upon sensing of a certain pressure so as to create certain pressure increase in the cavity when closed, or alternatively the tip end of the pin 41 a may be tapered (tapering shown in dashed lines 41b) in some fashion so as to vary the melt flow rate 20b, in accordance with a predetermined program depending on the sensor measurement 69a, as the pin 41 is moved into a predetermined closer proximity to the tip end surface 20a of bore 20 (complementary tapering of surface 20a not shown) in a similar manner to the way the rate of melt flow may be varied using the tapered conical head 45 of the FIGS. 2–5 embodiments.

Figure 14:
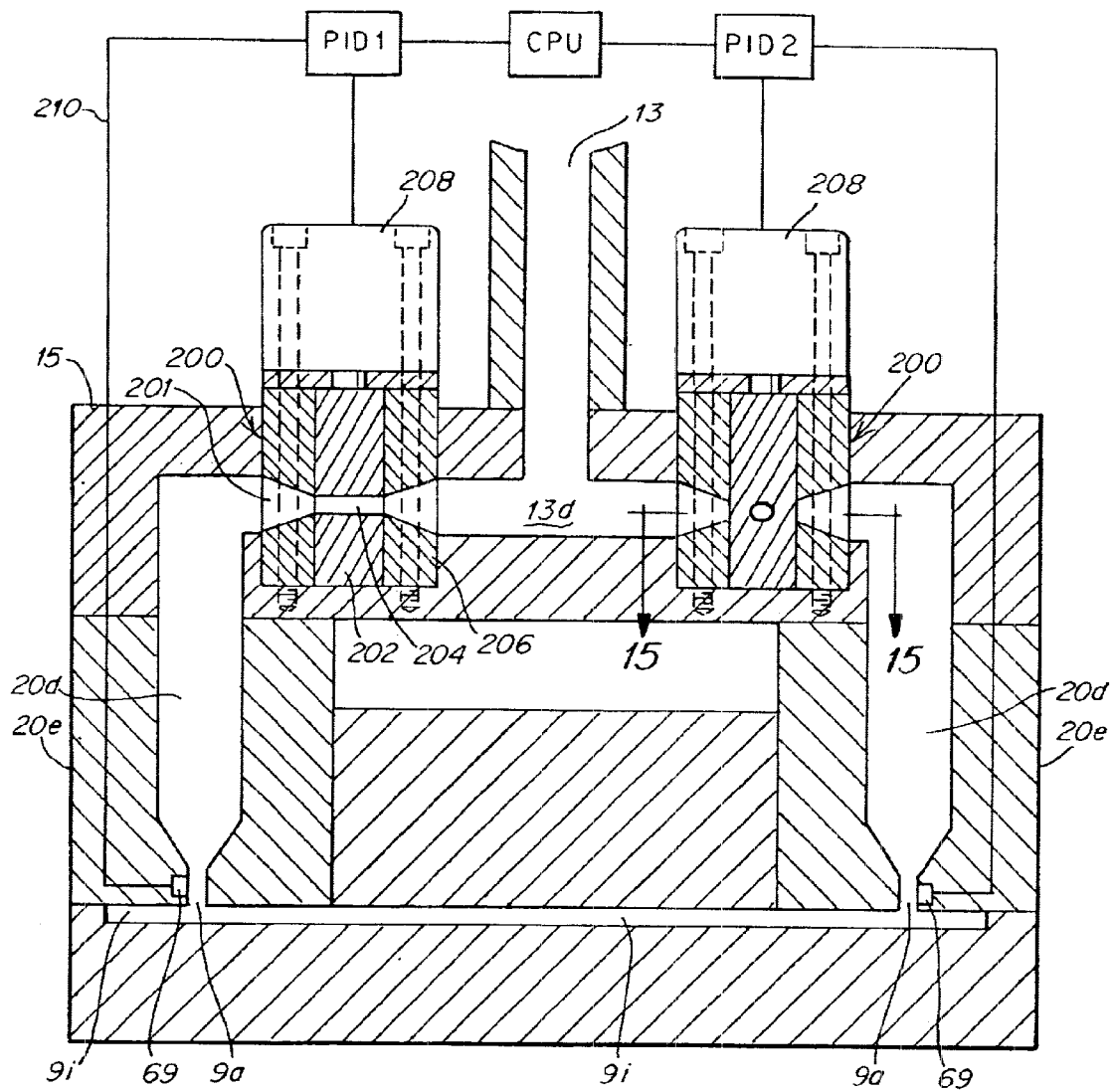
FIG. 14 is a schematic side cross-sectional view of a sensor monitored injection molding system having rotary valves disposed in the manifold flow channels for controlling melt flow into a mold cavity.
Figure 15:
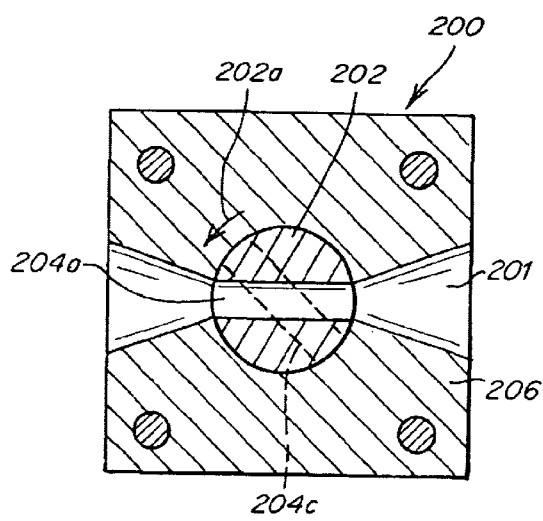
FIG. 15 is a top cross sectional view of one of rotary valves of FIG. 14 along lines 15—15 showing the rotary valve in a shut off position.

FIGS. 14–20 show an embodiment of the invention using rotary valves 200 as a mechanical component for controlling melt flow from a main feed channel 13 and common manifold feed channel 13d disposed in manifold 15 to a pair of down drop bores or nozzles 20d and exit apertures 9a in housings 20e which lead into cavity 9i. As shown, the rotary valves 200 comprise a rotatable shaft 202 having a melt passageway 204, the shaft being rotatably mounted in outer bearing housings 206. As shown the outer bearings 206 have a converging/diverging passageway 201 to match the inner shaft passageway 204. The rotary shaft 202 is rotatably drivable by its interconnection to actuator 208 which may comprise an electrically, pneumatically, hydraulically or mechanically powered mechanism which is typically mechanically interconnected to shaft 202. Automatic control of the actuators is effected in the same manner as described above via CPU and PID1 and PID2 controllers wherein signals are sent 210 from sensors 69 to the PID controllers and processed via CPU which, according to a predetermined algorithm signals the PID controllers to instruct actuators 208 to adjust the rotation of passageways 204 so as to vary the rate of melt flow through passageways 204 to achieve the predetermined target pressure or pressure profile at the position of sensors 69. Melt flow through passageways 204 can be precisely varied depending on the position of rotation of shaft 202 within bearings 206. As shown in FIG. 15, passageway 204c in the position shown is fully closed off from manifold passageway 201 and flow is completely stopped. As can be readily imagined, rotation of shaft 202, FIG. 15 in direction 202a will eventually open a leading edge of passageway 204 into open communication with manifold passageway 201 allowing melt to flow and gradually increase to a maximum flow when the passageway 204 reaches the position 204o, FIG. 15. As described above with reference to other embodiments, the nozzle bores 20d may exit into a single cavity 9i or may exit into separate cavities (not shown).

Figure 16:
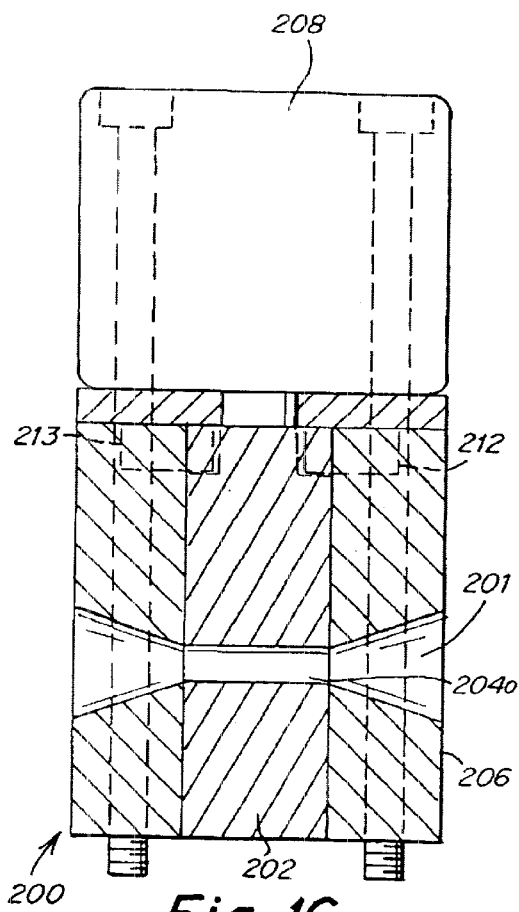
FIG. 16 is a side cross-sectional view of one of the rotary valves of FIG. 14.
Figure 17:
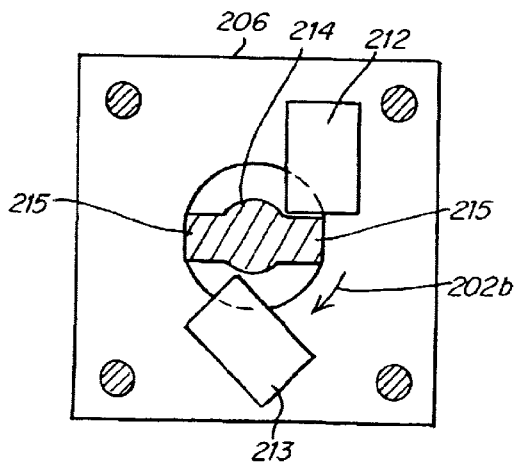
FIG. 17 is top view of one of the rotary valves of FIG. 14 showing limit stops for limiting the rotation of the rotary cylinder of the rotary valves.
Figure 18:
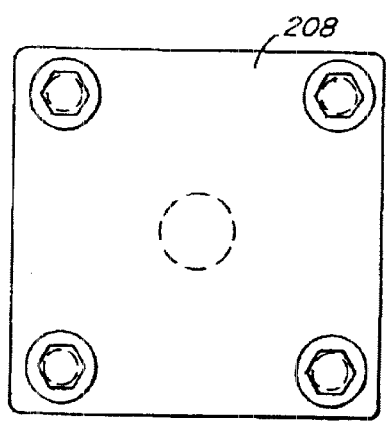
FIG. 18 is a top view of one of the drive actuator-controllers of FIG. 14 showing the position of bolts for connecting the drive-actuator relative to the valve.

FIGS. 16–17 show mechanical limit stops that may be employed whereby prismatic stops 212, 213 attached to the bearing housing 206 serve to engage radial stops 215 of stop member 214 which is attached to the top of shaft 202 and thus serve to limit the rotational travel of shaft 202 in directions 202a and 202b.

Figure 19:
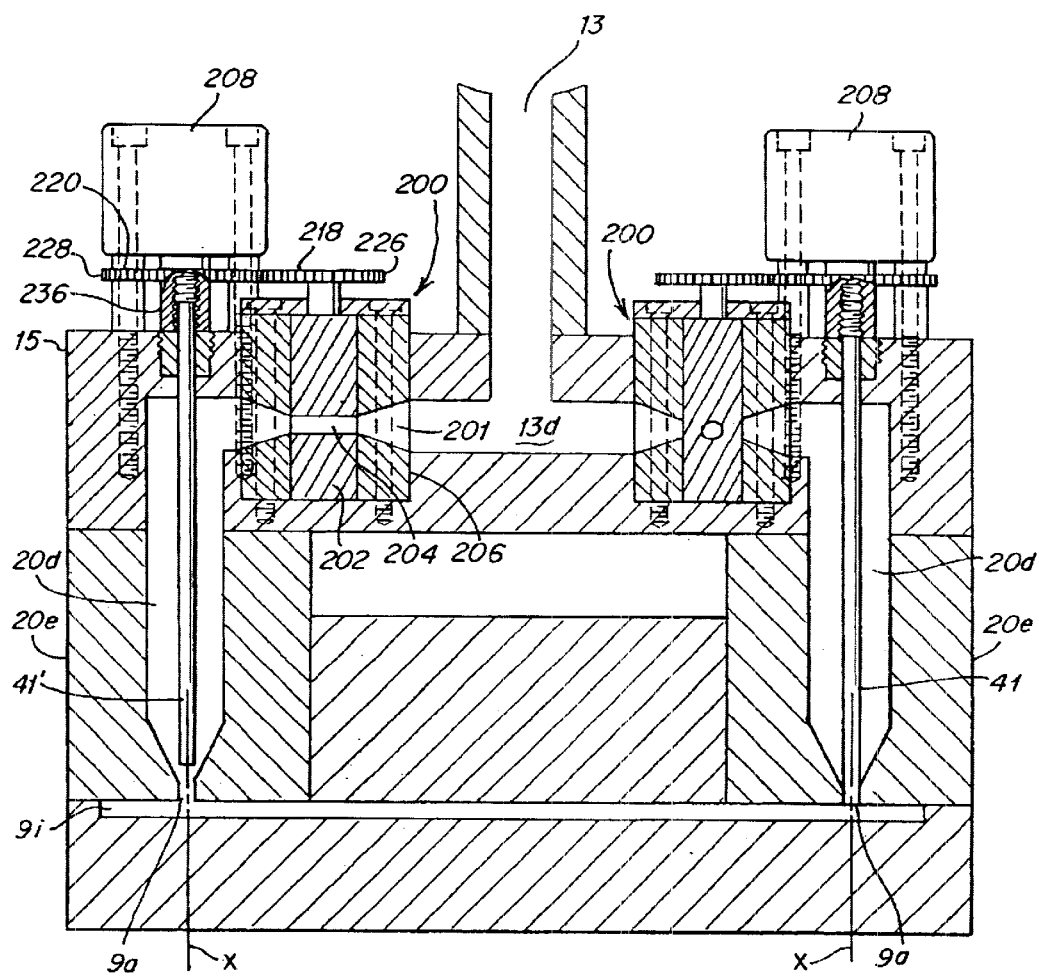
FIG. 19 is a schematic side cross-sectional view of an alternative rotary valve flow controlled system showing a dual drive actuator which simultaneously drives/controls a rotary valve and a valve pin which is additionally used in the bore of one of the down bores feeding into the cavity of the mold.
Figure 20:
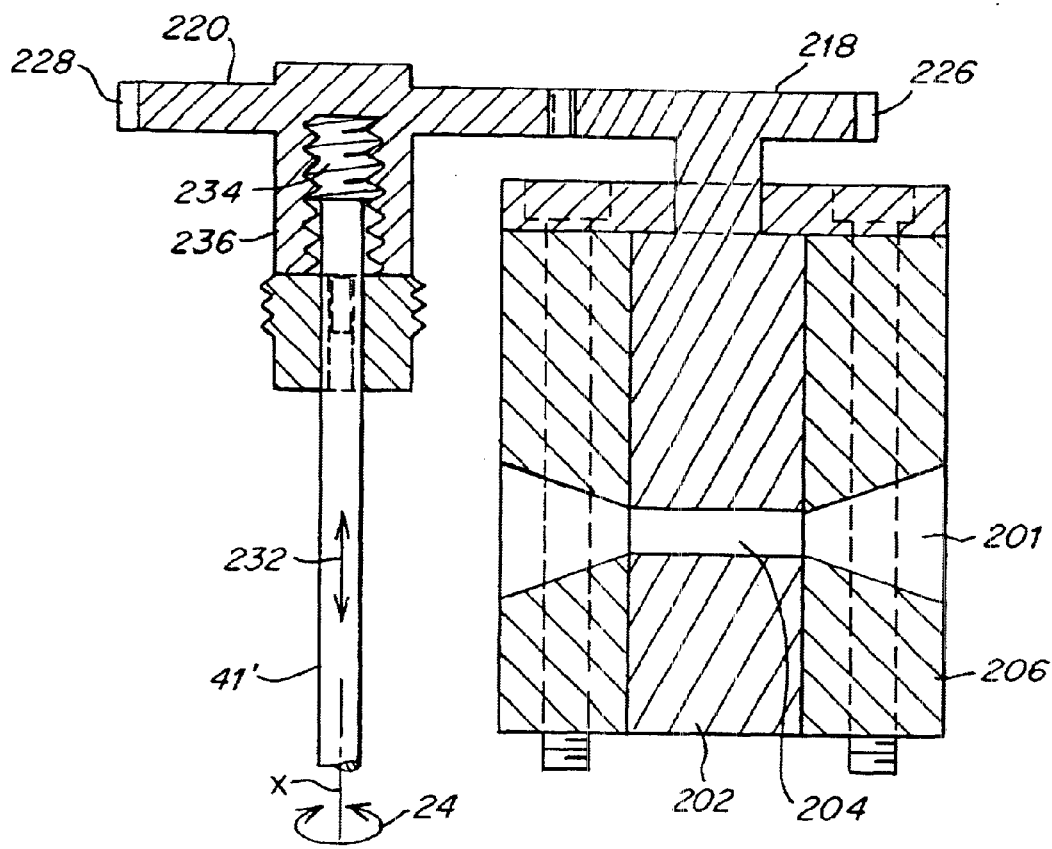
FIG. 20 is a more detailed view of the mechanical interconnection between the dual drive actuator of FIG. 19 and the rotary valve and the valve pin.
Figure 21:
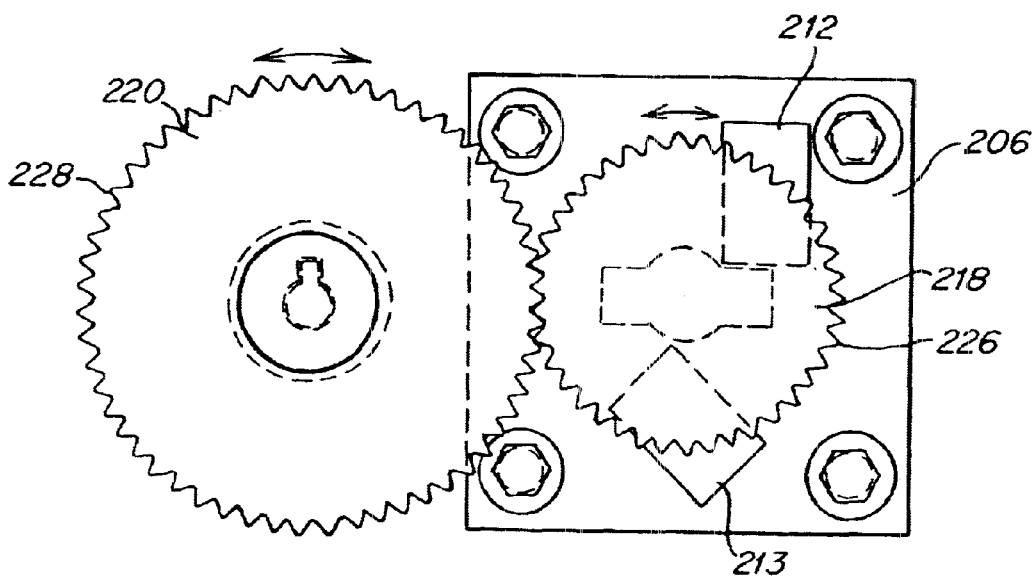
FIG. 21 is a schematic top view of a drive wheel component of the drive actuator of FIG. 19 showing the gear mesh relationship between the drive wheel and the follower wheel of the rotary valve.

FIGS. 19–21 show an alternative embodiment where the actuators 208 commonly drive both a rotary valve 200 and a valve pin 41, 102. As shown the valve pins 41, 102 can be arranged so as to reciprocate along their axes X between open, 102, and closed 41 aperture 9a positions simultaneously with shaft 202 being controllably rotated. Such simultaneous drive is accomplished via drive wheel 220, FIGS. 20–21, whose gear teeth are meshed with gear teeth 226 of wheel 218 and the screwable engagement of the threaded head 234 of pins 102, 41 in the shafts 236 of driven wheels 220. As can be readily imagined as shaft 236 is rotated either clockwise or counterclockwise 24, pin 102 will be displaced either up or down 232 simultaneously with rotation of shaft 202 and its associated passageway 204. During a typical operation, the rotary valve may fully stop the melt flow prior to the valve pin closing at the exit 9a. Similarly, the valve pin may open access to the mold cavity 9i prior to the rotary valve permitting melt through the passageway 204.

Figure 22:
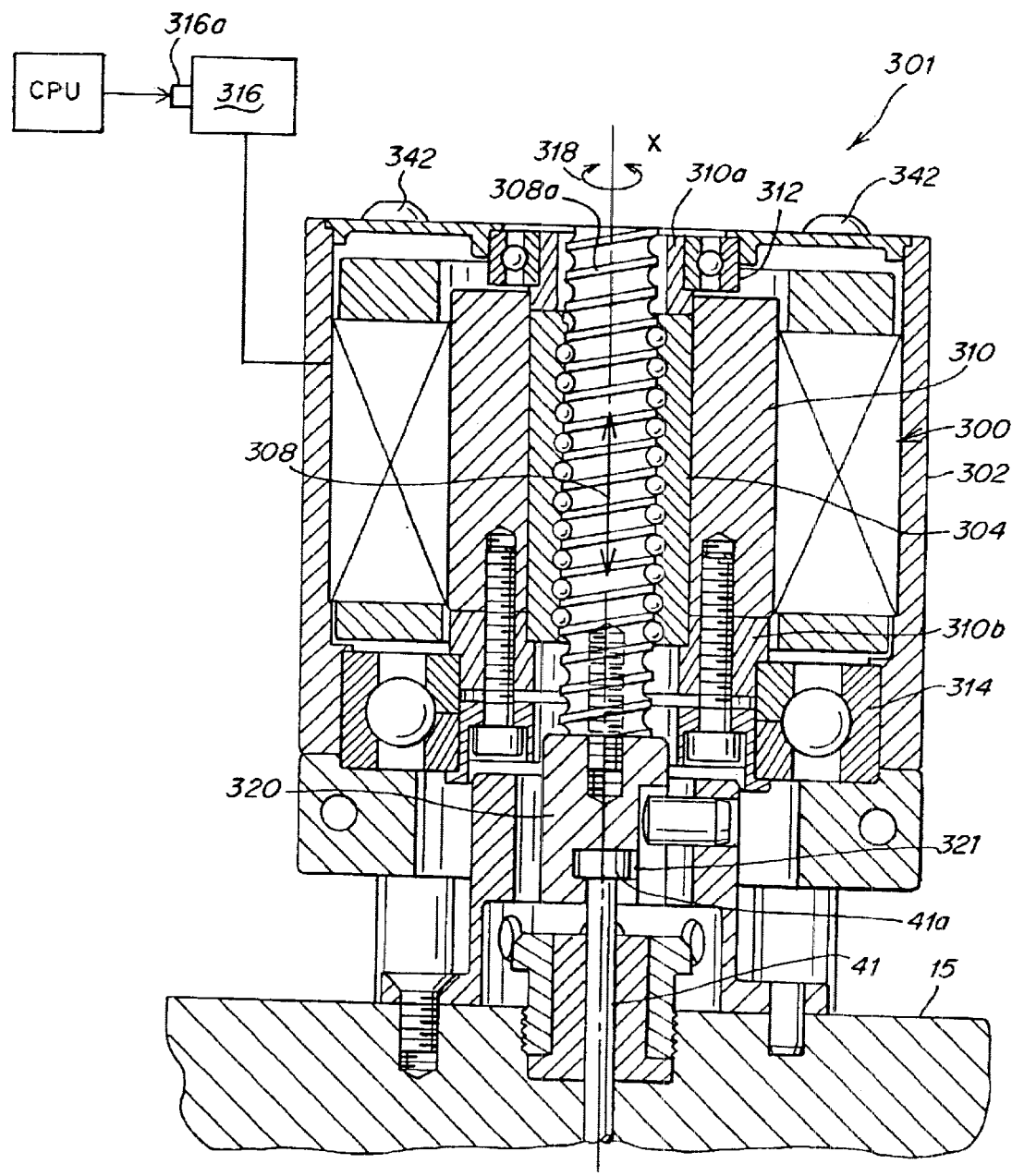
FIG. 22 is a side cross-sectional view of a shaftless motor for use as an alternative actuator for a valve or other flow control mechanism in accordance with the invention, the motor having an axially movable screw for driving the flow controller.

FIG. 22 shows an example of an electrically powered motor which may be used as an actuator 301, in place of a fluid driven mechanism, for driving a valve pin or rotary valve or other nozzle flow control mechanism. In the embodiment shown in FIGS. 22 a shaftless motor 300 mounted in housing 302 has a center ball nut 304 in which a screw 306 is screwably received for controlled reciprocal driving 308 of the screw 308a along axis X. Other motors which have a fixed shaft in place of the screw may also be employed as described more fully in U.S. application Ser. No. 09/187,974, the disclosure of which is incorporated herein by reference. As shown in the FIG. 22 embodiment the nut 304 is rigidly interconnected to magnet 310 and mounting components 310a, 310b which are in turn fixedly mounted on the inner race of upper rotational bearing 312 and lower rotational bearing 314 for rotation of the nut 304 relative to housing 302 which is fixedly interconnected to the manifold 15 of the injection molding machine. The axially driven screw 308a is fixedly interconnected to valve pin 41 which reciprocates 308 along axis X together with screw 308a as it is driven. As described more fully below, pin 41 is preferably readily detachably interconnected to the moving component of the particular actuator being used, in this case screw 308a. In the FIG. 22 embodiment, the head 41a of pin 41 is slidably received within a complementary lateral slot 321 provided in interconnecting component 320. The housing 302 may be readily detached from manifold 15 by unscrewing bolts 324 and lifting the housing 302 and sliding the pin head 41a out of slot 321 thus making the pin readily accessible for replacement.

As can be readily imagined other motors may be employed which are suitable for the particular flow control mechanism which is disposed in the flow channel of the manifold or nozzle, e.g. valve pin or rotary valve. For example, motors such as a motor having an axially fixed shaft having a threaded end which rotates together with the other rotating components of the actuator 301 and is screwably received in a complementary threaded nut bore in pin interconnecting component 320, or a motor having an axially fixed shaft which is otherwise screwably interconnected to the valve pin or rotary valve may be employed.

Controlled rotation 318 of screw 308a, FIG. 22, is achieved by interconnection of the motor 300 to a motor controller 316 which is in turn interconnected to the CPU, the algorithm of which (including PID controllers) controls the on/off input of electrical energy to the motor 300, in addition to the direction and speed of rotation 318 and the timing of all of the foregoing. Motor controller 316 may comprise any conventional motor control mechanism(s) which are suitable for the particular motor selected. Typical motor controllers include an interface 316a for processing/interpreting signals received from the CPU; and, the motor controllers typically comprise a voltage, current, power or other regulator receiving the processed/interpreted signals from interface 316a and regulates the speed of rotation of the motor 300 according to the instruction signals received.

Figure 23:
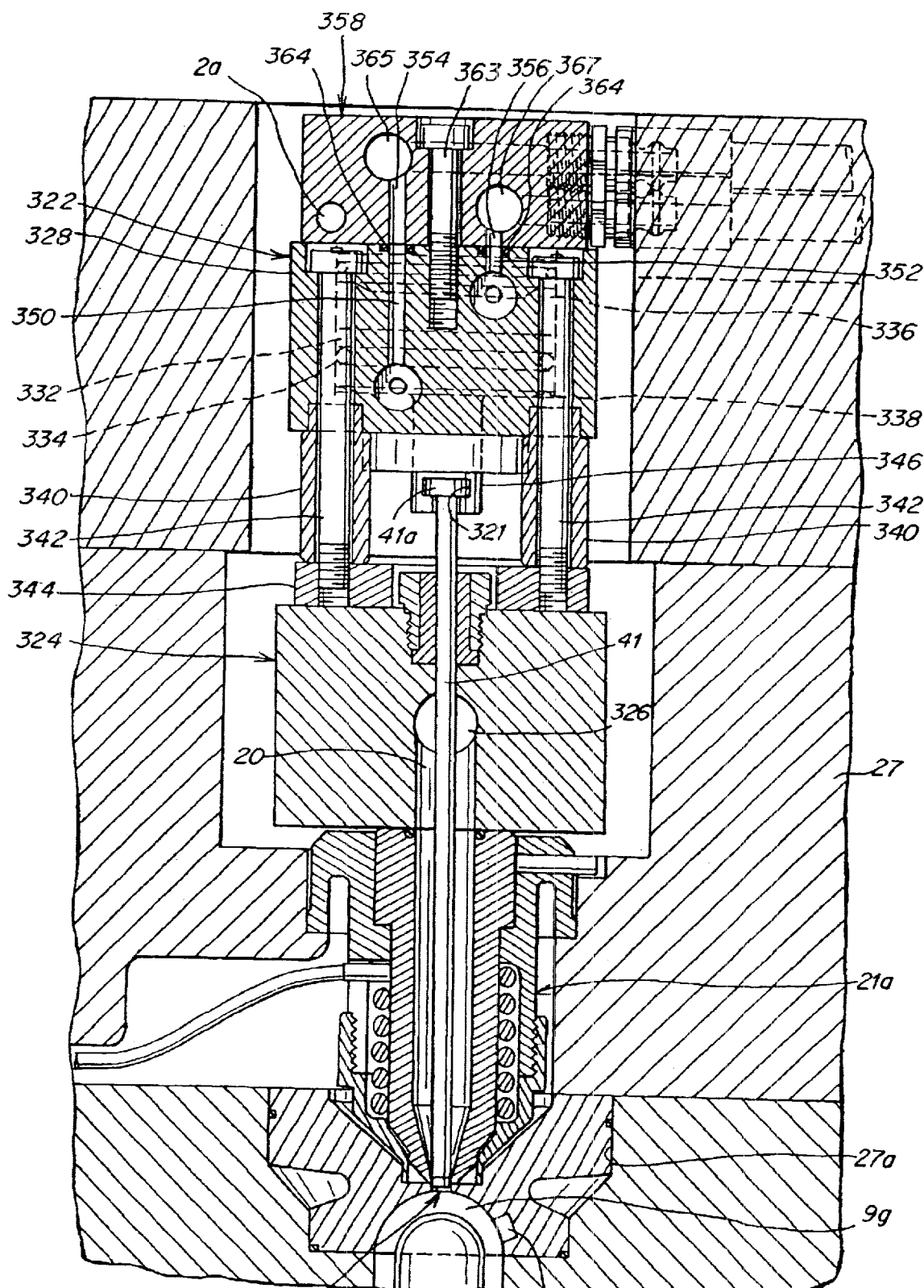
FIG. 23 is a side cross sectional view of a sensor monitored nozzle having a straight valve pin interconnected to a readily detachable actuator having a readily attachable and detachable valve pin, the actuator being fed with pressurized drive fluid by a manifold which commonly feeds pressurized drive fluid to a plurality of actuators.
Figure 24:
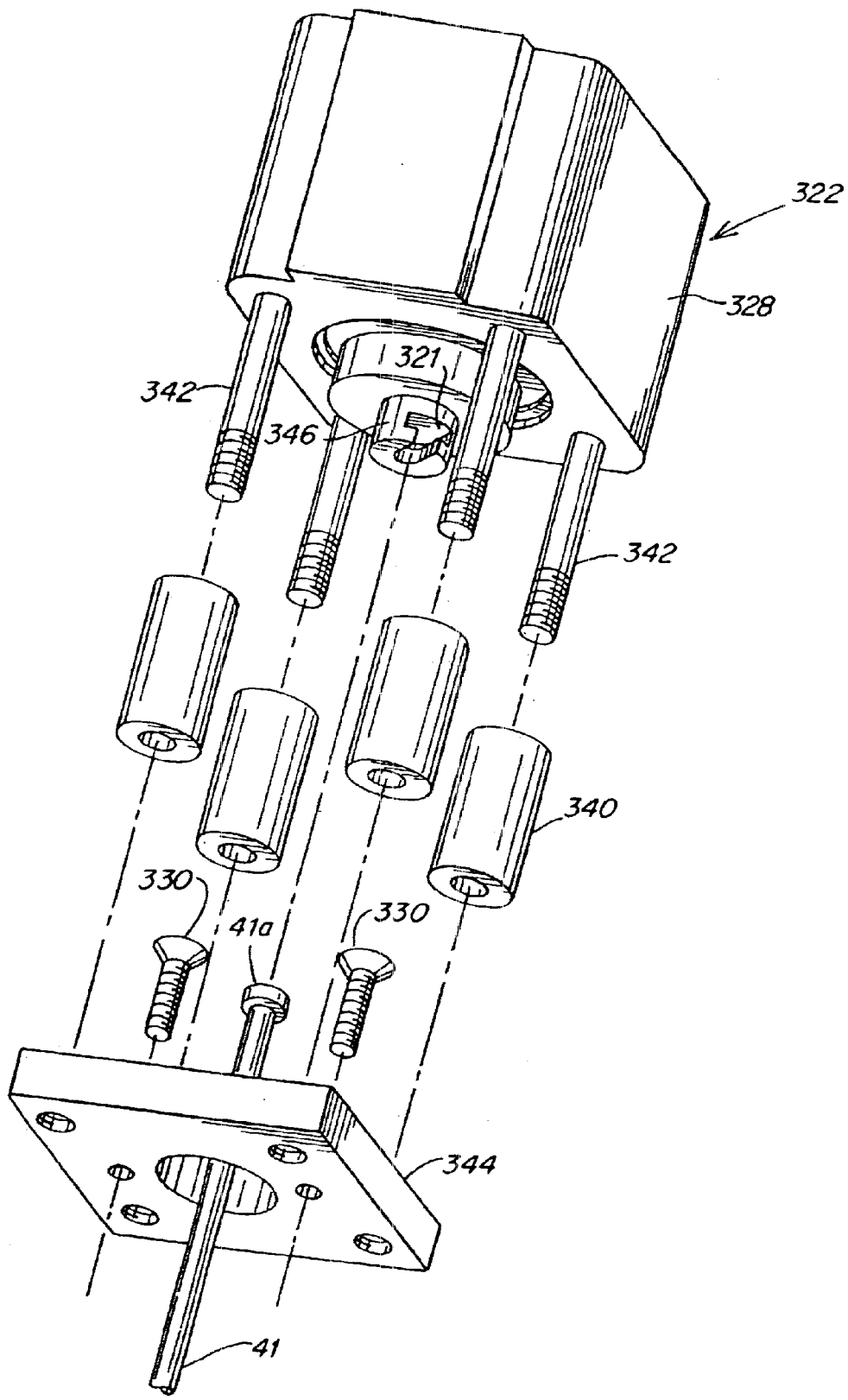
FIG. 24 is an exploded view of the actuator interconnection components to the manifold shown in FIG. 23.

FIGS. 23, 24 show another embodiment of the invention where a readily detachable valve pin 41 interconnection is shown in detail. FIG. 23 shows a nozzle 21a having a configuration similar in design to the nozzle configuration of FIG. 13. As shown the nozzle 21a is mounted in an aperture in a mold plate 27 having an exit aperture aligned with gate 9a and a sensor 69a for measuring a material property in the cavity 9g which sends recordation signals to electronic controllers (including CPU, PID controllers or the like) for reciprocation of the pin 41 according to a predetermined program. In the embodiment shown the pin 41 is straight, however the pin 41 and the nozzle bore 20 may have other configurations such as shown/described with reference to FIGS. 2–5 and the sensor 69 located in the nozzle bore 20 or other location in the path of the melt flow depending on the type and purpose of control desired for the particular application. As described above, the ready detachability of the pin and actuator of the FIGS. 23, 24 embodiment may also be adapted to an electric actuator such as described with reference to FIG. 22.

FIGS. 23–28 illustrate another embodiment of the invention wherein certain components provide common fluid feed to a plurality fluid driven actuators and where certain components are readily attachable and/or detachable as described in U.S. Pat. No. 5,948,448, U.S. application Ser. No. 09/081,360 filed May 19, 1998 and PCT U.S. application serial number US99/11391 filed May 20, 1999, the disclosures of all of which are incorporated herein by reference. As shown in FIGS. 23, 24 a fluid driven actuator 322 is fixedly mounted on a hotrunner manifold 324 having a melt flow channel 326 leading into nozzle bore 20. The actuator comprises a unitary housing 328 which sealably encloses a piston 332 having an O-Ring seal 334 which defines interior sealed fluid chambers, upper chamber 336 and lower chamber 338. The unitary housing 322 is spacedly mounted on and from the manifold 324 by spacers 340 and bolts 342 and an intermediate mounting plate 344 attached to the upper surface of the manifold 324. The heads 344 of the bolts 342 are readily accessible from the top surface 346 of the actuator housing 328 for ready detachment of the housing from plate 344 as shown in FIG. 24. Plate 344 is fixedly attached to the manifold via bolts 330.

Figure 25:
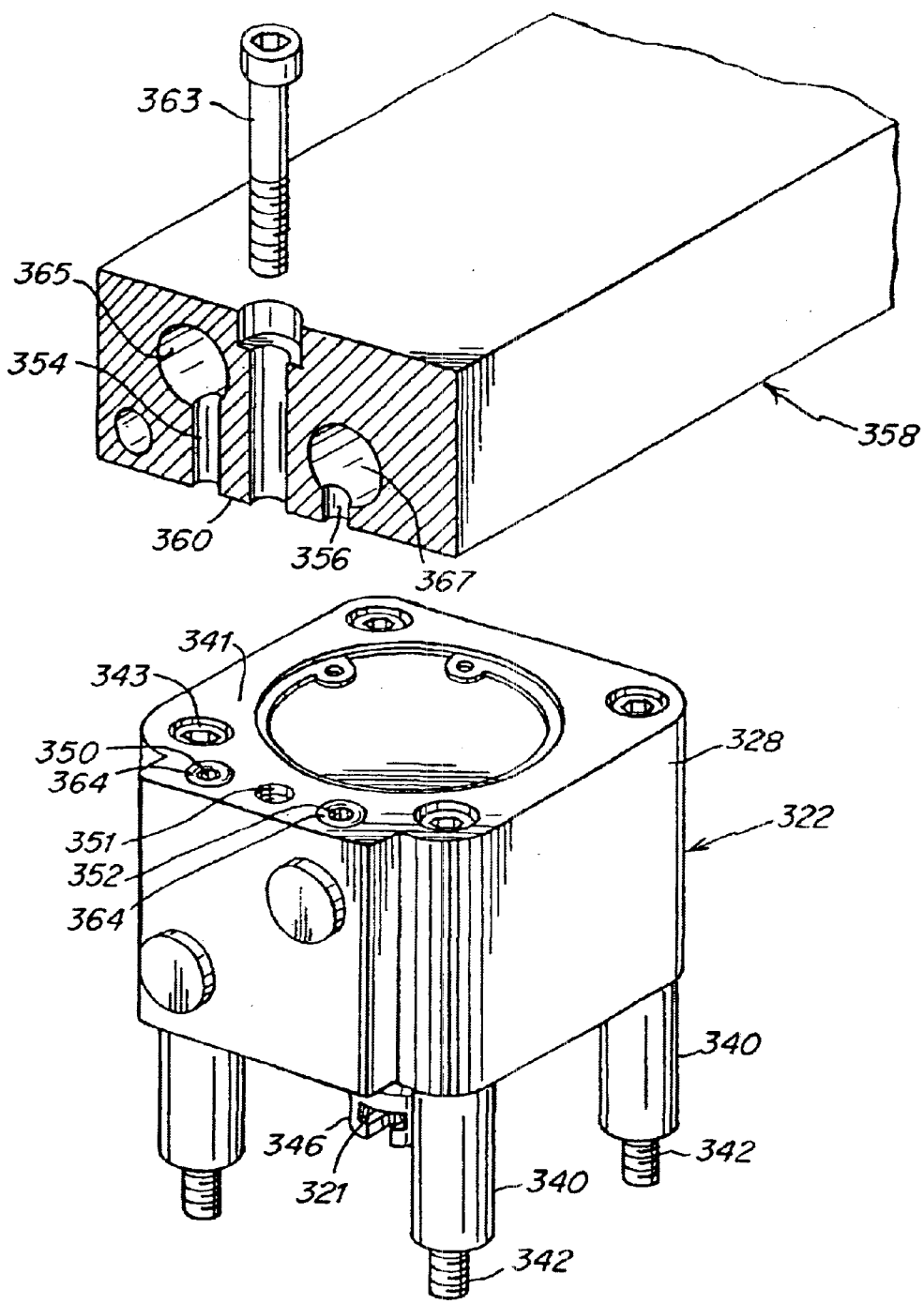
FIG. 25 is an exploded view of the actuator interconnection to the drive fluid manifold of FIG. 23.
Figure 26:
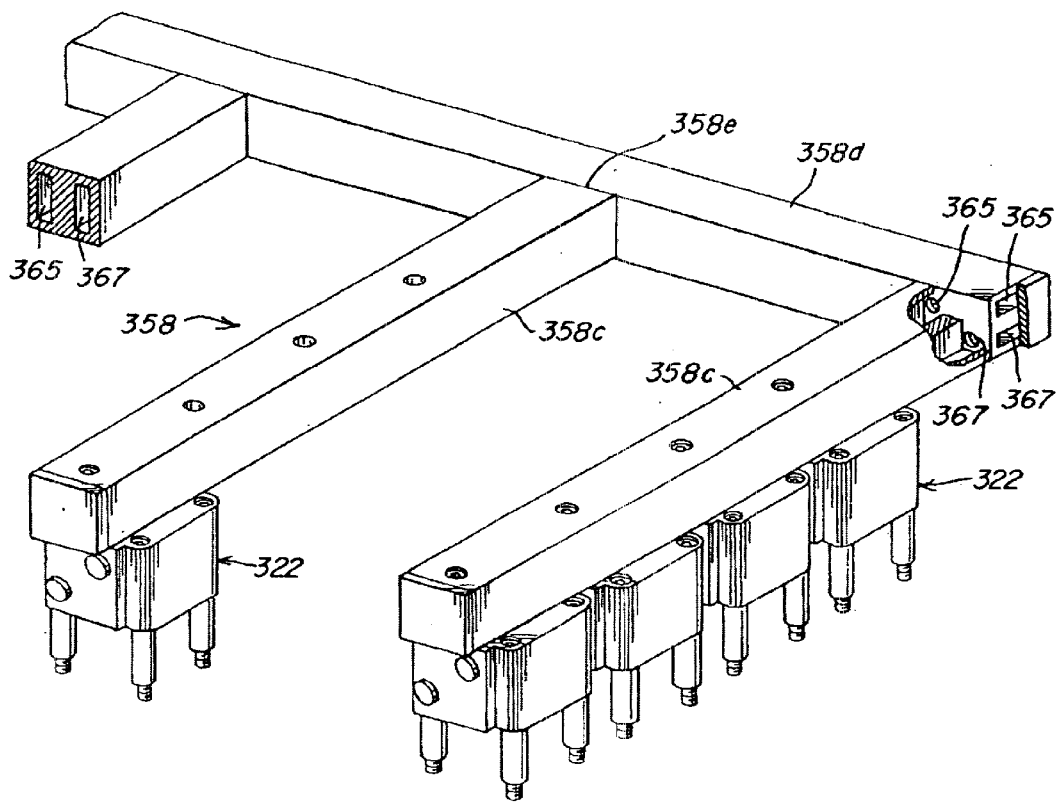
FIG. 26 is an isometric view of a modular embodiment of a pressurized drive fluid manifold showing a modular configuration for the manifold.
Figure 27:
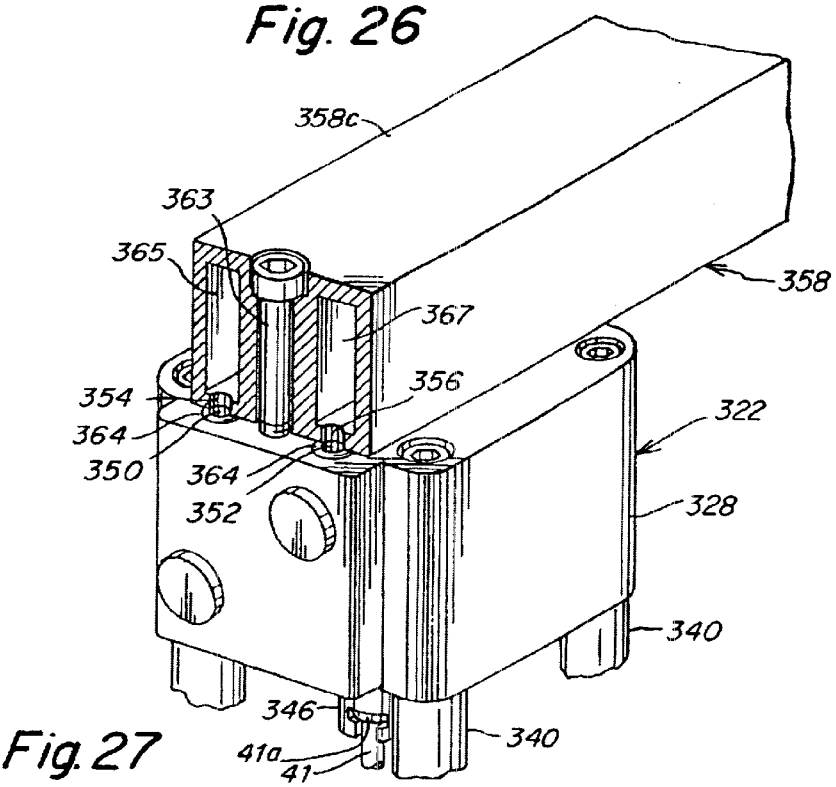
FIG. 27 is an isometric close-up view of a modular arm and actuator interconnection according to the FIG. 26 embodiment showing the alignment of a modular manifold with the fluid input/output ports of the actuator.

The piston 332 has a stem portion 346, FIGS. 23–25, which extends outside the interior of the sealed housing 328 and chambers 336, 338. At the end of the stem 346 a lateral slot 321 is provided for readily slidably receiving in a lateral direction the head 41 a of the pin. As can be seen the bottom of the slot 321 has an aperture having a width less than the diameter of the pin head 41 a such that once the pin head is slid laterally into the slot 321, the pin head is held axially within slot 321. In practice the pin head 41a and slot 321 are configured so that the pin head 41a fits snugly within the slot. As can be readily imagined, the pin head 41a can be readily slid out of the slot 321 upon detachment of the actuator 328, FIG. 24, thus obviating the prior art necessity of having to disassemble the actuator itself to obtain access to the pin head 41a. Once the actuator housing is detached, FIG. 24, the pin 41 is thus readily accessible for removal from and replacement in the manifold 324/nozzle bore 20.

In another embodiment of the invention, where hydraulic or pneumatic actuators are used to drive the pins or rotary valves of two or more nozzles, the drive fluid may be supplied by a common manifold or fluid feed duct. Such common fluid feed ducts are most preferably independent of the fluid driven actuators, i.e. the ducts do not comprise a housing component of the actuators but rather the actuators have a self contained housing, independent of the fluid feed manifold, which houses a sealably enclosed cavity in which a piston is slidably mounted. For example, as shown in FIGS. 23–28, the fluid input/output ports 350, 352, 350a, 352a of independent actuators 322, 322a (FIG. 28) are sealably mated with the fluid input output ports 354, 356, 354a, 356a of a fluid manifold 358, 358a which commonly delivers actuator drive fluid (such as oil or air) to the sealed drive chambers 336, 338, 336a, 338a of two or more actuators 322, 322a. Most preferably, the ports 354, 356 (or 354a, 356a) of the manifold 358 (or 358a) are sealably mated with their complementary actuator ports 350, 352 (350a, 352a) via compression mating of the undersurface 360 of the manifold 358 (358a) with the upper surface 341 of the actuators 322 (322a) as best shown in FIG. 25. Such compression mating may be achieved by initially connecting the manifold via bolt 363 and threaded holes 351 or similar means to the actuators 322 in their room temperature state (referred to as cold) with their mating surfaces in close or mating contact such that upon heating to operating temperature the manifold and actuators expand and the undersurfaces 360 and upper surfaces 341 compress against each other forming a fluid seal against leakage around the aligned ports 350/354 and 352/356. In most preferred embodiments, a compressible 0ring seal 364 is seated within a complementary receiving groove disposed around the mating area between the ports such that when the manifold and actuators are heated to operating temperature the O-ring is compressed between the undersurface 360 and upper surface 341 thus forming a more reliable and reproducible seal with less precision in mounting alignment between the manifold and the actuators being required.

As shown in FIGS. 23, 25–28, the manifold(s) 322 has two feed ducts 365, 367 for delivery of pressurized actuator drive fluid to and from a master tank or other source (not shown) which ducts extend the length of the manifold 358 and commonly feed each actuator 322. In the embodiment shown in FIGS. 26, 27 the manifold 358 can be constructed as a modular apparatus having a first distributor arm 358d generally adaptable to be mounted on a hotrunner manifold, to which one or more additional distributor arms 358c may be sealably attached 358e to fit/adapt to the specific configuration of the particular manifold or injection molding machine to be outfitted.

As can be readily imagined a plurality of actuators may also utilize a manifold plate which forms a structural component of one or more of the actuators and serves to deliver drive fluid commonly to the actuators, e.g. the manifold plate forms a structural wall portion of the housings of the actuators which serves to form the fluid sealed cavity within which the piston or other moving mechanism of the actuator is housed.

Figure 28:
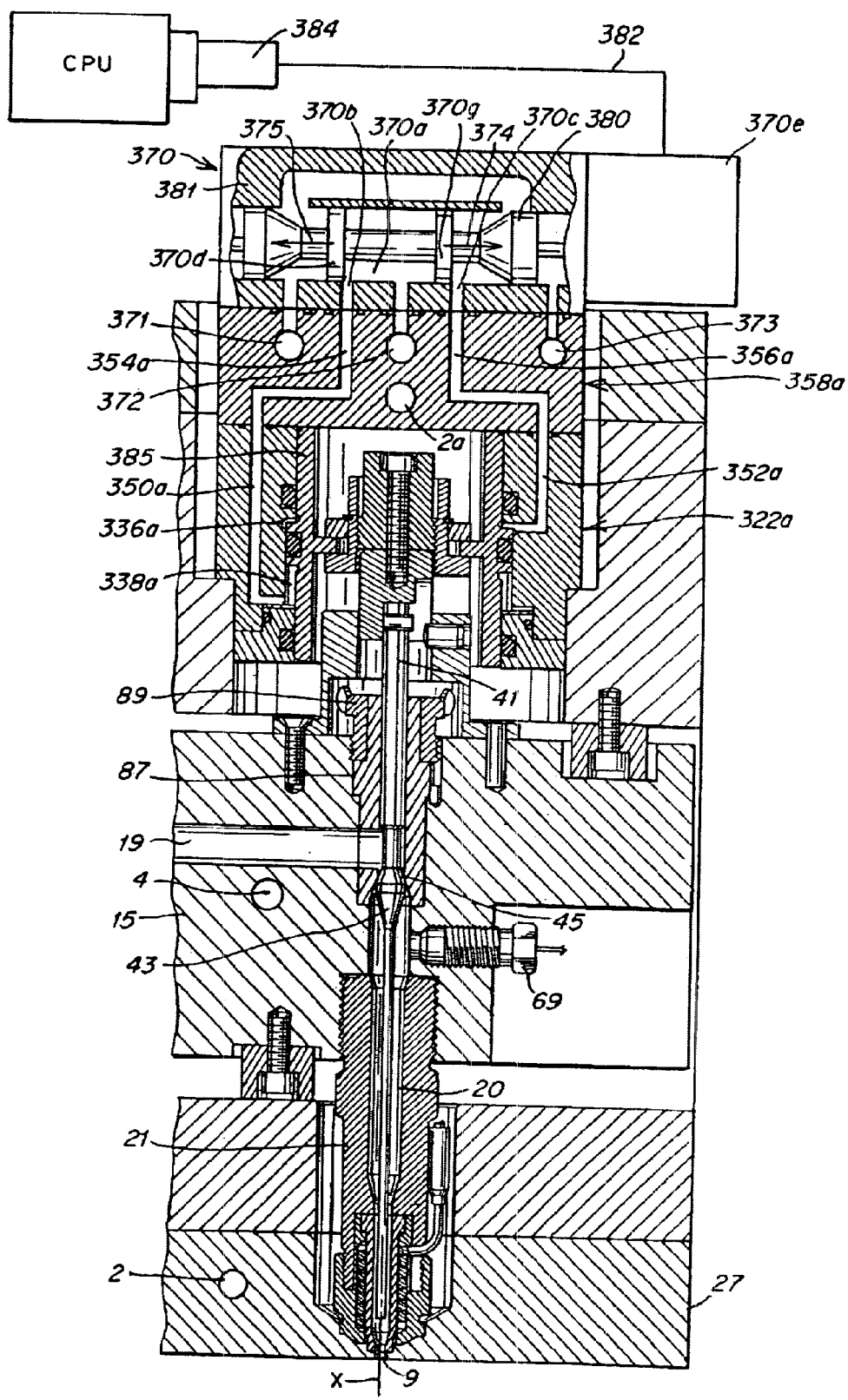
FIG. 28 is a schematic side cross-sectional view of a sensor monitored valve gated nozzle having an actuator fed by a drive fluid delivery manifold and a proportional valve mounted on the manifold above the valve for precisely controlling the delivery of drive fluid to the individual actuator from the manifold.

Precise control over the piston or other moving component of a fluid driven actuator such as actuator 322a, FIG. 28, actuator 49, FIG. 1, actuator 208, FIG. 14 (which more typically comprises an electrically driven actuator), or actuator 322, FIGS. 23–27 can be more effectively carried out with a proportional valve 370 as shown in FIG. 28, although other valve or drive fluid flow controllers may be employed.

In the FIG. 28 embodiment, a separate proportional valve 370 for each individual actuator 322a is mounted on a common drive fluid delivery manifold 358a. The manifold 358a has a single pressurized fluid delivery duct 372 which feeds pressurized drive fluid first into the distributor cavity 370a of the valve 370. The pressurized fluid from duct 372 is selectively routed via left 375 or right 374 movement of plunger or spool 380 either through port 370b into piston chamber 336a or through port 370c into piston chamber 338a. The plunger or spool 380 is controllably movable to any left to right 374, 375 position within sealed housing 381 via servo drive 370e which receives control signals 382 from the CPU. The servo drive mechanism 370e typically comprises an electrically driven mechanism such as a solenoid drive, linear force motor or permanent magnet differential motor which is, in turn, controlled by and interconnected to CPU via interface 384 which interprets and communicates control signals from the CPU to the servo drive 370e. Restrictors or projections 370d and 370g of plunger/spool 380 are slidable over the port apertures 370b and c to any desired degree such that the rate of flow of pressurized fluid from chamber 370a through the ports can be varied to any desired degree by the degree to which the aperture ports 370b, 370g are covered over or restricted by restrictors 370d, 370g. The valve 370 includes left and right vent ports which communicate with manifold fluid vent channels 371, 372 respectively for venting pressurized fluid arising from the left 375 or right 374 movement of the plunger/spool 380. Thus, depending on the precise positioning of restrictors 370d and 370g over apertures 370b and 370c, the rate and direction of axial movement of piston 385 and pin 41/head 43, 45 can be selectively varied and controlled which in turn controls the rate of melt material from manifold channel 19 through nozzle bore 20 and gate 9. The nozzle and pin 41, head 43, 45 and mounting component 87, 89 configurations shown in FIG. 28 correspond to the configurations shown in FIG. 5 and the description above with regard to the manner in which the melt material is controllable by such head 43, 45 configurations are applicable to the FIG. 28 embodiment. A pressurized fluid distributing valve and a fluid driven actuator having a configuration other than the proportional valve 370 and actuator shown in FIG. 28 may be utilized, the essential requirements of such components being that the valve include a fluid flow control mechanism which is capable of varying the rate of flow to the drive fluid chambers of the actuator to any desired rate and direction of flow into and out of the fluid drive chambers of the actuator.

Figure 29:
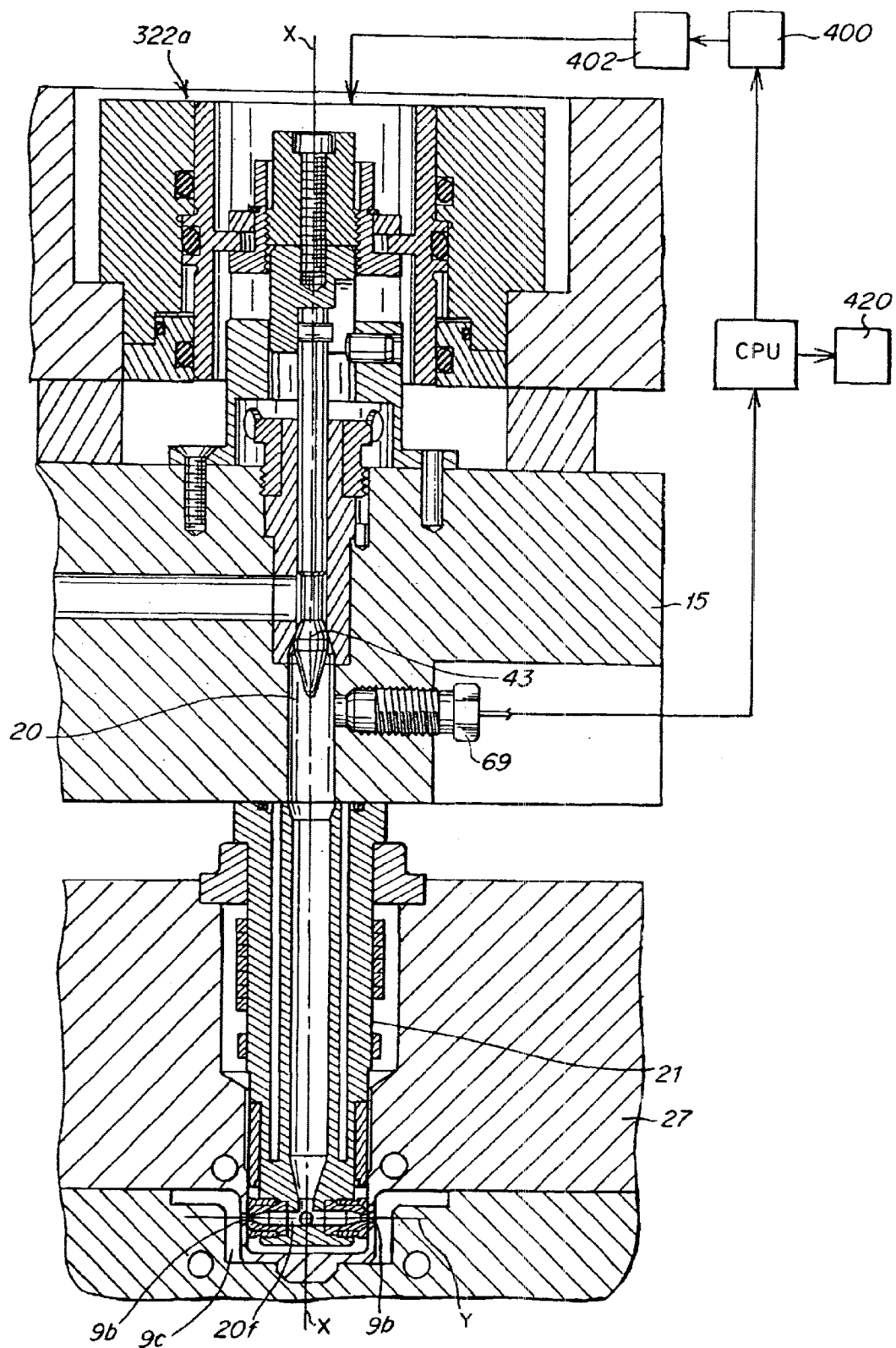
FIG. 29 is a side cross-sectional view of an embodiment having an Edge-Gated nozzle tip having sensor feedback control loop control over the actuator.
Figure 30:
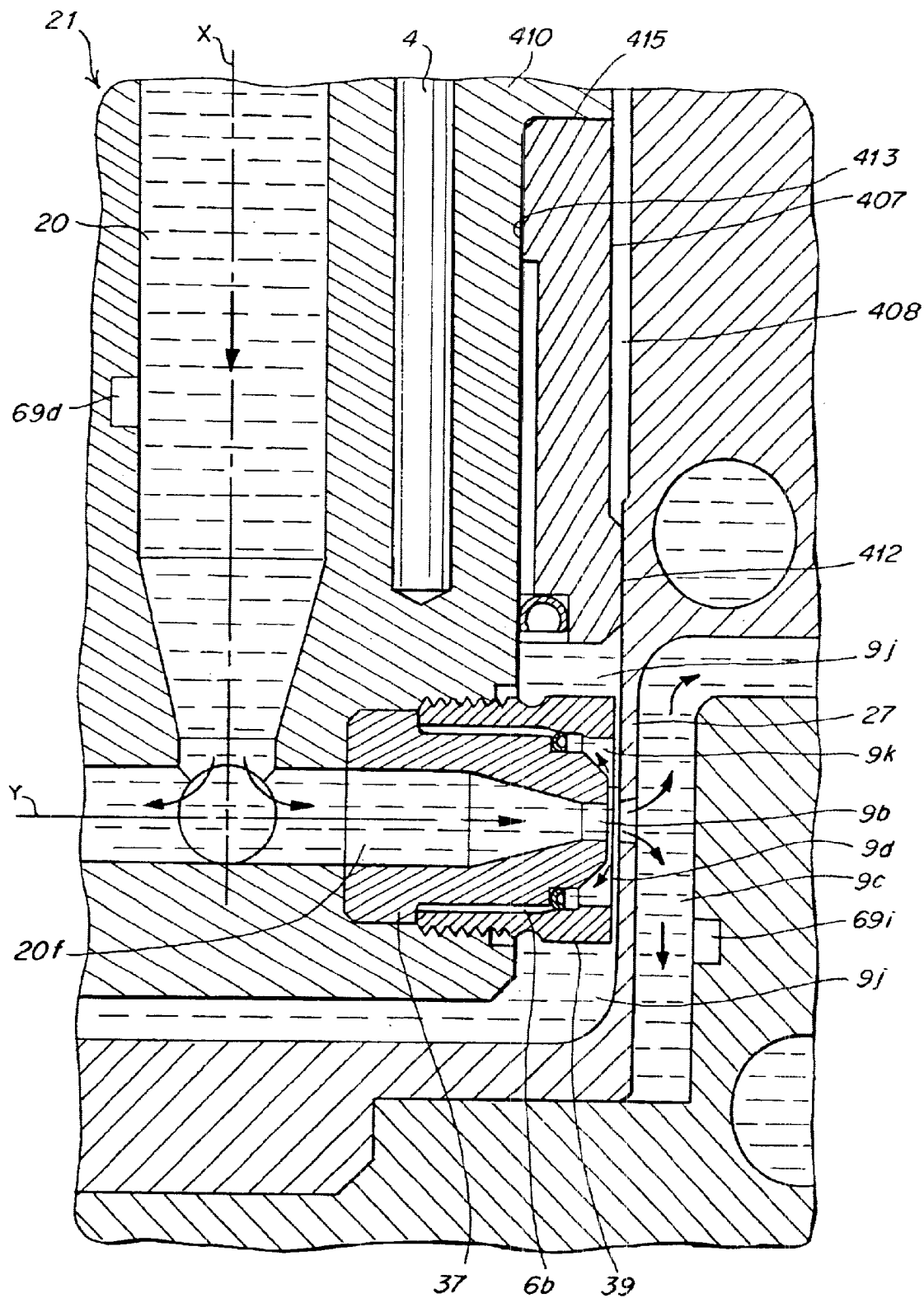
FIG. 30 is a more detailed close-up view of the interface between the edge gated nozzle tip of FIG. 29 and the gate area of a mold cavity.

In the embodiment shown in FIGS. 29, 30, a nozzle 21 having a main bore 20 having a main axis X terminates in a gate interfacing bore having an axis Y which is not aligned with axis X. As shown the gate 9a of the mold having cavity 9g is an edge gate extending radially outward through a mold cavity plate 27 wherein the nozzle has a bore having a first portion 20 having an inlet for the plastic melt which is not in alignment with the edge gate and a second portion 20a extending radially outward from the first portion 20 terminating in the exit aperture of the radial bore 20a being in alignment with the edge gate 9a. In the preferred embodiment shown and as described more fully in U.S. Pat. No. 5,885,628, the disclosure of which is incorporated herein by reference, a small gap 9i is left between the radial tip end of the outer piece 39 of the nozzle and the surface of the mold plate surround the cavity 9a such that it is possible for melt material to seep from groove 9k through the gap 9i and into the space 9j circumferentially surrounding the outer piece 39 where the gap 9i is selected to be small enough to prevent seepage of plastic melt backwards from space 9j into the groove area 9k and gate 9a area during ongoing or newly started up pressurized melt injection. The tip end of the nozzle as shown in FIGS. 29, 30 comprises an outer 39 piece and an inner 37 piece having a gap 6b therebetween. The two pieces 37, 39 are mounted to nozzle body 410 which is mounted in thermal isolation from mold 27 together with nozzle pieces 37, 39 in a well 408 in the mold 27 via a collar 407 which makes limited mounting contact with the mold at small interface area 412 distally away from the gate 9a area. As shown surfaces 413, 415 of collar 407 support and align nozzle body 410 and its associated/interconnected nozzle components 37, 39 such that the exit passage of nozzle component 37 along axis Y is aligned with the edge gate 9a of cavity 9g.

As shown in FIG. 29 a sensor 69, such as a pressure transducer, records a property of the melt material in bore 20 downstream of the pin head 43 having a configuration similar to the embodiment shown in FIG. 3. The signal from sensor 69 is fed to the CPU and processed as described above with reference to other embodiments and instruction signals based on a predetermined algorithm are sent from the CPU to an interface 400 which sends interpreted signals to the driver 402, such as drive motor 402 which drives the drive fluid feed to actuator 322a (as shown having the same design as the actuator shown in FIG. 28 which is described in detail in U.S. Pat. No. 5,894,025, the disclosure of which is incorporated herein by reference). As shown in FIG. 30, a sensor 69d could be positioned so as to sense a property of the melt flow within the passage 20, or within the cavity 9g via a sensor 69i. As shown in FIG. 29 and as described above, the algorithm of the CPU is simultaneously controlling the operation of the actuator 420 associated with another nozzle (not shown) via sensor signals sent by a sensor associated with the other nozzle.

Figure 31:
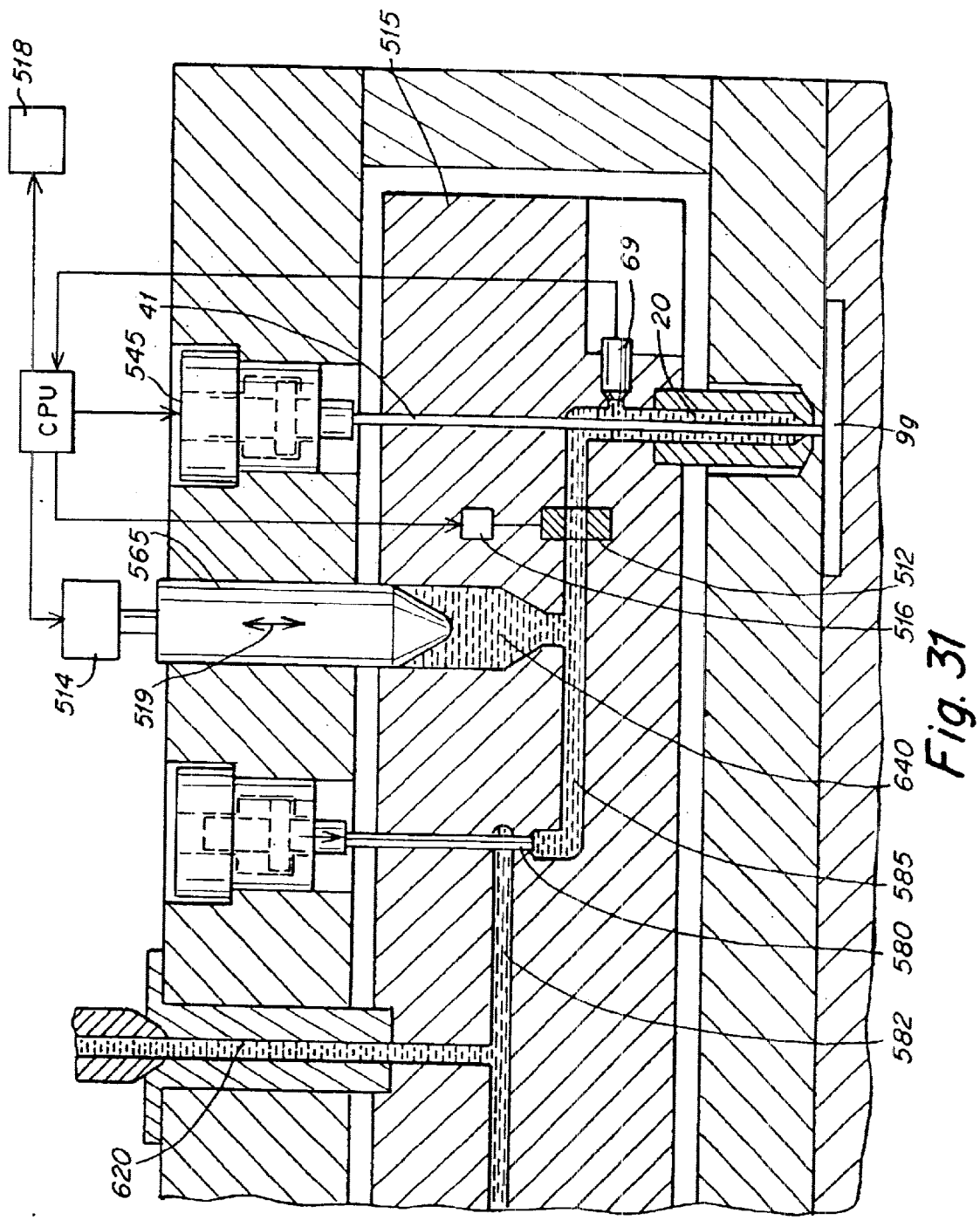
FIG. 31 is a side cross-sectional view of an embodiment of the invention having a defined volume reservoir disposed in the melt flow channel leading from the main injection screw to the output of an injection nozzle.

FIG. 31 shows an embodiment of the invention in which a defined volume of plastic melt is initially fed into a channel 585 and pot bore 640, prior to injection to cavity 9g through nozzle bore 20. As shown, a valve pin 580 is used to close off the flow connection from a main bore 620 into a distribution manifold 515, between the manifold channel 582 and bores 585/640/20 thus defining a predetermined defined volume of melt which can be controllably injected via an injection cylinder, ram or plunger 565 which is controllably drivable via actuator 514 to shoot/inject the defined volume of melt material through the bore 20 into cavity 9g. The rate of flow of the melt being injected via cylinder 565 may be controlled via controlled operation of any one or more of a rotary valve 512, valve pin 20 or via the drive of the cylinder 565 itself. Cylinder 565 is controllably drivable back and forth 519 within bore 640 via actuator 514 in a conventional manner to thus control the rate of injection of melt from bore 640 through bore 20.

In accordance with the invention, sensor 69 records a selected condition of the melt and sends signals to CPU which in turn may be programmed according to a predetermined algorithm to control the operation of any one or more of actuator 545 which controls operation of pin 41, actuator 516 which controls operation of rotary valve 512 or actuator 514 which controls operation of cylinder 565. As described above with regard to other embodiments sensor 69 may alternatively be located in other locations, e.g. cavity 9g or bores 640 or 585 depending on the melt properties (typically pressure) to be monitored/controlled and the molding operation(s) to be controlled. As shown in FIG. 31 and as described above, the algorithm of the CPU is simultaneously controlling the operation of the actuator 518 associated with another nozzle (not shown) via sensor signals sent by a sensor associated with the other nozzle.

Figure 34:
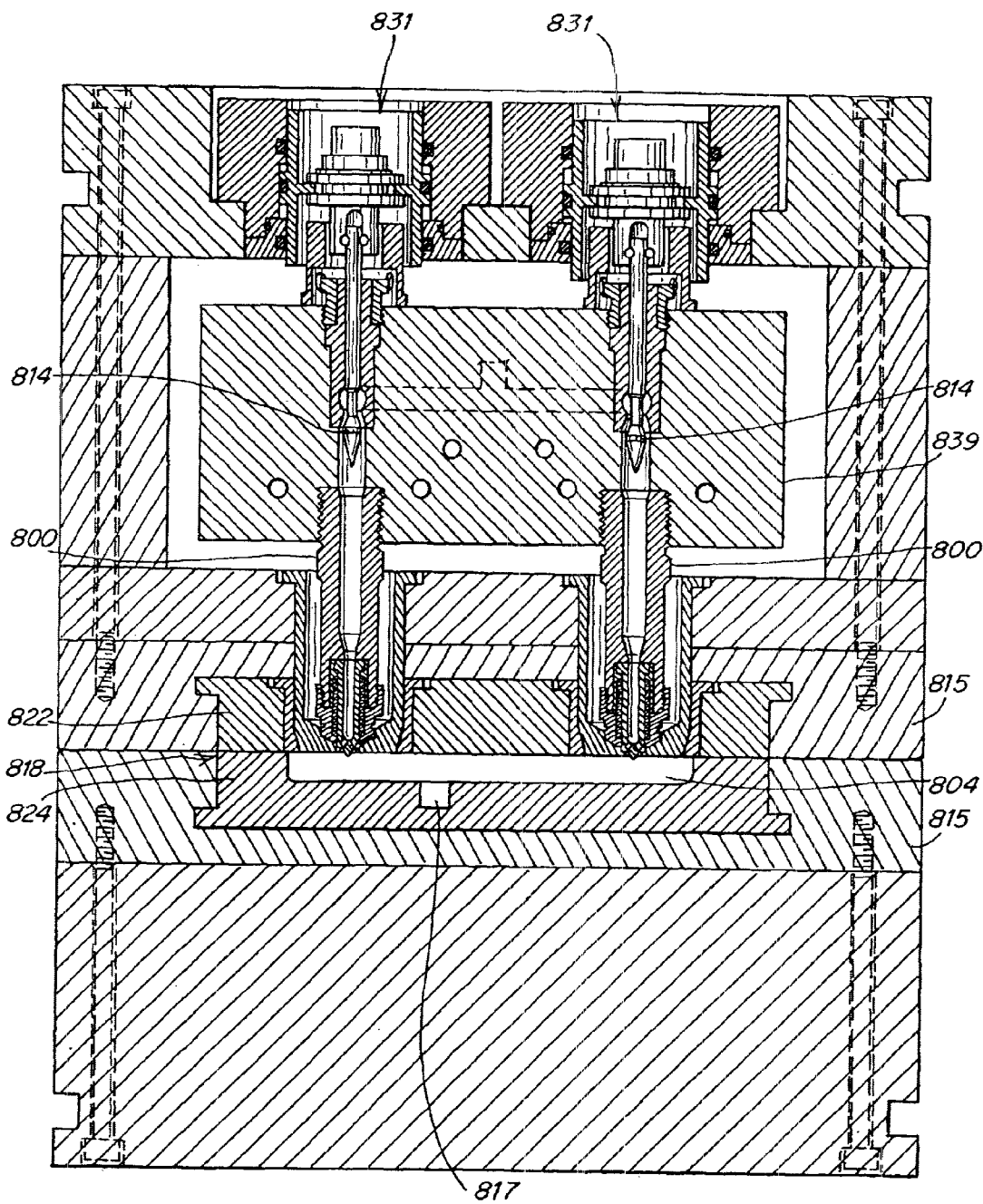
FIG. 34 is a cross-sectional end view along lines 34—34 of FIG. 33.

FIGS. 32–37 show another alternative embodiment of an injection molding system/method according to the invention wherein "modular" mold inserts are used as the devices for performing an injection molding operation into any preselected one of a multiplicity of mold cavities in a new/different insert, each different insert having any preselected size, shape, configuration, volume or the like. Each modular insert may be used in a machine having a single hardware component assembly of manifold, actuators, nozzles, valves, valve pins, nozzle tips and their other associated hardware components. As an example, there is shown in FIGS. 32–35 an "H-block" configuration/assembly of a fluid distribution manifold 839, actuators 831, 832, valve pins 814, 816 and nozzles 800, 802 arranged for injection into a pair of modular insert molds 818, 820 having cavities 804, 806 respectively. As best shown in FIG. 34, the two individual actuators 831 and nozzles 800 effect injection into a single modular insert mold cavity 804, and the two individual actuators 831/nozzles 802 effect injection into another single modular insert mold cavity 806. By contrast, in the example/embodiment shown in FIGS. 36, 37, the two separate actuators 831 and their associated nozzles 800 separately effect injection into two separate cavities 850, 852 of two separate modular insert molds 826, 828.

Figure 32:
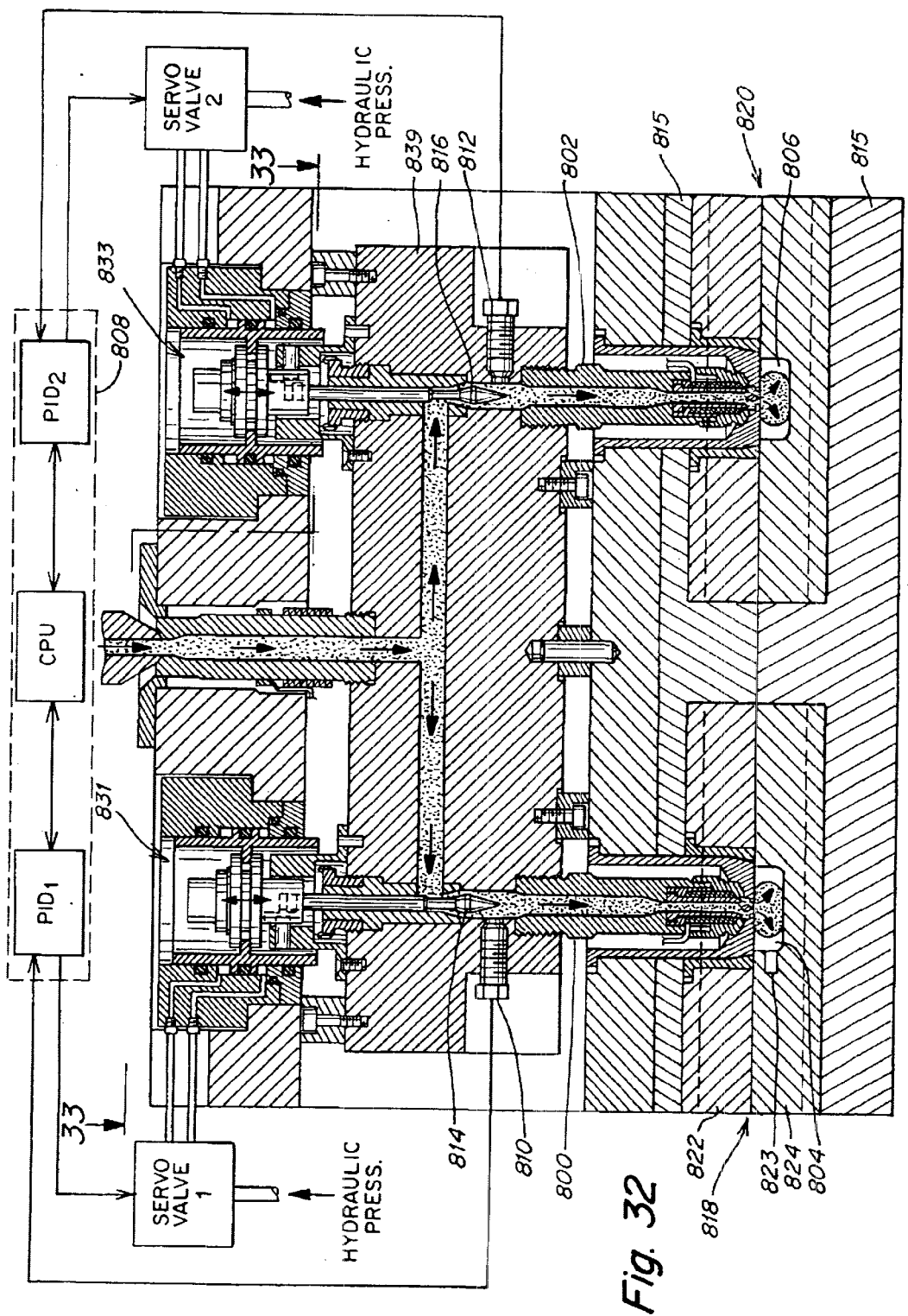
FIG. 32 is a schematic cross-sectional side view of another alternative embodiment of an injection molding system according to the invention having independently controlled flow into the cavities of modular, readily insertable and removable mold cavity inserts which are mountable within a single mold support housing which receives such modular inserts for ready removal and replacement with other cavity inserts having cavities of different size, shape, volume or configuration.
Figure 33:
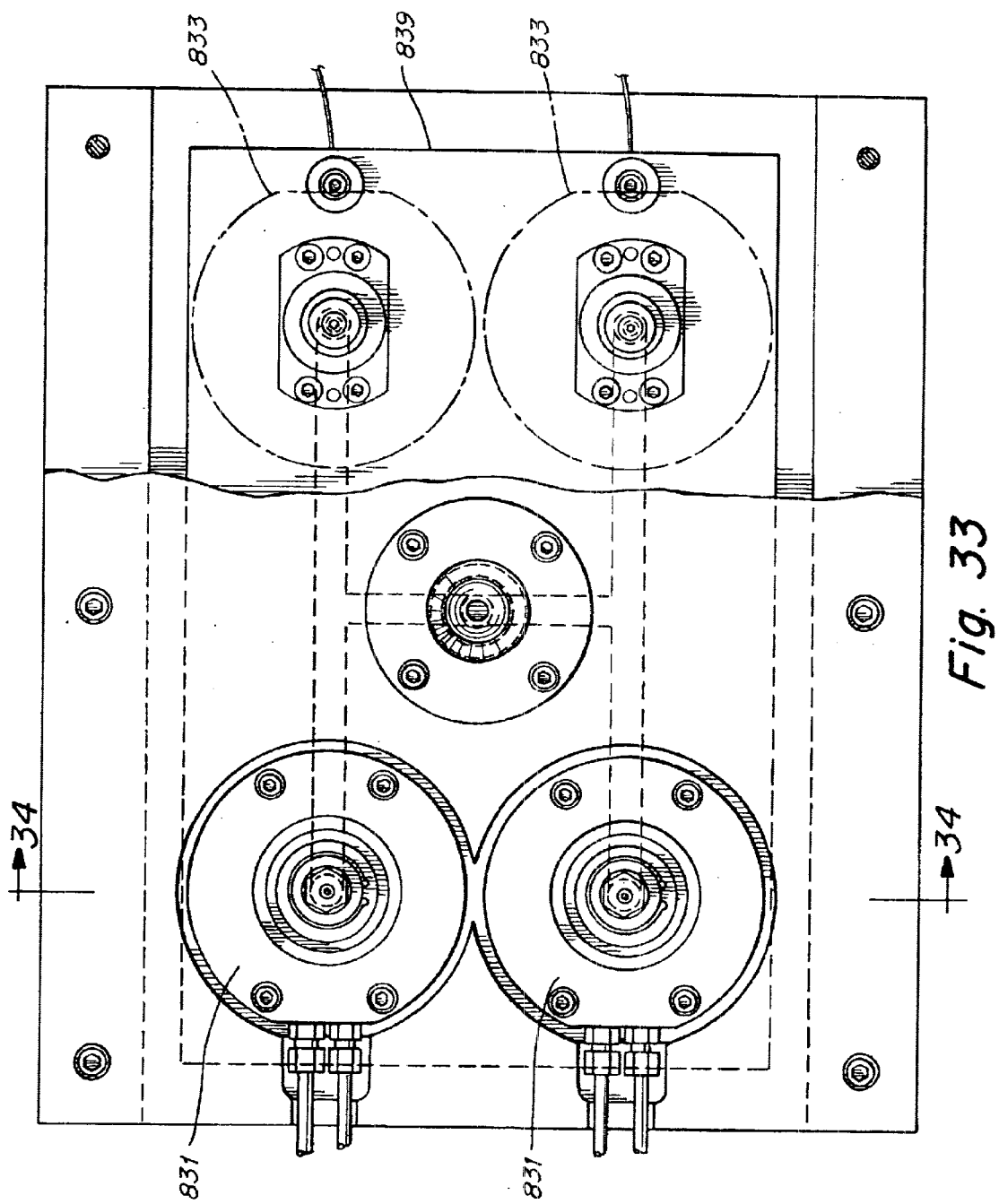
FIG. 33 is a partially broken away top plan view looking down along lines 33—33 of FIG. 32 showing an "H block manifold" configuration.
Figure 35:
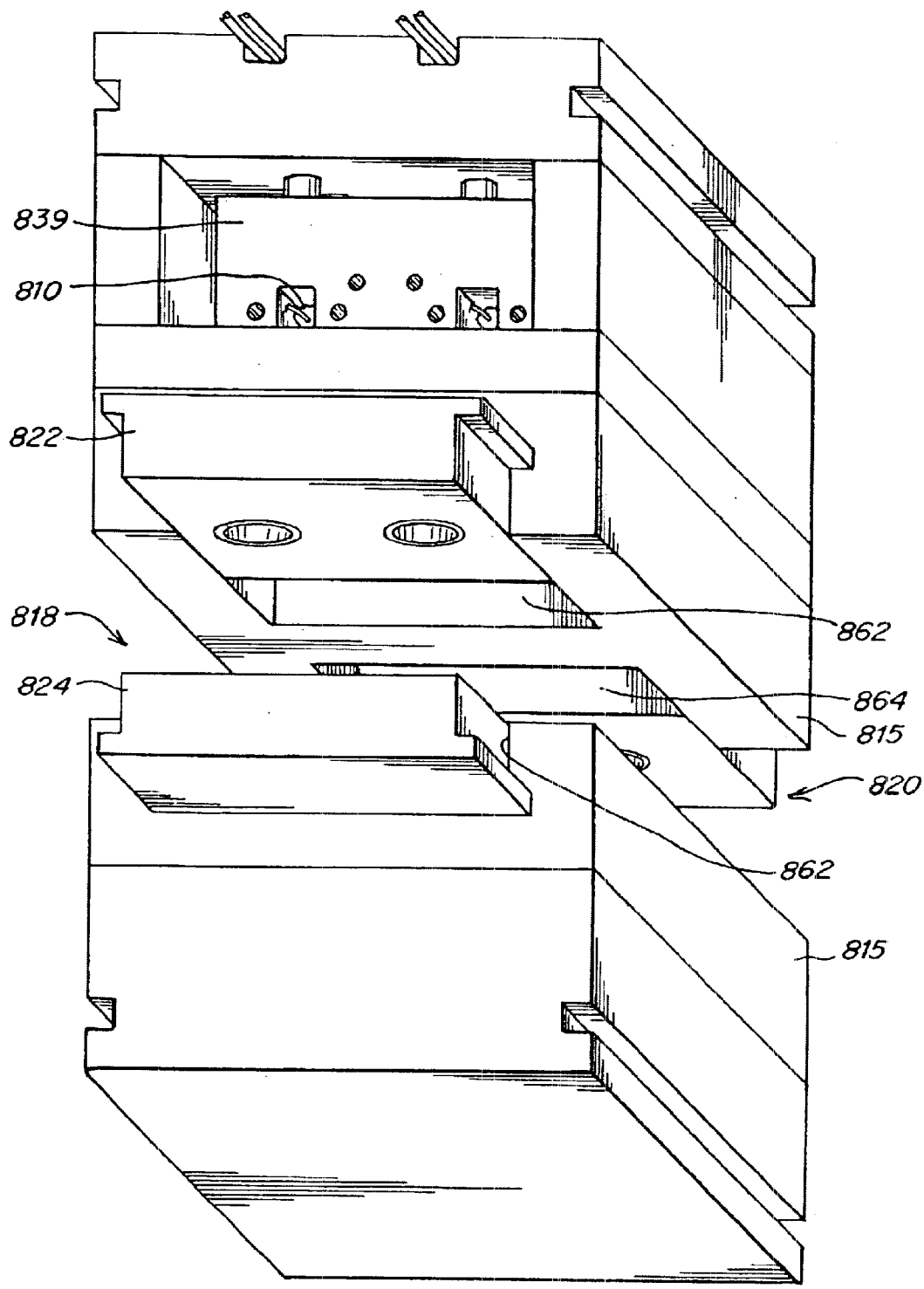
FIG. 35 is an exploded bottom perspective view of the modular injection molding system of FIGS. 32–34.

As shown in FIG. 35, the modular inserts 818, 820 are readily slidable into and out of complementary receiving apertures 862, 864 respectively in a master mold housing or press 815, FIGS. 32, 34, 35, such that a new/different modular insert (not shown) having any different preselected cavity size/shape but nonetheless having the same exterior modular body shape as insert 818 which is complementary with receiving aperture 862 can be used to readily replace the insert 818. The master housing 815, as with the existing configuration of actuators, manifold and nozzles, thus may remain the same from one injection cycle to another subsequent injection cycle, but the mold and mold cavity is readily changeable. As shown, each modular insert comprises two body halves, such as mold 818 shown as comprising upper and lower halves 822, 824, FIGS. 34, 35. The lower half 824 of the insert contains the part cavity 804. Thus the lower half 824 (or both halves) may be removed and readily replaced with a new insert having a cavity of any preselected different size, shape, volume, configuration.

Figure 36:
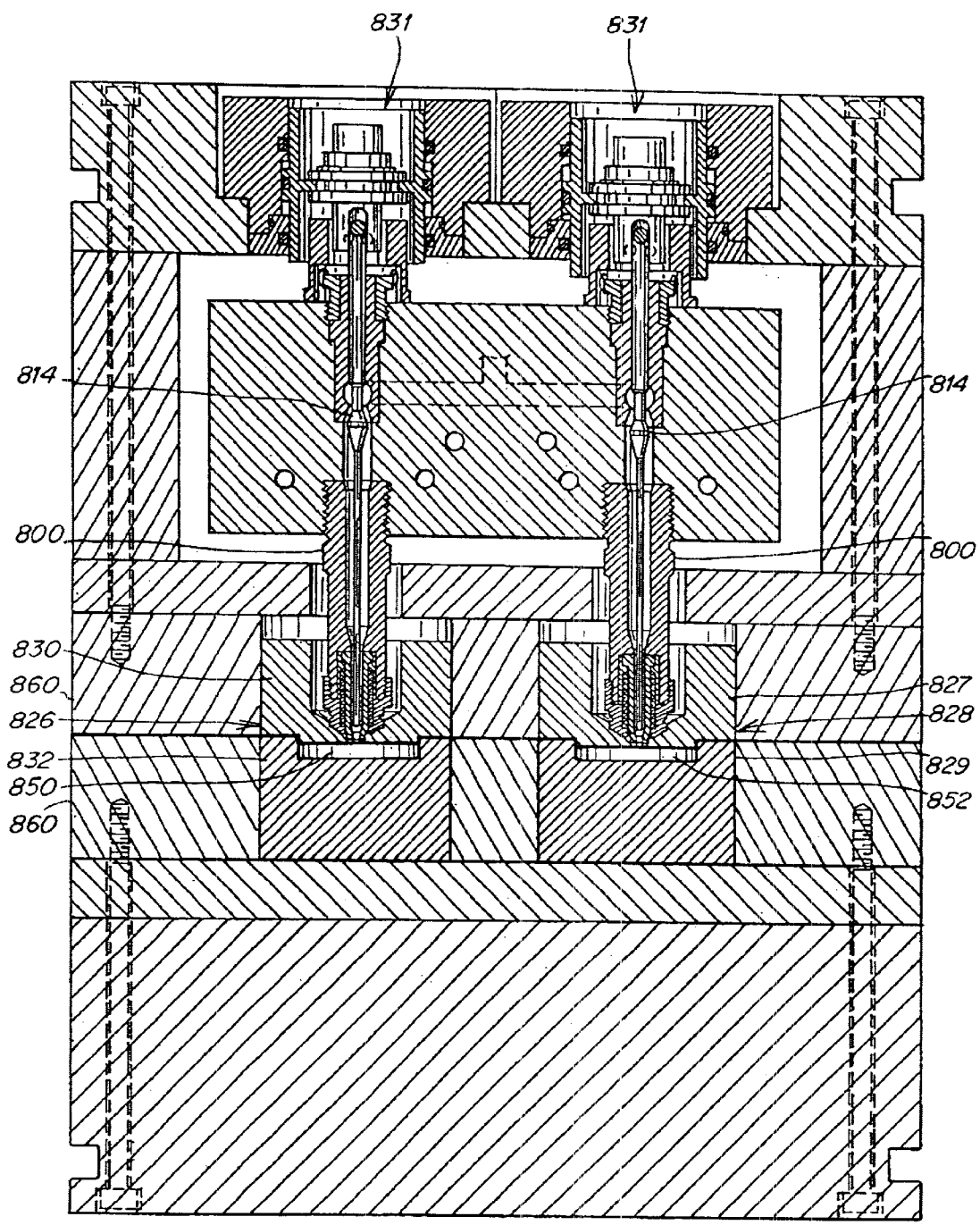
FIG. 36 is a cross-sectional end view similar to FIG. 34 of an alternate embodiment of a modular insert injection molding system having independently controlled flow injection into the cavities of each insert; and, FIG. 37 is an exploded fragmentary bottom perspective view of the system of FIG. 36.
Figure 37:
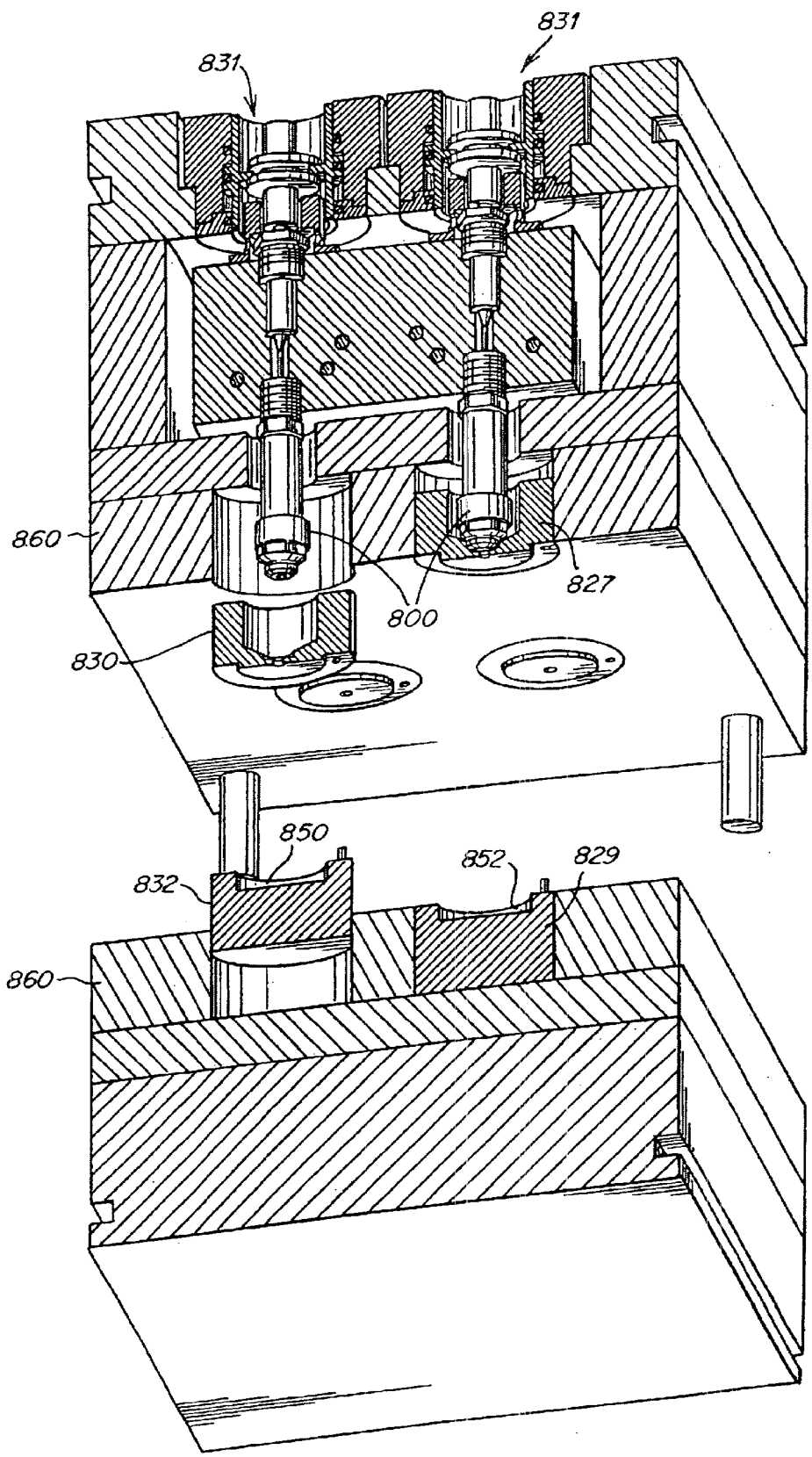

In the FIGS. 36, 37 embodiment, the modular inserts 826, 828 are cylindrical in exterior body shape and comprise upper and lower body halves 830,832 and 827,829 respectively which are readily insertable into and readily removable from complementary apertures provided in master mold housing or press 860 as shown. In this embodiment, the mold cavities 850 and 852 are provided in the lower halves 832 and 829 respectively of the modular inserts 826, 828. Similarly in this embodiment, the lower halves 832, 829 (or both halves) may be readily replaced with new mold inserts having a cavity of any new/different preselected size, shape, volume, configuration.

As can be readily imagined, the specific sizes, shapes, configurations and volumes of the cavities of the modular inserts may be of any desired/selected type and may contain multiple cavities. Any number of channels/nozzles may be employed to gate into any number of mold cavities simultaneously during a single or subsequent injection cycles. Regardless of the number or the size/shape of the mold cavity(ies) selected, the system allows the user to control the injection flow to the modular cavity inserts in the same manner as described above for single, non-modular molds/mold cavities. With reference to FIG. 32, the flow of melt material through nozzles 800 and 802 and into cavities 804 and 806 may be individually and independently controlled according to a programmed target profile executed by controller 808 based on pressure signals sent to the controller 808 by transducers 810 and/or 812. As described above with regard to other embodiments, one or more sensors may be interconnected to the flow channel as in the downstream nozzle position shown in FIG. 32, or in other flow channel positions (e.g. upstream or downstream of the gap or other flow controller) or in the mold cavity itself at preselected positions, e.g. at the position of sensor 823, FIG. 32 or sensor 817, FIG. 34, in cavity 804.

In the embodiments shown in FIGS. 32–37, the flow controllers are shown as valve pins 814, 816 having a surface which forms a gap with a surface on the interior of the nozzle bore or channel (spaced upstream and away from the exit of the bore/channel and/or gate of the mold cavity) which gap decreases in size as the valve pin is retracted by the actuator backwardly away from the gate. As can be readily imagined, any flow controller and any appropriate associated actuator and/or drive mechanism (e.g. valve pin, rotary valve or cylinder/ram/plunger with an appropriate associated actuator, motor or the like) of any of the types described hereinabove and equivalents thereof may be utilized in conjunction with control of injection into the modular mold inserts contemplated herein.

As described above with reference to the FIGS. 1–31 systems, a selected condition of the fluid material such as pressure sensed by pressure transducers 810 and 812, is sensed and fed back to controller 808 and compared to predetermined pressure values corresponding to each particular transducer. The sensed values (e.g. pressure, temperature, flow rate, viscosity) are fed into predetermined algorithms and the computer which executes the algorithm then instructs the actuators or other drive mechanism(s) for the flow controllers to control flow rate according to the algorithm. As shown in FIG. 32, the sensed pressure values are fed into controller 808 which compares the sensed value to a target value programmed into the PID controllers in real time and appropriate control signals are automatically sent according to the algorithm to servo valves 1 and 2 to alter the position of valve pins 814 and 816 which in turn effect the rate of material flow to the modular mold cavities.

Typically, the injection molding machine parameters would need to be reset when molding into a new part/cavity, however, using the flow control system of FIGS. 32–37, when quickly changing from one cavity insert to a different cavity insert, the molder can simply program a new target profile peculiar to the new part (or load an existing saved profile from memory) without having to reset the injection molding machine settings. Thus, there is no need to custom design a special injection molding system for each molding application, since different target profiles can be programmed according to which cavity insert is being used.

Ready insertion and removability of the mold inserts is achieved by using a master mold housing having receiving apertures or recesses which are uniformly complementary to or compatible with a preselected uniform/standard shape/configuration for the exterior surface of modular mold inserts. Preferably the master mold housing is readily assemblable and disassemblable to allow ready access to the apertures or recesses in which the mold inserts are to be inserted, mounted and removed. The master mold housing is also preferably readily disassemblable in such a manner that when disassembled the mold housing may remain mounted in the mold press. The modular mold inserts and the cavities of such inserts are typically designed/configured to require at least about 50 tons of press force to properly hold the modular mold inserts in place during an injection cycle.

The apparatus typically includes a housing for the modular mold inserts which comprises first and second mold housings which are readily openable and closeable such that ready access to the modular mold receiving apertures is enabled. The receiving apertures in the first and second mold housings receive the modular mold inserts in such a manner that the inserts may be readily manually inserted and readily manually removed therefrom. The first and second mold housings are readily closeable with each other such that the mold inserts can be maintained in position for injection under at least about fifty (50) tons of injection pressure.

What is claimed is:

1. In an injection molding machine, an apparatus for controlling delivery of a fluid material to mold cavities of selectively variable size, shape, volume or configuration, the apparatus comprising:

a modular mold mounting mechanism having mounting apertures for receiving first and second molds having first and second mold cavities of different size, shape, volume or configuration, the mounting apertures being adapted for ready insertion and ready removal of the first and second molds;

a manifold into which fluid material is injected, the manifold having first and second fluid delivery channels through which the fluid material is injected, one channel having an exit aperture communicating with a gate to the cavity of one mold, the other channel having an exit aperture communicating with a gate to the cavity of the other mold;

each channel being associated with a drive mechanism which is interconnected to and controls operation of a fluid flow controller which varies flow of the fluid material through an associated channel;

a sensor for sensing a selected condition of the fluid material being injected through at least the first channel over an injection cycle;

a master controller interconnected to each drive mechanism, the master controller comprising a computer interconnected to the sensor which receives a signal representative of the selected condition sensed by the sensor, the computer including an algorithm utilizing a value corresponding to a signal received from the sensor as a variable for controlling operation of at least the drive mechanism associated with the first channel according to a profile of predetermined values corresponding to the selected condition of the fluid material over the injection cycle.

2. Apparatus of claim 1 including a second sensor for sensing a selected condition of the fluid material being injected through the other channel or the other mold cavity, the computer being interconnected to the second sensor and receiving a signal representative of the selected condition sensed by the second sensor, the algorithm utilizing a value corresponding to a signal received from the second sensor as a variable for controlling operation of the drive mechanism associated with the other channel.

3. Apparatus of claim 1 wherein at least one of the channels includes a nozzle having a seal surface surrounding the exit aperture of the channel, the nozzle being expandable upon heating to a predetermined operating temperature, the nozzle being mounted relative to a complementary surface surrounding the gate such that the seal surface of the nozzle is moved into compressed contact with the complementary surface surrounding the gate upon heating of the nozzle to the predetermined operating temperature.

4. Apparatus of claim 1 wherein at least one of the channels includes a nozzle comprising an outer unitary piece formed of a first material and an inner unitary piece formed of a second material, the first material being substantially less heat conductive than the second material.

5. Apparatus of claim 1 wherein the sensor comprises a pressure transducer interconnected to at least one of the channels or a mold cavity for detecting the pressure of the fluid material.

6. Apparatus of claim 1 wherein the master controller further comprises a control valve interconnected to the computer and having at least two fluid chambers and a piston controllably movable between selected positions for selectively delivering a pressurized drive fluid to one or the other of the chambers of the control valve.

7. Apparatus of claim 1 wherein the fluid flow controller comprises a valve pin interconnected to the master controller, the valve pin having a surface for forming a gap with a complementary surface of the at least one channel spaced upstream and away from the gate, the size of the gap being controllably variable to control flow of the fluid material through the gate.

8. Apparatus of claim 7 wherein the valve pin is reciprocally movable toward and away from the gate and wherein the surface of the valve pin and the surface of the channel are adapted to increase the size of gap as the valve pin is moved away from the gate and decrease the size of the gap as the valve pin is moved toward the gate.

9. Apparatus of claim 1 wherein the at least one channel has a valve pin, the apparatus further comprising a plug mounted in a recess of the manifold, the plug having a bore through which a stem of the valve pin passes, the valve pin having a head, the bore of the plug through which the stem passes having a smaller diameter than the valve pin head at the valve pin head's largest point and the recess of the manifold having a larger diameter than the diameter of the valve pin head at the valve pin head's largest point, so that the valve pin can be removed from the manifold from a side of the manifold in which the recess is formed when the plug is removed from the manifold.

10. Apparatus of claim 1 wherein the sensor is selected from the group consisting of a pressure transducer, a load cell, a valve pin position sensor, a temperature sensor and a barrel screw position sensor.

11. Apparatus of claim 1 wherein the fluid flow controller is disposed within or communicates with the flow of fluid material through the manifold or one or more of the channels.

12. Apparatus of claim 11 wherein the fluid flow controller is selected from the group consisting of a valve pin, a rotary valve and a plunger.

13. An injection molding system, comprising:
    a manifold having first and second channels through which a fluid material is injected and into first and second modular cavity inserts which are removably mounted in a mold; and
    a controller which independently controls first and second rates at which the fluid material is injected through the first and second channels and into the modular cavity inserts during an injection cycle according to a predetermined profile of the first and second rates at which the fluid material is injected over the injection cycle.

14. The system of claim 13 wherein the mold includes insert apertures adapted to readily receive the modular cavity inserts and for ready removal of the cavity inserts.

15. The system of claim 14 wherein the controller comprises a computer having a programmable algorithm utilizing as a variable a value corresponding to signal sent by a sensor which measures a selected property of the fluid material injected through a channel or into a modular cavity insert.

16. The system of claim 15 wherein the algorithm utilizes as variables first and second values respectively corresponding to first and second signals sent by respective first and second sensors which measure respective first and second selected properties of the fluid material injected through respective ones of the first and second channels or into respective ones of the first and second modular cavity inserts.

17. In an injection molding machine, an apparatus for controlling delivery of a fluid material to mold cavities of selectively variable size, shape, volume or configuration, the apparatus comprising:
    a modular mold mounting mechanism having mounting apertures for receiving first and second molds having first and second mold cavities of different size, shape, volume or configuration, the mounting apertures being adapted for ready insertion and ready removal of the first and second molds;
    wherein the modular mold mechanism comprises first and second housings readily openable and closeable for enabling ready insertion and removal of the first and second molds;
    a manifold into which fluid material is injected, the manifold having first and second fluid delivery channels through which the fluid material is injected, one channel having an exit aperture communicating with a gate to the cavity of one mold, the other channel having an exit aperture communicating with a gate to the cavity of the other mold;
    each channel being associated with a drive mechanism which is interconnected to and controls operation of a fluid flow controller which varies flow of the fluid material through an associated channel,
    a sensor for sensing a selected condition of the fluid material being injected through at least the first channel;
    a master controller interconnected to each drive mechanism, the master controller comprising a computer interconnected to the sensor which receives a signal representative of the selected condition sensed by the sensor, the computer including an algorithm utilizing a value corresponding to a signal received from the sensor as a variable for controlling operation of at least the drive mechanism associated with the first channel according to a profile of predetermined values corresponding to the selected condition of the fluid material over the injection cycle.

\* \* \* \* \*